US008372307B2

(12) United States Patent
Farrand et al.

(10) Patent No.: US 8,372,307 B2
(45) Date of Patent: Feb. 12, 2013

(54) CYCLOHEXYLENE REACTIVE MESOGENS AND THEIR APPLICATIONS

(75) Inventors: Louise Diane Farrand, Blandford Forum (GB); Kevin Adlem, Dorset (GB); Andreas Taugerbeck, Darmstadt (DE); John Patrick, Warham (GB); Christopher John Dunn, Southampton (GB); Janice McCreary, Southampton (GB)

(73) Assignee: Merck Patent GmbH, Darmstadt (DE)

( * ) Notice: Subject to any disclaimer, the term of this patent is extended or adjusted under 35 U.S.C. 154(b) by 473 days.

(21) Appl. No.: 12/516,115

(22) PCT Filed: Oct. 26, 2007

(86) PCT No.: PCT/EP2007/009332
§ 371 (c)(1),
(2), (4) Date: Jan. 12, 2010

(87) PCT Pub. No.: WO2008/061606
PCT Pub. Date: May 29, 2008

(65) Prior Publication Data
US 2010/0103366 A1    Apr. 29, 2010

(30) Foreign Application Priority Data

Nov. 24, 2006  (EP) .................................. 06024369

(51) Int. Cl.
C09K 19/00    (2006.01)
C09K 19/02    (2006.01)
C09K 19/06    (2006.01)
C09K 19/52    (2006.01)
C07C 69/74    (2006.01)

(52) U.S. Cl. .......... 252/299.63; 252/299.01; 252/299.6; 428/1.1; 428/1.3; 349/1; 349/56; 349/86; 349/182; 349/183; 560/1; 560/118; 560/194; 560/220; 526/309

(58) Field of Classification Search .............. 252/299.01, 252/299.6, 299.63; 428/1.1, 1.3; 349/1, 349/56, 86, 182, 183; 560/1, 118, 194, 220; 526/309
See application file for complete search history.

(56) References Cited

U.S. PATENT DOCUMENTS

| | | | | |
|---|---|---|---|---|
| 7,060,331 B2 * | 6/2006 | Kirsch et al. | .................. | 428/1.1 |
| 7,081,281 B2 * | 7/2006 | Kumai et al. | .................. | 428/1.1 |
| 7,724,330 B2 * | 5/2010 | Parri et al. | ..................... | 349/117 |
| 2006/0124900 A1 | 6/2006 | Hiroshi et al. | | |

FOREIGN PATENT DOCUMENTS

| | | |
|---|---|---|
| EP | 0 939 795 A | 9/1999 |
| EP | 1 743 931 A | 1/2007 |
| JP | 2003 327966 A | 11/2003 |
| JP | 2005 015473 A | 1/2005 |
| WO | WO-9849253 A1 | 5/1998 |
| WO | WO-02-06196 A | 1/2002 |
| WO | WO-2005 080529 A | 9/2005 |
| WO | WO-2005 090520 A | 9/2005 |

OTHER PUBLICATIONS

International Search Report for PCT/EP2007/009332 dated Jan. 25, 2008.

Maiko, Ito et al., "Polymerizable Liquid Crystalline Compound Having Unsaturated Bond and Polymer of the Same," Patent Abstracts of Japan, Publication Date: Jan. 20, 2005, English of Abstract of JP2005-015473.

Hirotsugu, K. et al., "Liquid Crystal Material for Optical Modulation Element," Patent Absracts of Japan, Publication Date: Nov. 19, 2003, English Abstract of JP 2003-327966.

Nomura, T. et al., "Liquid Crystal Material for Optical Device and Optical Modulation Device," NERAC, Publication Date: Sep. 1, 2005, English Abstract of WO2005/080529.

* cited by examiner

*Primary Examiner* — Geraldina VIsconti

(74) *Attorney, Agent, or Firm* — Millen, White, Zelano & Branigan, P.C.

(57) ABSTRACT

The invention relates to new cyclohexylene reactive mesogens (RM), polymers derived thereof, liquid crystal (LC) media comprising them, and the use of the compounds, polymers and liquid crystalline media in optical, electrooptical, electronic, semiconducting or luminescent components or devices, in decorative, security, cosmetic or diagnostic applications, especially in the polymer stabilised blue phase.

29 Claims, No Drawings

CYCLOHEXYLENE REACTIVE MESOGENS AND THEIR APPLICATIONS

FIELD OF THE INVENTION

The invention relates to new cyclohexylene reactive mesogens (RM), polymers derived thereof, liquid crystal (LC) media comprising them, and the use of the compounds, polymers and liquid liquid crystalline media in optical, electrooptical, electronic, semiconducting or luminescent components or devices, in decorative, security, cosmetic or diagnostic applications, especially for use in the polymer stabilised blue phase.

BACKGROUND AND PRIOR ART

Prior art describes liquid crystal displays (LCD), and liquid crystalline light modulation media, which are in the optically isotropic blue phase when being operated in a display application. Such displays are disclosed for example in DE 103 13 979 A1 or the corresponding applications WO 04/046805 A1 and US 2006/0050354 A1. The operating voltage of these media is almost temperature-independent in the blue phase region, while it dramatically increases with increasing temperature in the isotropic phase (Kerr effect). However, the limitation for the application of this type of displays is the insufficient temperature range of the blue phase.

Blue phases are typically observed in highly chiral single mesogenic compounds or mixtures but generally over a very small range—typically less than 1° C. In order to operate novel fast switching display modes that operates in the blue phase, it is necessary to have a mixture that possesses as wide a blue phase as possible, typically from −20 to +60° C.

Other typical liquid crystal properties necessary for display applications are also required.

To achieve broader blue phases, prior art suggests to add polymerisable compounds to the liquid liquid crystalline medium which are then polymerised in-situ. The polymer or polymer network thereby formed is reported to stabilise the blue phase of the liquid liquid crystalline medium.

Kikuchi, H. et al., *Polymeric Materials Science and Engineering* (2002), 1(1), 64-68 and Kikuchi, H. et al., *Polymeric Materials Science and Engineering*, (2003), 89, 90-91 describe in-situ polymerisation to stabilise the blue phase over a temperature range that is 60° C. wide and includes ambient temperature (−67 to 53° C.) and, respectively, over a temperature range that is 120° C. wide and includes room temperature (−73 to 53° C.). This is achieved by using a non-mesogenic mono-reactive monomer, such as 2-ethyl hexyl acrylate, together with a difunctional reactive mesogen (RM), e.g. RM257 which is available from Merck KGaA, in a nematic liquid liquid crystalline host mixture.

H. Kikuchi et al., *Nature Materials* (2002), 1(1), 64-68 describes in-situ polymerisation to stabilise the blue phase over 60° C. including room temperature (−67 to 53° C.) using RM257 and a non-mesogenic reactive monomer such as 2-ethyl hexyl acrylate.

JP 2003-327966 A describes a composite liquid crystal for use as optical modulation element with specific composition, comprising a low molecular weight LC, which possesses a blue phase, and a polymer network within this medium obtained by polymerisation of non-liquid crystalline monomers alongside with a cross-linking agent RM257. In particular, the preferred embodiment is for branched monoacrylate monomers with alkyl groups in the side-chain.

WO 2005/090520 A1 describes an 'invisible' polymer stabilised blue phase and again specifically mentions that non-liquid crystalline monomers are preferred.

WO 2005/080529 A1 describes polymer stabilised blue phase using mono- and multireactive monomers, but uses only non-mesogenic monoreactive monomers.

The above methods and systems according to prior art do specifically mention that they utilise either a non-mesogenic monomer or a combination of RM257 and a non-mesogenic monomer. However, these systems have significant drawbacks. In particular by using non-mesogenic monomers, the structure of the forming polymer has significantly different physical properties from the monomers and the liquid liquid crystalline host mixture. There is a need to stop and change the temperature at which the photopolymerisation is done many times, thus making this method a difficult and time-expensive process to undergo and difficult to reproduce.

In addition, the use of non-mesogenic monomers such as 2-ethylhexylacrylate can be problematic due to the volatile nature of the compound, leading to problems of loss due to evaporation and inhomogeneity of the mixed monomer/host system.

Also, the use of non-mesogenic compounds can severely lower the clearing point of the liquid liquid crystalline host, leading to a much smaller width of polymer stabilised blue phase, which is not desirable for display applications.

Moreover, the above prior art documents describe liquid liquid crystalline media that are based on a crude cyano-based mesogenic host, which has a poor high voltage holding ratio (VHR).

There is therefore a need to find materials that stabilise the blue phase over a wide temperature range, and which possess desirable properties such as fast switching, good voltage holding ratio, low voltage, high clearing point, and high stability to light and temperature.

The invention has the aim of providing improved methods and materials, in particular new RMs and liquid liquid crystalline mixtures comprising them, to achieve polymer stabilised blue phases, which do not have the above-mentioned disadvantages of methods and materials described in prior art. Another aim of the invention is to extend the pool of RM materials available to the expert. Other aims are immediately evident to the expert from the following description.

Surprisingly, it has been found that by using an RM comprising a cyclohexylene core, a stabilised liquid liquid crystalline blue phase which has a broad temperature range, extremely fast switching times, very high voltage holding ratio and low voltage can be achieved.

In addition, by using a total RM system (i.e. all the monomers are rod-like) a high clearing point can be maintained, and polymerisation can be carried out at a single temperature, enabling a production friendly process.

The cyclohexylene core of the RM also appears to be stable to the UV light used in the polymerisation process. The resultant polymer stabilised blue phase therefore has a high voltage holding ratio (VHR).

Also, it has been found that by using cyclohexylene RMs in combination with a liquid liquid crystalline host comprising fluorophenyl liquid liquid crystalline compounds, the RMs do effectively stabilise this host to give a high VHR, which is necessary for state-of-the-art LCDs.

JP 2005-15473 discloses RMs of a broad formula and does also disclose some RMs comprising a cyclohexylene ring, however, compounds as claimed in the present invention are not shown.

SUMMARY OF THE INVENTION

The invention relates to compounds of formula I

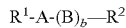   I wherein
$R^1$ and $R^2$ are independently of each other selected from H, F, Cl, Br, I, CN, NCS, $SF_5$, or straight-chain or branched alkyl having 1 to 30 C-atoms that is optionally mono- or polysubstituted by F, Cl, Br, I or CN, and in which one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O—, —S—CO—, —CO—S—, —$CY^1$=$CY^2$— or —C≡C— in such a manner that O and/or S atoms are not linked directly to one another, or denote P-Sp-, with at least one of $R^1$ and $R^2$ being P-Sp-,
$R^0$ and $R^{00}$ independently of each other denote H or alkyl with 1 to 12 C-atoms,
$Y^1$ and $Y^2$ independently of each other denote H or F,
P is a polymerisable group,
Sp is a spacer group or a single bond,
A and B are independently of each other 1,4-cyclohexylene wherein one or more —$CH_2$— groups are optionally replaced by —O— and/or —S—, in such a way, that no two O-atoms are linked together and the ring is optionally substituted, preferably by one or more $CH_3$— groups or halogen atoms, preferably they are trans-1,4-cyclohexylene,
b is 0 or 1
and from which compounds wherein
  b is 0,
  $R^1$ and $R^2$ are P-Sp,
  P is acrylate or methacrylate and
  Sp is a single bond or a —$CH_2$— group
are excluded.

The invention further relates to a liquid crystalline material comprising one or more compounds of formula I

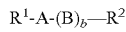   I wherein
$R^1$ and $R^2$ are independently of each other selected from H, F, Cl, Br, I, CN, NCS, $SF_5$, or straight-chain or branched alkyl having 1 to 30 C-atoms that is optionally mono- or polysubstituted by F, Cl, Br, I or CN, and in which one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O—, —S—CO—, —CO—S—, —$CY^1$=$CY^2$— or —C≡C— in such a manner that O and/or S atoms are not linked directly to one another, or denote P-Sp-, with at least one of $R^1$ and $R^2$ being P-Sp-,
$R^0$ and $R^{00}$ independently of each other denote H or alkyl with 1 to 12 C-atoms,
$Y^1$ and $Y^2$ independently of each other denote H or F,
P is a polymerisable group,
Sp is a spacer group or a single bond,
A and B are independently of each other 1,4-cyclohexylene wherein one or more —$CH_2$— groups are optionally replaced by —O— and/or —S—, in such a way, that no two O-atoms are linked together and that is optionally substituted, preferably by one or more $CH_3$— groups or halogen atoms, preferably they are trans-1,4-cyclohexylene,
b is 0 or 1.

The invention further relates to a liquid liquid crystalline medium comprising the following components
(a) one or more unpolymerisable, mesogenic or liquid crystalline compounds,
(b) one or more polymerisable, mesogenic or liquid crystalline compounds of formula I,
(c) optionally one or more additional polymerisable, mesogenic or liquid crystalline compounds,
wherein said mixture comprises one or more chiral compounds, which can be compounds of components (a), (b) and/or (c) or can form an additional component, component (d).

The invention further relates to a liquid liquid crystalline medium as described above, wherein said liquid liquid crystalline medium has a blue phase.

The invention further relates to a liquid liquid crystalline medium having a blue phase as described above, wherein the temperature range of the blue phase is broadened by in-situ polymerisation of component b, and, if present, component c, at a temperature at which the unpolymerised liquid liquid crystalline medium exhibits a blue phase.

The invention further relates to a method of stabilising the blue phase of a liquid crystalline medium as described above and below.

The invention further relates to an electrooptical cell comprising two plane-parallel substrates, at least one of which is transparent to visible light, and at least one of which comprises an electrode layer, and further comprising a liquid crystalline medium as described above and below.

The invention further relates to a polymerisable material, preferably a polymerisable liquid liquid crystalline material, comprising one or more compounds of formula I and optionally comprising one or more further compounds that can be polymerisable and/or mesogenic or liquid crystalline.

The invention further relates to an anisotropic polymer obtained by polymerising a compound of formula I or a polymerisable material as described above, preferably in its oriented state in form of a thin film.

The invention further relates to the use of compounds, materials and polymers as described above and below in electrooptical displays, LCDs, optical films, polarisers, compensators, beam splitters, reflective films, alignment layers, colour filters, holographic elements, hot stamping foils, coloured images, decorative or security markings, liquid liquid crystalline pigments, adhesives, cosmetics, diagnostics, non-linear optics, optical information storage, electronic devices, organic semiconductors, field effect transistors (FET), components of integrated circuitry (IC), thin film transistors (TFT), Radio Frequency Identification (RFID) tags, organic light emitting diodes (OLED), electroluminescent displays, lighting devices, photovoltaic devices, sensor devices, electrode materials, photoconductors, electrophotographic recording, lasing materials or devices.

The invention further relates to the use of the compounds, materials and polymers as described above and below for polymer stabilised blue phases.

Terms and Definitions

The term "film" includes rigid or flexible, self-supporting or free-standing films with mechanical stability, as well as coatings or layers on a supporting substrate or between two substrates.

The term "reactive mesogen" (RM) means a polymerisable mesogenic or liquid crystal compound.

The term "liquid crystal or mesogenic material" or "liquid crystal or mesogenic compound" means materials or compounds comprising one or more rod- or board-shaped (calamitic) or disk-shaped (discotic) mesogenic groups, i.e. groups with the ability to induce liquid crystal (LC) phase behaviour. The compounds or materials comprising mesogenic groups do not necessarily have to exhibit a liquid liquid crystalline phase themselves. It is also possible that they show liquid liquid crystalline phase behaviour only in mixtures with other compounds, or when the mesogenic compounds or materials, or the mixtures thereof, are polymerised.

For the sake of simplicity, the term "liquid crystal material" is used hereinafter for both mesogenic and liquid liquid crystalline materials.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive" compounds.

DETAILED DESCRIPTION OF THE INVENTION

By using RMs comprising a cyclohexylene core unit, optionally in combination with other RMs, it is possible to extend the blue phase range by in-situ photopolymerisation. The blue phase range thereby achieved is stable from temperatures below −20° C. up to about +40° C. to +50° C. depending on the structure of the RM used and on the host mixture.

The RMs can be chiral or achiral, and can comprise an acrylate/methacrylate group or an other polymerisable group.

The RMs can be monoreactive or di- or multireactive. Especially preferred is a material comprising at least one direactive compound (cross-linking agent), which is also preferably liquid crystalline with a functional group at each end; for instance it can be based on diacrylate type RMs.

The host mixture contains low molar mass liquid liquid crystalline components and also a sufficient amount of chiral dopant so that a blue phase can be induced. However, without polymer stabilisation the blue phase range typically exists only within a temperature range of less than 3° C. The stabilisation of the blue phase is carried out by adding to the chiral liquid liquid crystalline host mixture one or more RMs, preferably a mixture comprising monoreactive and direactive RMs, plus a suitable photo-initiator, and polymerising the RMs, for example by UV irradiation, for a short time. Preferably the polymerisation is carried out in electro-optical cells maintained at a temperature in the blue phase of the liquid liquid crystalline host mixture.

The cyclohexylene RMs of formula I are particularly useful for stabilising a liquid liquid crystalline host comprising fluorinated phenyl derivatives (so-called 'super fluorinated mixture' host or 'SFM' host), which gives a better holding ratio compared e.g. to a liquid crystalline host based on cyanophenyl compounds.

This process is especially successful to stabilise the blue phase at low temperatures without phase separation occurring, and is almost always isothermal The RMs of formula I can be prepared in a small number of steps from available liquid crystalline intermediates. They do greatly enhance the width of the blue phase by polymer stabilisation, typically from 1 K up to 60-70 K.

The resultant polymer stabilised blue phase achieved by using RMs of formula I shows extremely fast switching times, typically less than 5 msec, over a broad temperature range. This is a considerable improvement that has not been reported in prior art.

The structure of the cyclohexylene core of the RMs of formula I has high stability against light and high temperatures. As a result the polymer stabilised blue phase has a high VHR.

The cyclohexylene RMs of formula I are adaptable and have been shown to successfully stabilise SFM liquid liquid crystalline hosts and mixed liquid liquid crystalline hosts suitable for meeting the requirements of display applications. In contrast, the systems reported in prior art use hosts based on cyano compounds, which have a limited stability.

By using polymerisable materials consisting exclusively of RMs, i.e. all the reactive monomers are mesogens, preferably rod-like mesogens, it is possible to maintain a high clearing point of the liquid liquid crystalline mixture. In addition, it is possible to polymerise at a single temperature, thereby enabling a production friendly process. In contrast, the systems reported in prior art use non-mesogenic monoacrylates, requiring a multi-step, complicated and time consuming process of photopolymerisation.

The cyclohexylene core of the RMs of formula I also has higher stability to the UV light used in the polymerisation process. The resultant polymer stabilised blue phase therefore has a high voltage holding ratio.

The RMs of formula I are especially useful as monomers to polymer stabilise the liquid crystalline blue phase for use in LCD, photonic or security applications. However, they can also be used in other typical RM applications known from prior art, for example for the preparation of optical films, in particular optical retardation or compensation films, alignment layers or polarisers in LCDs. They are also useful as monomers in the formation of security film products. They can also be used in semiconductors or charge transport materials, and polymeric films made from such compounds.

The RMs of formula I themselves do not necessarily have to exhibit a liquid liquid crystalline phase. However, as they are partially consisting of a rod like structure they do not diminish the electro-optical properties of the liquid liquid crystalline host in to which they are dissolved, for example clearing points are not significantly lowered.

For the above applications it is also possible to copolymerise the RMs of formula I with other RMs that are known from prior art, or with other polymerisable compounds.

Especially preferred are compounds of formula I, wherein
one of $R^1$ and $R^2$ is P-Sp- and the other is an non-polymerisable group,
both $R^1$ and $R^2$ are selected from identical or different groups P-Sp-,
$R^1$ or $R^2$ is alkyl or alkoxy with 1 to 12 C atoms that is optionally fluorinated,
$R^1$ and/or $R^2$ is a chiral group,
one or both of the groups Sp are a chiral group,
Sp is preferably of formula Sp'-X', such that P-Sp is P-Sp'-X'—, wherein
X' is —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^1$=CY$^2$—, —C≡C—, —CH=CH—COO—, —OCO—CH=CH— or a single bond,
Sp' is alkylene with 1 to 20 C atoms, preferably 1 to 12 C-atoms, which is optionally mono- or polysubstituted by F, Cl, Br, I or CN, and wherein one or more non-adjacent CH$_2$ groups are optionally replaced, in each case independently from one another, by —O—, —S—, —NH—, —NR°—, —SiR°R°°—, —CO—, —COO—, —OCO—, —OCO—O—, —S—CO—, —CO—S—, —NR°—CO—O—, —O—CO—NR°—, —NR°—CO—NR°—, —CH═CH— or —C≡C— in such a manner that O and/or S atoms are not linked directly to one another, $R^0$ and $R^{00}$ independently of each other denote H or alkyl with 1 to 12 C-atoms, $Y^1$ and $Y^2$ independently of each other denote H or F, P-Sp- is P—$(CH_2)_n$—$(O)_o$— with n being an integer from 1 to 12, preferably 1 to 6, and o being 0 or 1, B is optionally substituted.

Particular preferably B is selected from 1,4-cyclohexylene, dioxane-2,5-diyl or tetrahydropyrane-2,5-diyl, which are optionally substituted, preferably by one or more $CH_3$— groups or halogen atoms, preferably it is trans-1,4-cyclohexylene.

If B is substituted it is preferably substituted by one or more groups L, with L having one of the meanings of $R^1$ given in formula I that is different from P-Sp-. Preferably L is selected from F, Cl, Br, I, —CN, —$NO_2$, —NCO, —NCS, —OCN, —SCN, —C(═O)$NR^°R^{°°}$, —C(═O)$X^°$, —C(═O)$OR^°$, —C(═O)$R^°$, —$NR^°R^{°°}$, —OH, —$SF_5$, optionally substituted silyl, aryl with 1 to 12, preferably 1 to 6 C atoms, and straight chain or branched alkyl, alkoxy, alkylcarbonyl, alkoxycarbonyl, alkylcarbonlyoxy or alkoxycarbonyloxy with 1 to 12, preferably 1 to 6 C atoms, wherein one or more H atoms are optionally replaced by F or Cl, wherein $R^°$ and $R^{°°}$ are as defined in formula I and $X^°$ is halogen.

More preferably L is selected from F, Cl, CN, $NO_2$ or straight chain or branched alkyl, alkoxy, alkylcarbonyl, alkoxycarbonyl, alkylcarbonlyoxy or alkoxycarbonyloxy with 1 to 12 C atoms, wherein the alkyl groups are optionally perfluorinated.

Most preferably L is selected from F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOCH_2H_5$, $CF_3$, $OCF_3$, $OCHF_2$ or $OC_2F_5$, in particular F, Cl, CN, $CH_3$, $C_2H_5$, $C(CH_3)_3$, $CH(CH_3)_2$, $OCH_3$, $COCH_3$ or $OCF_3$, most preferably F, Cl, $CH_3$, $C(CH_3)_3$, $OCH_3$ or $COCH_3$.

If B is cyclohexylene in which one or more $CH_2$— groups are replaced, it is preferably selected from

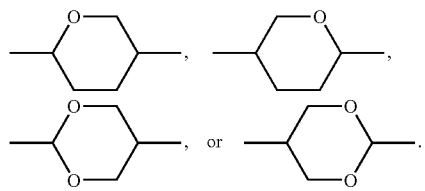

An alkyl or alkoxy radical, i.e. where the terminal $CH_2$ group is replaced by —O—, can be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl(=methoxymethyl), 2-(=ethoxymethyl) or 3-oxabutyl(=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

An alkyl group wherein one or more $CH_2$ groups are replaced by —CH═CH— can be straight-chain or branched. It is preferably straight-chain, has 2 to 10 C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples for particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 C atoms are generally preferred.

In an alkyl group wherein one $CH_2$ group is replaced by —O— and one by —CO—, these radicals are preferably neighboured. Accordingly these radicals together form a carbonyloxy group —CO—O— or an oxycarbonyl group —O—CO—. Preferably this group is straight-chain and has 2 to 6 C atoms. It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl, 4-(methoxycarbonyl)-butyl.

An alkyl group wherein two or more $CH_2$ groups are replaced by —O— and/or —COO— can be straight-chain or branched. It is preferably straight-chain and has 3 to 12 C atoms. Accordingly it is preferably bis-carboxy-methyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7-bis-carboxy-heptyl, 8,8-bis-carboxy-octyl, 9,9-bis-carboxy-nonyl, 10,10-bis-carboxy-decyl, bis-(methoxycarbonyl)-methyl, 2,2-bis-(methoxycarbonyl)-ethyl, 3,3-bis-(methoxycarbonyl)-propyl, 4,4-bis-(methoxycarbonyl)-butyl, 5,5-bis-(methoxycarbonyl)-pentyl, 6,6-bis-(methoxycarbonyl)-hexyl, 7,7-bis-(methoxycarbonyl)-heptyl, 8,8-bis-(methoxycarbonyl)-octyl, bis-(ethoxycarbonyl)-methyl, 2,2-bis-(ethoxycarbonyl)-ethyl, 3,3-bis-(ethoxycarbonyl)-propyl, 4,4-bis-(ethoxycarbonyl)-butyl, 5,5-bis-(ethoxycarbonyl)-hexyl.

An alkyl or alkenyl group that is monosubstituted by CN or $CF_3$ is preferably straight-chain. The substitution by CN or $CF_3$ can be in any desired position.

An alkyl or alkenyl group that is at least monosubstituted by halogen is preferably straight-chain. Halogen is preferably F or Cl, in case of multiple substitution preferably F. The resulting groups include also perfluorinated groups. In case of monosubstitution the F or Cl substituent can be in any desired position, but is preferably in ω-position. Examples for especially preferred straight-chain groups with a terminal F substituent are fluoromethyl, 2-fluoroethyl, 3-fluoropropyl, 4-fluorobutyl, 5-fluoropentyl, 6-fluorohexyl and 7-fluoroheptyl. Other positions of F are, however, not excluded.

Halogen is preferably F or Cl.

$R^1$ or $R^2$ can be an achiral or a chiral group. In a preferred embodiment it is a chiral group, very preferably selected of formula II:

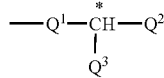

wherein
$Q^1$ is alkylene or alkylene-oxy with 1 to 9 C atoms, arylene or heteroarylene as defined above, or a single bond,
$Q^2$ is alkyl or alkoxy with 1 to 10 C atoms which may be unsubstituted, mono- or polysubstituted by F, Cl, Br or CN, it being also possible for one or more non-adjacent $CH_2$ groups to be replaced, in each case independently from one another, by
—C≡C—, —O—, —S—, —NH—, —N(CH$_3$)—, —CO—, —COO—, —OCO—, —OCO—O—, —S—CO— or —CO—S— in such a manner that oxygen atoms are not linked directly to one another, or aryl or heteroaryl as defined above, being different from $Q^1$ or $Q^3$,
$Q^3$ is F, Cl, Br, CN or alkyl, alkoxy, aryl or heteroaryl as defined for $Q^2$ but being different from $Q^2$ or $Q^1$,
In case $Q^1$ in formula II is an alkylene-oxy group, the O atom is preferably adjacent to the chiral C atom.

Preferred chiral groups of formula II are 2-alkyl, 2-alkoxy, 2-methylalkyl, 2-methylalkoxy, 2-fluoroalkyl, 2-fluoroalkoxy, 2-(2-ethin)-alkyl, 2-(2-ethin)-alkoxy, 1,1,1-trifluoro-2-alkyl and 1,1,1-trifluoro-2-alkoxy.

Particularly preferred chiral groups are 2-butyl(=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

In addition, compounds containing an achiral branched group $R^1$ or $R^2$ may occasionally be of importance, for example, due to a reduction in the tendency towards crystallization. Branched groups of this type generally do not contain more than one chain branch. Preferred achiral branched groups are isopropyl, isobutyl(=methylpropyl), isopentyl(=3-methylbutyl), isopropoxy, 2-methyl-propoxy and 3-methylbutoxy.

The polymerisable group P is a group that is capable of participating in a polymerisation reaction, like radical or ionic chain polymerisation, polyaddition or polycondensation, or capable of being grafted, for example by condensation or addition, to a polymer backbone in a polymer analogous reaction. Especially preferred are polymerisable groups for chain polymerisation reactions, like radical, cationic or anionic polymerisation. Very preferred are polymerisable groups comprising a C—C double or triple bond, and polymerisable groups capable of polymerisation by a ring-opening reaction, like oxetanes or epoxides.

Very preferably the polymerisable group P is selected from $CH_2$=$CW^1$—COO—, $CH_2$=$CW^1$—CO—,

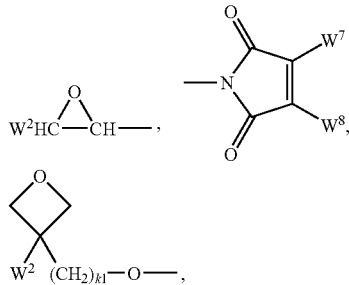

$CH_2$=$CW^2$—(O)$_{k1}$—, $CH_3$—CH=CH—O—, $(CH_2$=CH)$_2$CH—OCO—, $(CH_2$=CH—CH$_2$)$_2$CH—OCO—, $(CH_2$=CH)$_2$CH—O—, $(CH_2$=CH—CH$_2$)$_2$N—, $(CH_2$=CH—CH$_2$)$_2$N—CO—, HO—CW$^2$W$^3$—, HS—CW$^2$W$^3$—, HW$^2$N—, HO—CW$^2$W$^3$—NH—, $CH_2$=CW$^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH—, HOOC—, OCN—, and W$^4$W$^5$W$^6$Si—, with W$^1$ being H, F, Cl, CN, CF$_3$, phenyl or alkyl with 1 to 5 C-atoms, in particular H, C$_1$ or CH$_3$, W$^2$ and W$^3$ being independently of each other H or alkyl with 1 to 5 C-atoms, in particular H, methyl, ethyl or n-propyl, W$^4$, W$^5$ and W$^6$ being independently of each other Cl, oxaalkyl or oxacarbonylalkyl with 1 to 5 C-atoms, W$^7$ and W$^8$ being independently of each other H, Cl or alkyl with 1 to 5 C-atoms, Phe being 1,4-phenylene that is optionally substituted by one or more groups L as defined above, and $k_1$ and $k_2$ being independently of each other 0 or 1.

Especially preferred groups P are $CH_2$=CH—COO—,

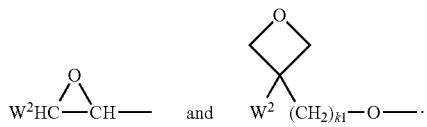

Especially preferably Pg is a vinyl group, an acrylate group, a methacrylate group, an oxetane group or an epoxy group, especially preferably an acrylate or methacrylate group.

Very preferred are acrylate and oxetane groups. Oxetanes produce less shrinkage upon polymerisation (cross-linking), which results in less stress development within films, leading to higher retention of ordering and fewer defects. Oxetane cross-linking also requires a cationic initiator, which unlike a free radical initiator is inert to oxygen.

Oxetanes have an advantage with respect to shrinkage. They are particularly useful for the formation of optical films.

As for the spacer group all groups can be used that are known for this purpose to the skilled in the art.

The spacer group Sp is preferably of formula Sp'-X', such that P-Sp is P-Sp'-X'—, wherein
Sp' is alkylene with 1 to 20 C atoms, preferably 1 to 12 C-atoms, which is optionally mono- or polysubstituted by F, Cl, Br, I or CN, and wherein one or more non-adjacent $CH_2$ groups are optionally replaced, in each case independently from one another, by —O—, —S—, —NH—, —NR$^o$—, —SiR$^o$R$^{oo}$—, —CO—, —COO—, —OCO—, —OCO—O—, —S—CO—, —CO—S—, —NR$^o$—CO—O—, —O—CO—NR$^o$—, —NR$^o$—CO—NR$^o$—, —CH=CH— or —C≡C— in such a manner that O and/or S atoms are not linked directly to one another, X' is —O—, —S—, —CO—, —COO—, —OCO—, —O—COO—, —CO—NR$^o$—, —NR$^o$—CO—, —NR$^o$—CO—NR$^o$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^o$—, —CY$^1$=CY$^2$—, —C≡C—, —CH=CH—COO—, —OCO—CH=CH— or a single bond, R$^o$ and R$^{oo}$ are independently of each other H or alkyl with 1 to 12 C-atoms, and Y$^1$ and Y$^2$ are independently of each other H, F, Cl or CN.

X' is preferably —O—, —S—CO—, —COO—, —OCO—, —O—COO—, —CO—NR$^o$—, —NR$^o$—CO—, —NR$^o$—CO—NR$^o$— or a single bond.

Typical groups Sp' are, for example, —(CH$_2$)$_p$—, —(CH$_2$CH$_2$O)$_q$—CH$_2$CH$_2$—, —CH$_2$CH$_2$—S—CH$_2$CH$_2$— or —CH$_2$CH$_2$—NH—CH$_2$CH$_2$— or —(SiR$^o$R$^{oo}$—O)$_p$—, with p being an integer from 2 to 12, q being an integer from 1 to 3 and R$^o$ and R$^{oo}$ having the meanings given above.

Preferred groups Sp' are ethylene, propylene, butylene, pentylene, hexylene, heptylene, octylene, nonylene, decylene, undecylene, dodecylene, octadecylene, 2,2-dimethylpropylene, ethyleneoxyethylene, methyleneoxy-butylene, ethylene-thioethylene, ethylene-N-methyl-iminoethylene, 1-methylalkylene, ethenylene, propenylene and butenylene for example.

Sp and Sp' can be an achiral or a chiral group. In a preferred embodiment Sp or Sp' is a chiral group. Chiral groups Sp' are very preferably selected of formula III:

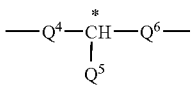

wherein

Q$^4$ is an alkylene or alkylene-oxy group with 1 to 9 C atoms or a single bond, Q$^5$ is an alkyl or alkoxy group with 1 to 10 C atoms which may be unsubstituted, mono- or polysubstituted by F, Cl, Br or CN, it being also possible for one or more non-adjacent CH$_2$ groups to be replaced, in each case independently from one another, by —C≡C—, —O—, —S—, —NH—, —N(CH$_3$)—, —CO—, —COO—, —OCO—, —OCO—O—, —S—CO— or —CO—S— in such a manner that oxygen atoms are not linked directly to one another, Q$^6$ is an alkylene or alkylene-oxy group with 1 to 10 C atoms or a single bond, being different from Q$^4$, with Q$^4$ being linked to the polymerisable group P.

Further preferred are compounds with one or two groups P-Sp-wherein Sp is a single bond. In case of compounds with two groups P-Sp-, each of the two polymerisable groups P and the two spacer groups Sp can be identical or different.

Particularly preferred compounds of formula I are those of the following formulae IA to ID

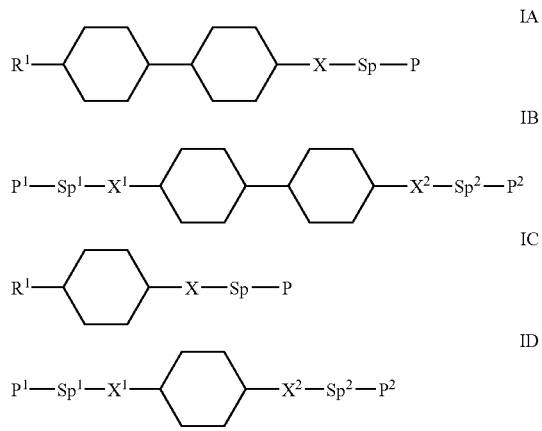

wherein the parameters have the respective meanings given above and the cyclohexylene ring in formulae IC and ID and the cyclohexylene rings in formulae IA and IB independently of each other, may be further substituted and preferably are not further substituted and are preferably in the trans conformation, though cis conformation is also possible, P$^1$ and P$^2$ independently of each other have the meaning given for P above, Sp, Sp$^1$ and Sp$^2$ independently of each other have the meaning given for Sp' above and X, X$^1$ and X$^2$ independently of each other have the meaning given for X' above, and preferably R$^1$ is alkyl, P, P$^1$ and P$^2$ independently of each other are a polymerisable group, preferably acrylate or methacrylate and most preferably (meth)acrylate, Sp, Sp$^1$ and Sp$^2$ independently of each other are an alkylene diradical, in which one CH$_2$-group or, if available, more non-adjacent CH$_2$-groups, may be replaced by O and which can be substituted with halogen and may be branched and can be chiral or achiral and may be branched and can be chiral or achiral and X, X$^1$ and X$^2$ independently of each other are a single bond —CH$_2$—, —CO—O—, —O—CO—, —O—, —CF$_2$—O—, —O—CF$_2$—, and preferably for formulae IA, IC and ID —CO—O— and for formula IB,

—CH$_2$—, and, further preferably, in formulae IB and ID the elements of the three respective pairs (P$^1$ and P$^2$), (Sp$^1$ and Sp$^2$) and (X$^1$ and X$^2$) are mutually identical to each other.

Particularly preferred compounds of formula IA are those of the following formulae IA-1 to IA-5

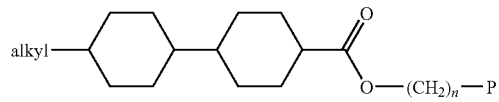

-continued

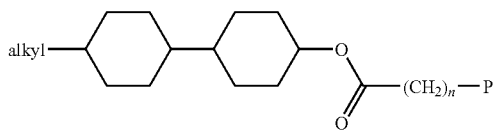
IA-2

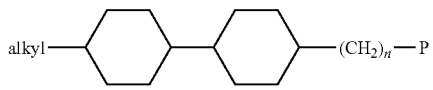
IA-3

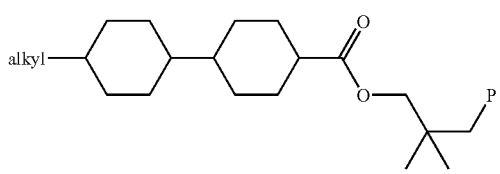
IA-4

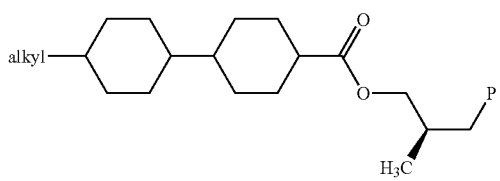
IA-5 wherein the parameters have the respective meanings given above and the compounds of formula IA5 may be present in one of their respective chiral configurations or as a mixture thereof with an enantiomeric excess or as a racemate, n is an integer from 1 to 12 and preferably from 3 to 6,
P is methacrylate or acrylate, alkyl is propyl, pentyl and
the cyclohexyl rings are in the trans, trans conformation.

Particularly preferred compounds of formula IB are those of the following formulae IB-1 to IB-3

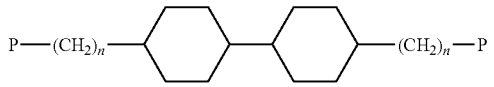
IB-1

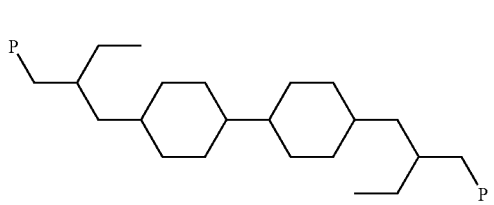
IB-2

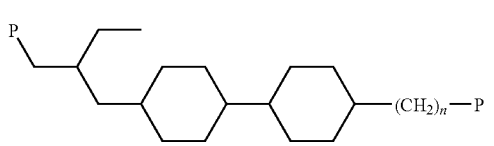
IB-3 wherein the parameters have the respective meanings given above and n is an integer from 1 to 12 and preferably from 3 to 6,
preferably the cyclohexyl rings are in the trans, trans conformation.

Particularly preferred compounds of formula IC are those of the following formulae IC-1 to IC-3

IC-1

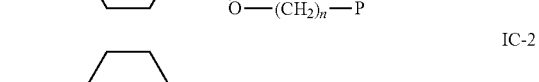
IC-2

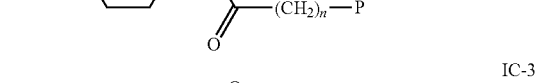
IC-3 wherein the parameters have the respective meanings given above and n is an integer from 1 to 12 and preferably from 3 to 6,
P is methacrylate or acrylate and
the cyclohexyl ring is in the trans conformation.

Particularly preferred compounds of formula ID are those of the following formulae ID-1 to ID-4

ID-1

ID-2

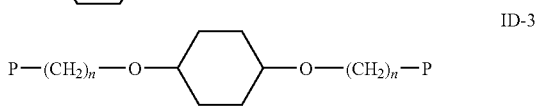
ID-3

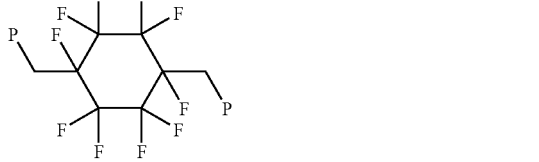
ID-4 wherein the parameters have the respective meanings given above and n is an integer from 0 to 12 and preferably from 2 to 6.

The compounds of formula ID may be, and in a preferred embodiment it is, a mixture of cis and trans isomers.

In the above-mentioned preferred formulae -Sp-P is preferably —COO-alkylene-P or —O-alkylene-P, wherein "alkylene" is straight-chain or branched alkylene, preferably with 1 to 12, very preferably 2 to 8 C-atoms, and which is optionally fluorinated but preferably non-fluorinated.

R in these preferred formulae is very preferably straight-chain or branched alkyl, preferably with 1 to 12, very preferably 2 to 8 C-atoms, and is optionally fluorinated but preferably non-fluorinated.

P in these preferred formulae is very preferably acrylate (i.e. —O—CO—CH=CH$_2$) or methacrylate (i.e. —O—CO—C(CH$_3$)=CH$_2$).

The compounds of formula I can be synthesized according to or in analogy to methods which are known per se and which are described in the literature and in standard works of organic chemistry such as, for example, Houben-Weyl, Methoden der organischen Chemie, Thieme-Verlag, Stuttgart. A suitable method of synthesis is shown below. Preferably they are obtained according to the following reaction schemes (Schemes 1 to 10), in which R has the meaning given for R$^1$ above and n is as defined.

Scheme 1: Preparation of 4'-alkyl-bicyclohexyl-4-carboxylic acid n-(2-methyl-acryloyloxy)-alkyl esters

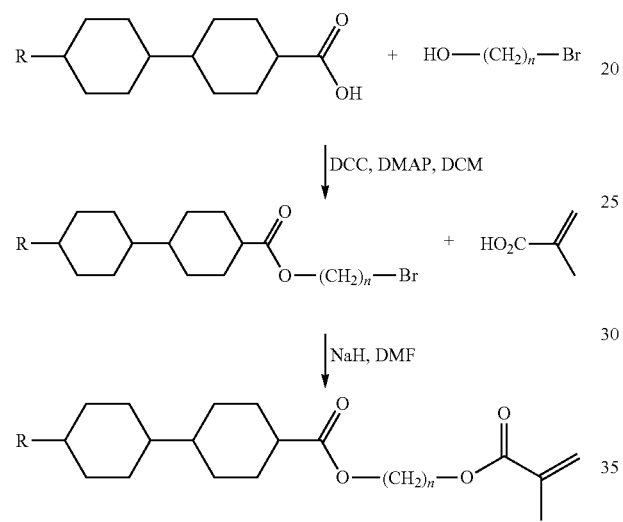

wherein R has the meaning given for R$^1$ above and n is as defined above and preferably n is 1 to 12

Scheme 2: Preparation of 4'-Alkyl-bicyclohexyl-4-carboxylic acid 3-acryloyloxy-alkyl esters

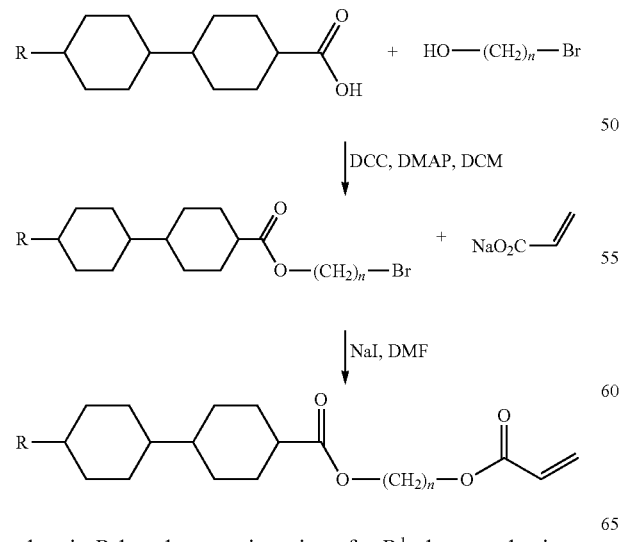

wherein R has the meaning given for R$^1$ above and n is as defined above and preferably R is alkyl and n is 1 to 12.

Scheme 3: Preparation of 6-Acryloyloxy-alkanoic acid 4'-alkyl-bicyclohexyl-4-yl esters

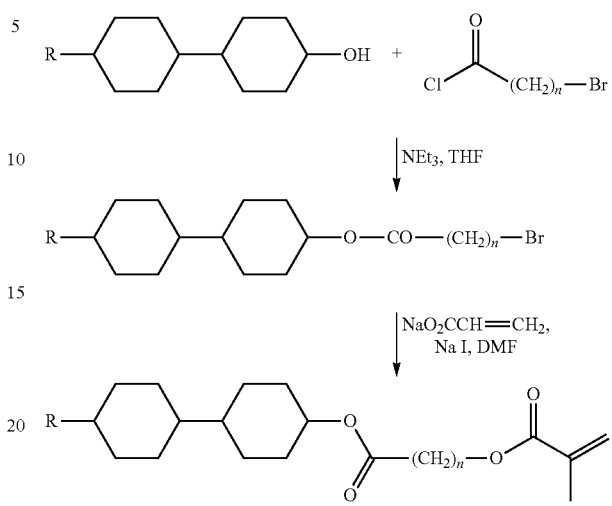

wherein R has the meaning given for R$^1$ above and n is as defined above and preferably R is alkyl and n is 1 to 12.

Scheme 4: Preparation of 2-Methyl-acrylic acid 5-(4'-alkyl-bicyclohexyl-4-yl)-alkyl esters

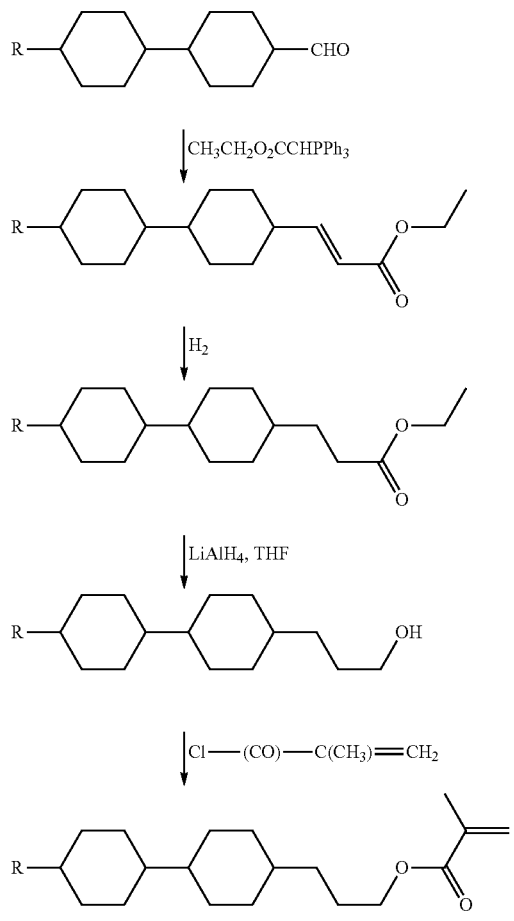

wherein R has the meaning given for $R^1$ above and preferably is alkyl.

Scheme 5: Preparation of Acrylic acid 3-[4'-(3-acryloyloxy-alkyl)-bicyclohexyl-4-yl]-alkyl ester

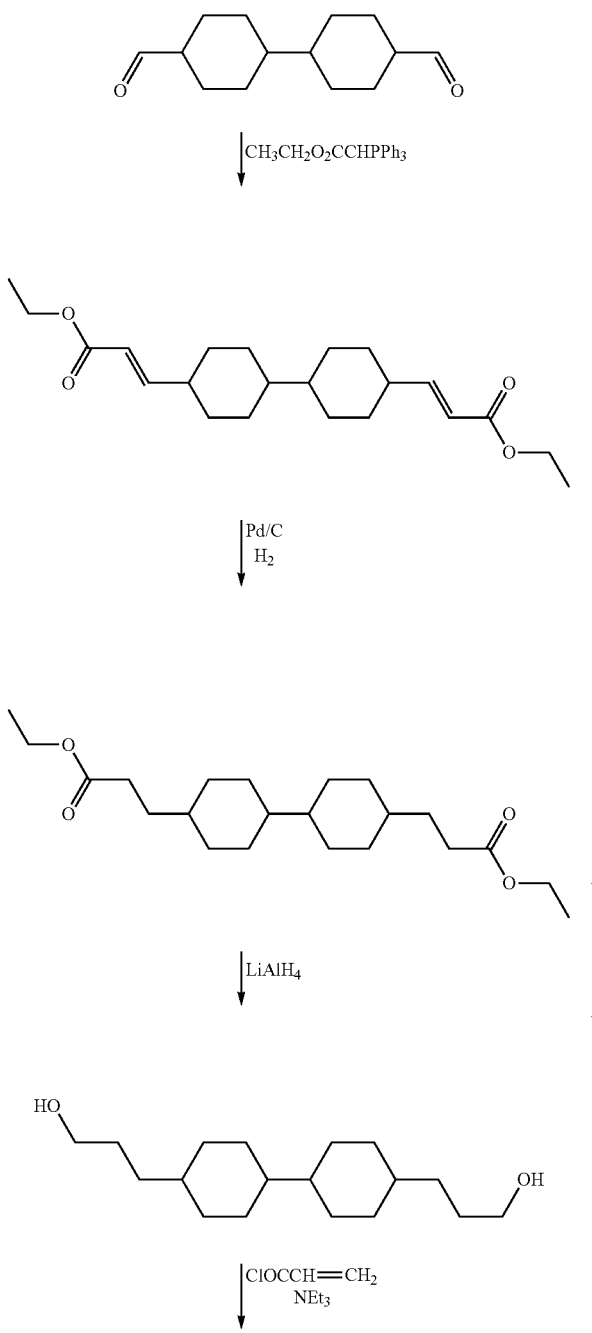

Scheme 6: Preparation of 4-Alkyl-cyclohexanecarboxylic acid 4-acryloyloxy-alkyl esters

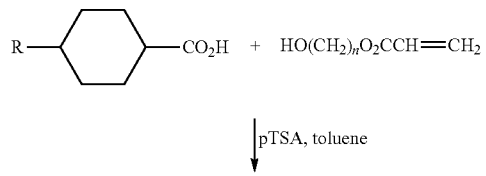

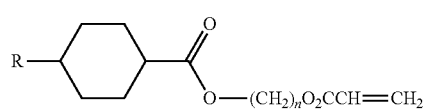

wherein R has the meaning given for $R^1$ above and n is as defined above and preferably R is alkyl and n is 1 to 12.

Scheme 7: 4-Alkyl-cyclohexanecarboxylic acid 4-(2-methyl-acryloyloxy)-alkyl ester

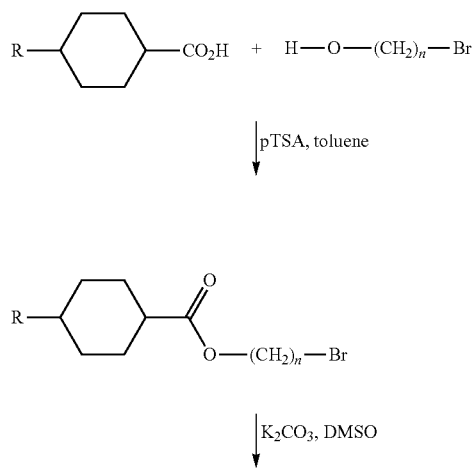

wherein R has the meaning given for $R^1$ above and n is as defined above and preferably R is alkyl and n is 1 to 12.

A preferred synthetic scheme for the preparation of acrylic acid ω-(4'-alkyl-bicyclohexyl-4-yl)-alkyl esters is given in scheme 8. As key intermediates cyclohexylcarbaldehydes are chosen, which are common building blocks easily available as pure trans isomers. Suitably functionalised spacer groups can be introduced e.g. via Wittig reactions using commercially available Wittig reagents.

Scheme 8: Synthesis of various alcohols from cyclohexane carbaldehydes

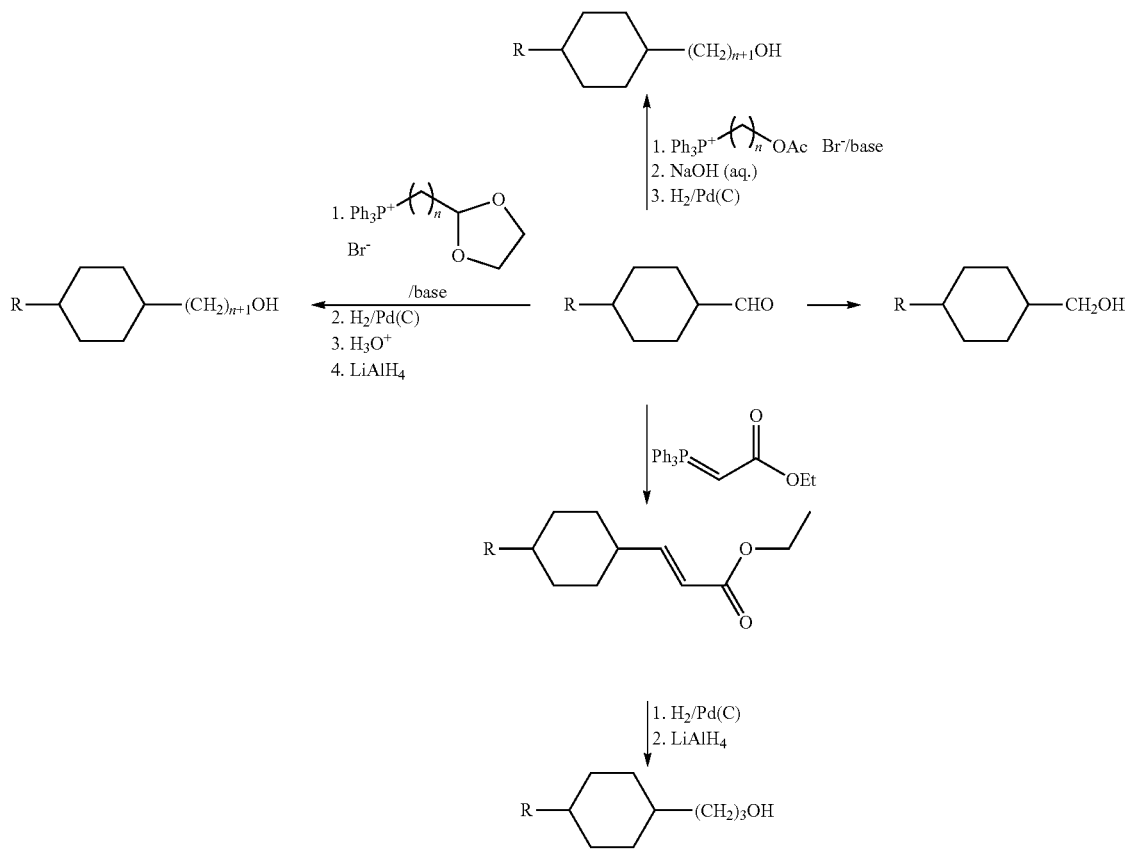

wherein R has the meaning given for $R^1$ above and preferably is alkyl.

From the alcohols prepared as described in scheme 8 the corresponding acrylates are obtained following standard procedures such as reaction with acrylic chloride in the presence of a base (pyridine, triethylamine) or reaction with acrylic acid in the presence of dicyclohexylcarbodiimid, etc. (compare scheme 9).

Scheme 9: Synthesis of Acrylates and Methacrylates

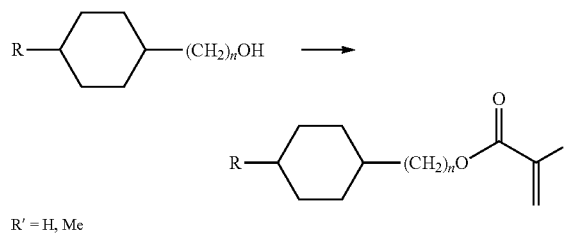

R' = H, Me wherein R has the meaning given for $R^1$ above and preferably is alkyl and R' is H or methyl.

Suitably substituted Wittig reagents lead to compounds with branched spacer groups.

Obviously compounds with two cycloheylene moieties are obtainable analoguosly.

As shown for monoaldeydes in schemes 8 and 9 above, dialdehydes yield diacrylates using the same chemical transformations. (see also scheme 5).

Monoprotection leads to unsymmetrically substituted compounds. This is illustrated in scheme 10.

Scheme 10: Synthesis of Diacrylates

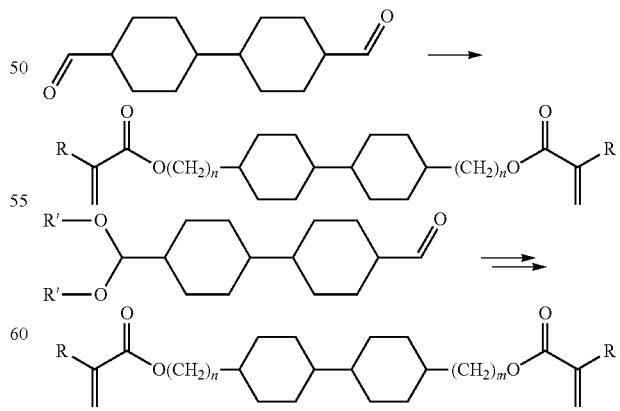

wherein R has the meaning given for $R^1$ above and preferably is H or methyl, R' is alkyl or ω-alkanediyl and n and m independently of each other are integers from 1 to 12.

The compounds of formula I are especially suitable for use in displays comprising a chiral liquid crystalline medium operating in the isotropic or blue phase as described in DE 103 13 979 A1 or the corresponding applications WO 04/046805 A1 and US 2006/0,050,354 A1.

Thus, another aspect of the invention is a liquid crystalline medium having a blue phase and comprising at least one compound of formula I. Yet another aspect of the invention is an LCD comprising such a liquid liquid crystalline medium.

Such a liquid crystalline medium comprises preferably 0.1 to 20%, very preferably 0.5 to 15% and most preferably 1 to 8% by weight of compounds of formula I. Preferably it comprises 1, 2 or 3 compounds of formula I.

LC host mixtures exhibiting a blue phase and display configurations for utilising these mixtures, which are suitable for use in the present invention, are disclosed in DE 103 13 979 A1, WO 04/046805 A1 and US 2006/0,050,354 A1, the entire disclosures of which are incorporated into this application by reference.

In a preferred embodiment of the present invention the liquid crystalline medium is consisting of 2 to 25, preferably 3 to 15 compounds, at least one of which is a chiral compound of formula I. The other compounds are preferably low molecular weight liquid crystalline compounds selected from nematic or nematogenic substances, for example from the known classes of the azoxybenzenes, benzylidene-anilines, biphenyls, terphenyls, phenyl or cyclohexyl benzoates, phenyl or cyclohexyl esters of cyclohehexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenylcyclohexanes, cyclohexyl-biphenyls, phenylcyclohexylcyclohexanes, cyclohexylcyclohexanes, cyclohexylcyclohexenes, cyclohexylcyclohexylcyclohexenes, 1,4-bis-cyclohexylbenzenes, 4,4'-bis-cyclohexylbiphenyls, phenyl- or cyclo-hexylpyrimidines, phenyl- or cyclohexylpyridines, phenyl- or cyclo-hexylpyridazines, phenyl- or cyclohexyl-dioxanes, phenyl- or cyclo-hexyl-1,3-dithianes, 1,2-diphenyl-ethanes, 1,2-dicyclohexylethanes, 1-phenyl-2-cyclohexylethanes, 1-cyclohexyl-2-(4-phenylcyclohexyl)-ethanes, 1-cyclohexyl-2-biphenyl-ethanes, 1-phenyl2-cyclohexyl-phenylethanes, optionally halogenated stilbenes, benzyl phenyl ether, tolanes, substituted cinnamic acids and further classes of nematic or nematogenic substances. The 1,4-phenylene groups in these compounds may also be laterally mono- or difluorinated. The liquid crystalline mixture is preferably based on achiral compounds of this type.

The most important compounds that can be used as components of the liquid crystalline mixture can be characterized by the following formula

R'-L'-G'-E-R'' wherein L' and E, which may be identical or different, are in each case, independently from one another, a bivalent radical from the group formed by -Phe-, -Cyc-, -Phe-Phe-, -Phe-Phe-Phe-, -Phe-Cyc-, -Cyc-Cyc-, -Pyr-, -Dio-, -Pan-, —B-Phe-, —B-Phe-Phe- and —B-Cyc- and their mirror images, where Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl, Pan is pyrane-2,5-diyl and B is 2-(trans-1,4-cyclohexyl)ethyl, pyrimidine-2,5-diyl, pyridine-2,5-diyl, 1,3-dioxane-2,5-diyl, or pyrane-2,5-diyl.

G' in these compounds is selected from the following bivalent groups and their mirror images:
—CH=CH—, —CH=CY—, —CY=CY—, —C≡C—, —CH$_2$—CH$_2$—, —CF$_2$O—, —CH$_2$—O—, —CH$_2$—S—, —CO—O—, —CO—S— or a single bond, with Y being halogen, preferably F, or —CN.

R' and R'' are, in each case, independently of one another, alkyl, alkenyl, alkoxy, alkenyloxy, alkanoyloxy, alkoxycarbonyl or alkoxycarbonyloxy with 1 to 18, preferably 3 to 12 C atoms, or alternatively one of R' and R'' is F, CF$_3$, OCF$_3$, Cl, NCS or CN.

In most of these compounds R' and R'' are, in each case, independently of each another, alkyl, alkenyl or alkoxy with different chain length, wherein the sum of C atoms in nematic media generally is between 2 and 9, preferably between 2 and 7.

Many of these compounds or mixtures thereof are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here.

Suitable and preferred host mixtures are disclosed for example in WO 2005/019381 A1 and US 2006/0,061,699 A1 and the above-mentioned US 2006/0,050,354 A1, the entire disclosure of which is incorporated into this application by reference.

In addition to the compounds of formula I the liquid crystalline medium may comprise one or more further RMs. The amount of the additional RMs is preferably 0.1 to 20%, very preferably 0.5 to 15% and most preferably 5 to 15% by weight (referring to the total amount of solid compounds in the medium). Preferably the liquid crystalline medium comprises 1, 2 or 3 additional RMs.

The additional RMs are preferably calamitic monomers. These materials typically have good optical properties, like reduced chromaticity, and can be easily and quickly aligned into the desired orientation, which is especially important for the industrial production of polymer films at large scale. It is also possible that the polymerisable material comprises one or more discotic monomers. Very preferably the additional RMs are selected from the following formulae:

P-Sp-MG-R      IVa

P-Sp-MG-Sp-P      IVb wherein P, Sp and R have the meanings given in formula I and MG is a rod-like core that is optionally chiral.

MG is preferably selected of formula V

-(A$^1$-Z$^1$)$_m$-A$^2$-      V wherein

A$^1$ and A$^2$ are, in case of multiple occurrence independently of one another, an aromatic or alicyclic group, which optionally contains one or more heteroatoms selected from N, O and S, and is optionally mono- or polysubstituted by L as defined above, Z$^1$ in case of multiple occurrence independently of one another denotes —O—, —S—, —CO—, —COO—, —OCO—, —S—CO—, —CO—S—, —O—OCO—, —CO—NR$^0$—, —NR$^0$—CO—, —NR$^0$—CO—NR$^{00}$, —NR$^0$—CO—O—, —O—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH═N—, —N═CH—, —N═N—, —CH═CR$^0$—, —CY$^1$═CY$^2$—, —C≡C—, —CH═CH—COO—, —OCO—CH═CH— or a single bond, R$^0$ and R$^{00}$ independently of each other denote H or alkyl with 1 to 12 C-atoms, Y$^1$ and Y$^2$ independently of each other denote H, F, Cl or CN, m is 0, 1, 2, 3 or 4.

Preferred groups A$^1$ and A$^2$ include, without limitation, furan, pyrrol, thiophene, oxazole, thiazole, thiadiazole, imidazole, phenylene, cyclohexylene, bicyclooctylene, cyclohexenylene, pyridine, pyrimidine, pyrazine, azulene, indane, naphthalene, tetrahydronaphthalene, anthracene and phenanthrene, all of which are optionally substituted by one or more groups L.

Particular preferred groups A$^1$ and A$^2$ are selected from 1,4-phenylene, pyridine-2,5-diyl, pyrimidine-2,5-diyl, thiophene-2,5-diyl, naphthalene-2,6-diyl, 1,2,3,4-tetrahydro-naphthalene-2,6-diyl, indane-2,5-diyl, bicyclooctylene or 1,4-cyclohexylene wherein one or two non-adjacent CH$_2$ groups are optionally replaced by O and/or S, wherein these groups are unsubstituted, mono- or polysubstituted by L as defined above.

Preferred groups R, P and Sp are those listed above.

Another aspect of the invention is a polymerisable material comprising one or more compounds of formula I and one or more additional RMs, which are preferably selected from mono- and direactive RMs as described above.

The additional RMs can be prepared by methods which are known per se and which are described in standard works of organic chemistry like for example Houben-Weyl, Methoden der organischen Chemie, Thieme-Verlag, Stuttgart. Suitable RMs are disclosed for example in WO 93/22397, EP 0,261, 712, DE 195 04 224, WO 95/22586, WO 97/00600, U.S. Pat. No. 5,518,652, U.S. Pat. No. 5,750,051, U.S. Pat. No. 5,770, 107 and U.S. Pat. No. 6,514,578. Examples of particularly suitable and preferred RMs are shown in the following list.

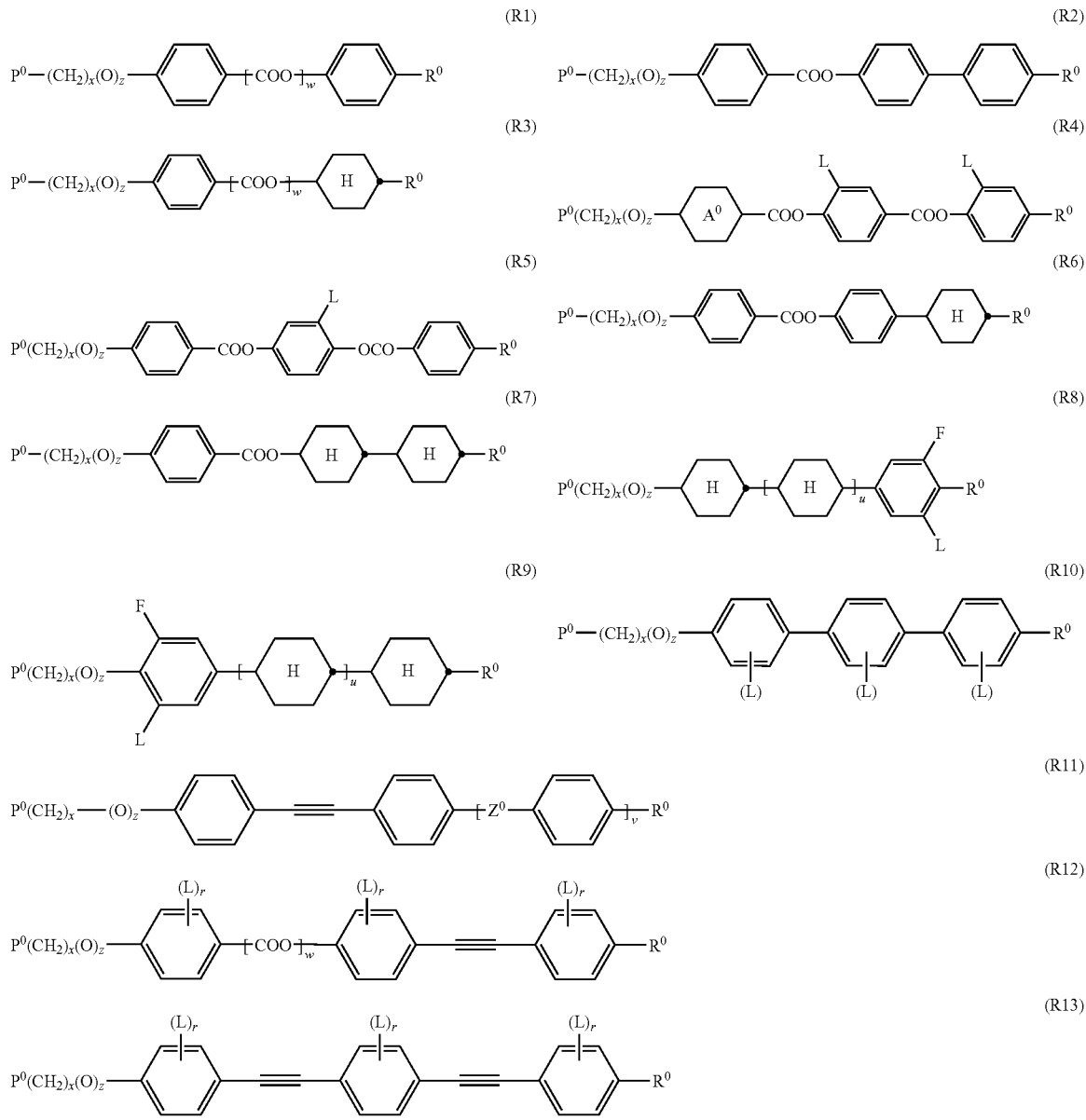

-continued
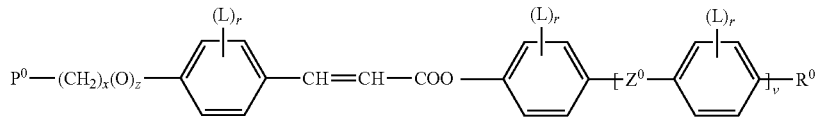
(R14)
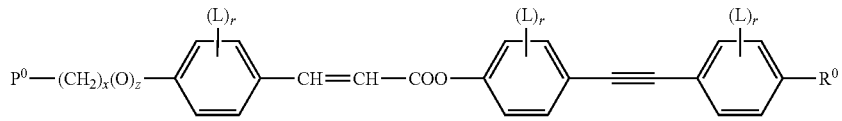
(R15)
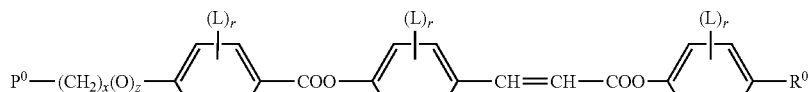
(R16)
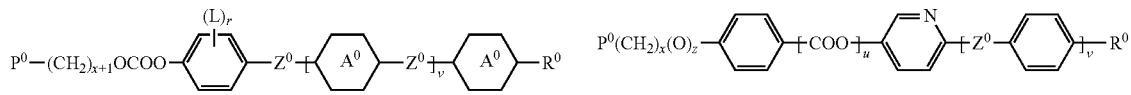
(R17) (R18)
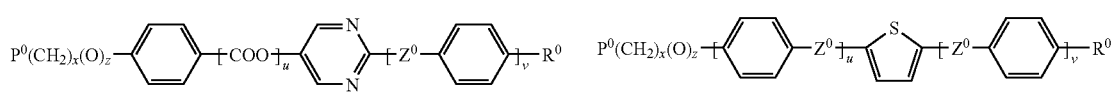
(R19) (R20)
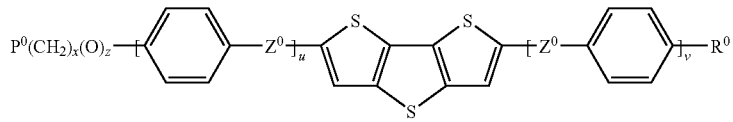
(R21)
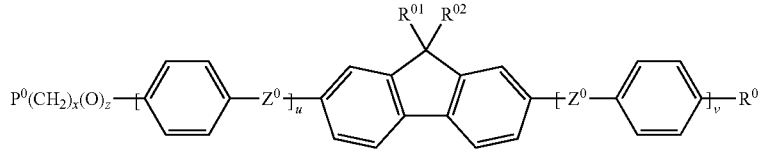
(R22)
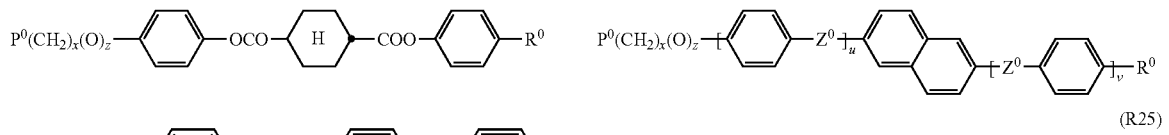
(R23) (R24)
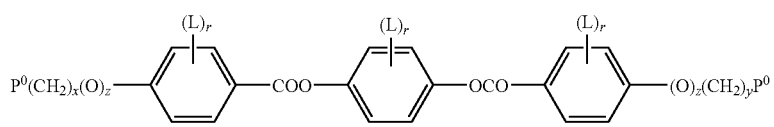
(R25)
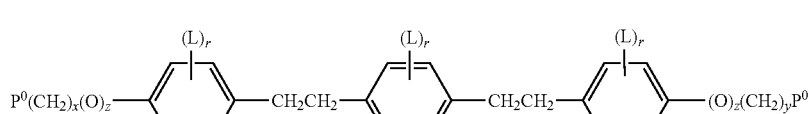
(R26)
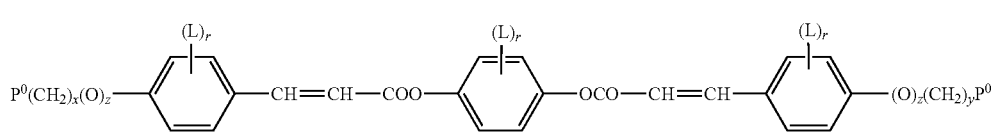
(R27)
(R28)

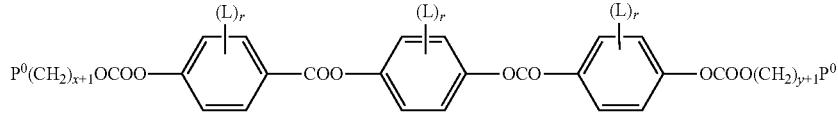
(R29)
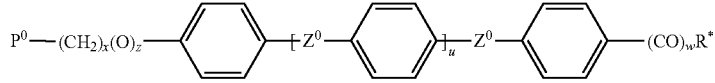
(R30)
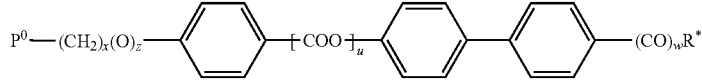
(R31)
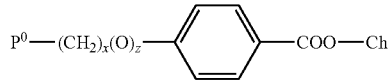
(R32)
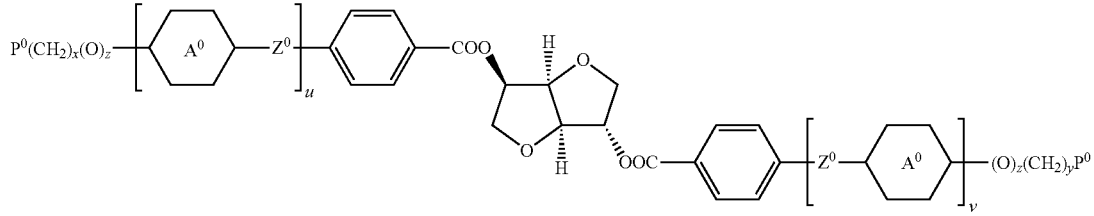
(R33)
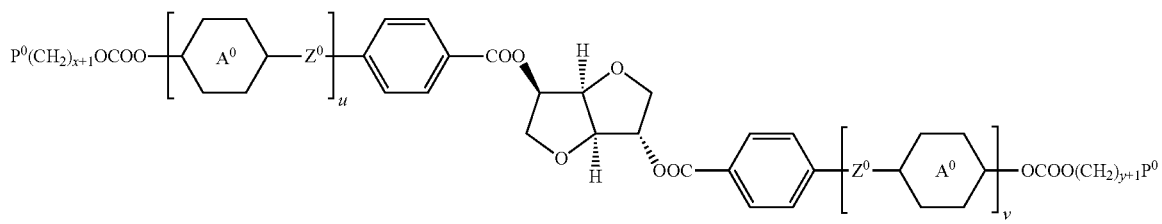
(R34)
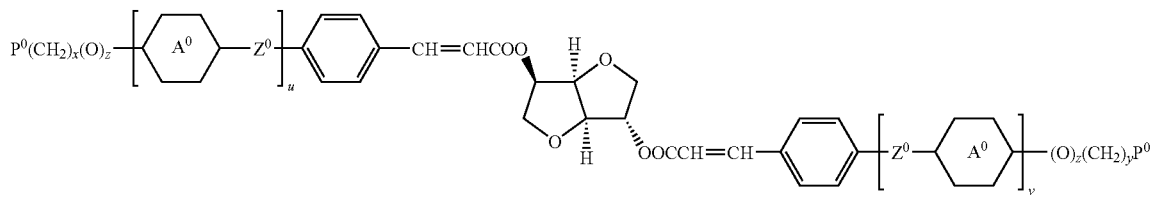
(R35)
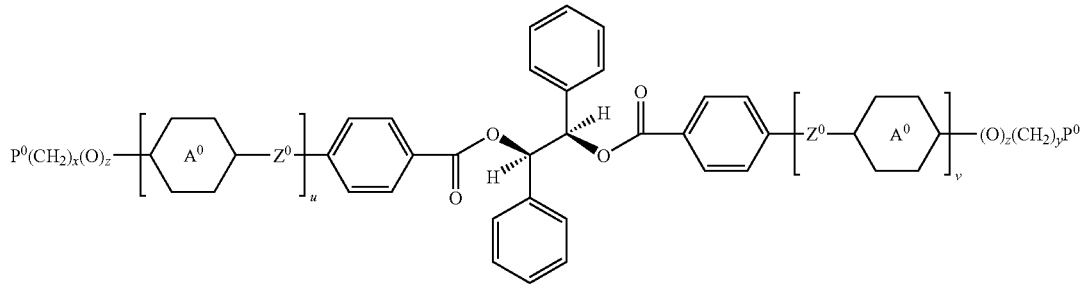
(R36)
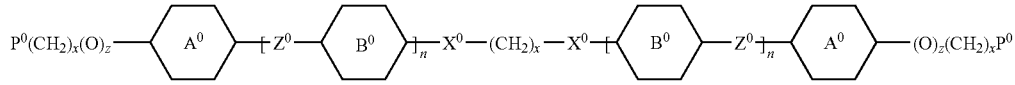
(R37)

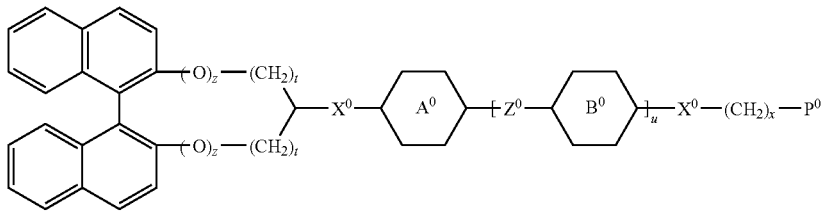
(R38)

wherein

P⁰ is, in case of multiple occurrence independently of one another, a polymerisable group, preferably an acryl, methacryl, oxetane, epoxy, vinyl, vinyloxy, propenyl ether or styrene group, A⁰ and B⁰ are, in case of multiple occurrence independently of one another, 1,4-phenylene that is optionally substituted with 1, 2, 3 or 4 groups L, or trans-1,4-cyclohexylene, Z⁰ is, in case of multiple occurrence independently of one another,
—COO—, —OCO—, —CH$_2$CH$_2$—, —C≡C—, —CH═CH—, —CH═CH—COO—, —OCO—CH═CH— or a single bond, R⁰ is alkyl, alkoxy, thioalkyl, alkylcarbonyl, alkoxycarbonyl, alkylcarbonyloxy or alkoxycarbonyloxy with 1 or more, preferably 1 to 15 C atoms which is optionally fluorinated, or is Y⁰ or P—(CH$_2$)$_y$—(O)$_z$—, Y⁰ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms, R⁰¹ and R² are independently of each other H, R⁰ or Y⁰, R* is a chiral alkyl or alkoxy group with 4 or more, preferably 4 to 12 C atoms, like 2-methylbutyl, 2-methyloctyl, 2-methylbutoxy or 2-methyloctoxy, Ch is a chiral group selected from cholesteryl, estradiol, or terpenoid radicals like menthyl or citronellyl, L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4, t is, in case of multiple occurrence independently of one another, 0, 1, 2 or 3, u and v are independently of each other 0, 1 or 2, w is 0 or 1, x and y are independently of each other 0 or identical or different integers from 1 to 12, z is 0 or 1, with z being 0 if the adjacent x or y is 0, and wherein the benzene and napthalene rings can additionally be substituted with one or more identical or different groups L.

In addition or alternatively to the compounds of formula I, the liquid crystalline media and the polymerisable materials according to the present invention may comprise one or more polymerisable or non-polymerisable chiral compounds.

Suitable non-polymerisable chiral compounds are for example standard chiral dopants like R- or S-811, R- or S-1011, R- or S-2011, R- or S-3011, R- or S-4011, R- or S-5011, or CB 15 (all available from Merck KGaA, Darmstadt, Germany), sorbitols as described in WO 98/00428, hydrobenzoins as described in GB 2,328,207, chiral binaphthols as described in WO 02/94805, chiral binaphthol acetals as described in WO 02/34739, chiral TADDOLs as described in WO 02/06265, or chiral compounds having fluorinated linkage groups as described in WO 02/06196 or WO 02/06195. Suitable polymerisable chiral compounds are for example those listed above, or the polymerisable chiral material Paliocolor® LC756 (from BASF AG, Ludwigshafen, Germany).

In addition to the applications mentioned above, the compounds of formula I can also be used in liquid crystalline mixtures for other LCDs exhibiting a twisted structure like, for example, twisted or supertwisted nematic (TN, STN) displays with multiplex or active matrix addressing, or in cholesteric displays like surface stabilized or polymer stabilized cholesteric texture displays (SSCT, PSCT) as described in WO 92/19695, WO 93/23496, U.S. Pat. No. 5,453,863 or U.S. Pat. No. 5,493,430, for LCDs with variable pitch, like multi-domain LCDs as described in WO 98/57223, or multi-colour cholesteric displays as described in U.S. Pat. No. 5,668,614. They can also be used in flexoelectric displays as described for example in GB 2,356,629.

The inventive compounds of formula I are also suitable for use in thermochromic or photochromic liquid crystalline media, which change their colour upon temperature change or photoirradiation, respectively.

Another preferred use of the compounds of formula I is the preparation of polymerisable liquid crystalline mixtures, anisotropic polymer gels and anisotropic polymer films. If the compounds of formula I are used in a mixture comprising chiral compounds, or if the compounds of formula I themselves are chiral, polymer films can be prepared that exhibit a helically twisted molecular structure with uniform planar orientation, i.e. wherein the helical axis is oriented perpendicular to the plane of the film, like oriented cholesteric films. Anisotropic polymer gels and displays comprising them are disclosed for example in DE 195 04 224 and GB 2279 659. Oriented cholesteric polymer films can be used for example as broadband reflective polarisers, colour filters, security markings, or for the preparation of liquid crystalline pigments.

The general preparation of polymer liquid crystalline films according to this invention is known to the ordinary expert and described in the literature. Typically a polymerisable liquid crystalline material is coated or otherwise applied onto a substrate where it aligns into uniform orientation, and polymerised in situ in its liquid crystalline phase at a selected temperature for example by exposure to heat or actinic radiation, preferably by photo-polymerisation, very preferably by UV-photopolymerisation, to fix the alignment of the molecules of the liquid crystalline phases. If necessary, uniform alignment can promoted by additional means like shearing or annealing the liquid crystalline material, surface treatment of the substrate, or adding surfactants to the liquid crystalline material.

As substrate for example glass or quartz sheets or plastic films can be used. It is also possible to put a second substrate on top of the coated material prior to and/or during and/or after polymerisation. The substrates can be removed after polymerisation or not. When using two substrates in case of curing by actinic radiation, at least one substrate has to be transmissive for the actinic radiation used for the polymerisation. Isotropic or birefringent substrates can be used. In case the substrate is not removed from the polymerised film after polymerisation, preferably isotropic substrates are used.

Suitable and preferred plastic substrates are for example films of polyester such as polyethyleneterephthalate (PET) or polyethylene-naphthalate (PEN), polyvinylalcohol (PVA), polycarbonate (PC) or triacetylcellulose (TAC), very preferably PET or TAC films. As birefringent substrates for example uniaxially stretched plastics film can be used. PET films are commercially available for example from DuPont Teijin Films under the trade name Melinex®.

The polymerisable material can be applied onto the substrate by conventional coating techniques like spin-coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

It is also possible to dissolve the polymerisable material in a suitable solvent. This solution is then coated or printed onto the substrate, for example by spin-coating or printing or other known techniques, and the solvent is evaporated off before polymerisation. In many cases it is suitable to heat the mixture in order to facilitate the evaporation of the solvent. As solvents for example standard organic solvents can be used. The solvents can be selected for example from ketones such as acetone, methyl ethyl ketone, methyl propyl ketone or cyclohexanone; acetates such as methyl, ethyl or butyl acetate or methyl acetoacetate; alcohols such as methanol, ethanol or isopropyl alcohol; aromatic solvents such as toluene or xylene; halogenated hydrocarbons such as di- or trichloromethane; glycols or their esters such as PGMEA (propyl glycol monomethyl ether acetate), butyrolactone, and the like. It is also possible to use binary, ternary or higher mixtures of the above solvents.

Initial alignment (e.g. planar alignment) of the polymerisable liquid crystalline material can be achieved for example by rubbing treatment of the substrate, by shearing the material during or after coating, by annealing the material before polymerisation, by application of an alignment layer, by applying a magnetic or electric field to the coated material, or by the addition of surface-active compounds to the material. Reviews of alignment techniques are given for example by I. Sage in "Thermotropic Liquid Crystals", edited by G. W. Gray, John Wiley & Sons, 1987, pages 75-77; and by T. Uchida and H. Seki in "Liquid Crystals—Applications and Uses Vol. 3", edited by B. Bahadur, World Scientific Publishing, Singapore 1992, pages 1-63. A review of alignment materials and techniques is given by J. Cognard, Mol. Cryst. Liq. Cryst. 78, Supplement 1 (1981), pages 1-77.

Especially preferred is a polymerisable material comprising one or more surfactants that promote a specific surface alignment of the molecules of the liquid crystalline phases. Suitable surfactants are described for example in J. Cognard, Mol.Cryst.Liq.Cryst. 78, Supplement 1, 1-77 (1981). Preferred aligning agents for planar alignment are for example non-ionic surfactants, preferably fluorocarbon surfactants such as the commercially available Fluorad FC-171® (from 3M Co.) or Zonyl FSN® (from DuPont), multiblock surfactants as described in GB 2,383,040 or polymerisable surfactants as described in EP 1 256 617.

It is also possible to apply an alignment layer onto the substrate and provide the polymerisable material onto this alignment layer. Suitable alignment layers are known in the art, like for example rubbed polyimide or alignment layers prepared by photoalignment as described in U.S. Pat. No. 5,602,661, U.S. Pat. No. 5,389,698 or U.S. Pat. No. 6,717,644.

It is also possible to induce or improve alignment by annealing the polymerisable liquid crystalline material at elevated temperature, preferably at its polymerisation temperature, prior to polymerisation.

Polymerisation is achieved for example by exposing the polymerisable material to heat or actinic radiation. Actinic radiation means irradiation with light, like UV light, IR light or visible light, irradiation with X-rays or gamma rays or irradiation with high energy particles, such as ions or electrons. Preferably polymerisation is carried out by UV irradiation. As a source for actinic radiation for example a single UV lamp or a set of UV lamps can be used. When using a high lamp power the curing time can be reduced. Another possible source for actinic radiation is a laser, like for example a UV, IR or visible laser.

Polymerisation is preferably carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. For polymerising acrylate or methacrylate groups preferably a radical photoinitiator is used. For polymerising vinyl, epoxide or oxetane groups preferably a cationic photoinitiator is used. It is also possible to use a thermal polymerisation initiator that decomposes when heated to produce free radicals or ions that start the polymerisation. Typical radical photoinitiators are for example the commercially available Irgacure® or Darocure® (Ciba Geigy AG, Basel, Switzerland). A typical cationic photoinitiator is for example UVI 6974 (Union Carbide).

The polymerisable material may also comprise one or more stabilizers or inhibitors to prevent undesired spontaneous polymerisation, like for example the commercially available Irganox® (Ciba Geigy AG, Basel, Switzerland).

The curing time depends, inter alia, on the reactivity of the polymerisable material, the thickness of the coated layer, the type of polymerisation initiator and the power of the UV lamp. The curing time is preferably $\leq 5$ minutes, very preferably $\leq 3$ minutes, most preferably $\leq 1$ minute. For mass production short curing times of $\leq 30$ seconds are preferred.

Preferably polymerisation is carried out in an inert gas atmosphere like nitrogen or argon.

The polymerisable material may also comprise one or more dyes having an absorption maximum adjusted to the wavelength of the radiation used for polymerisation, in particular UV dyes like e.g. 4,4"-azoxy anisole or Tinuvin® dyes (from Ciba AG, Basel, Switzerland).

In another preferred embodiment the polymerisable material comprises one or more monoreactive polymerisable non-mesogenic compounds, preferably in an amount of 0 to 50%, very preferably 0 to 20%. Typical examples are alkylacrylates or alkylmethacrylates.

In another preferred embodiment the polymerisable material comprises one or more di- or multireactive polymerisable non-mesogenic compounds, preferably in an amount of 0 to 50%, very preferably 0 to 20%, alternatively or in addition to the di- or multireactive polymerisable mesogenic compounds. Typical examples of direactive non-mesogenic compounds are alkyldiacrylates or alkyldimethacrylates with alkyl groups of 1 to 20 C atoms. Typical examples of multireactive non-mesogenic compounds are trimethylpropanetrimethacrylate or pentaerythritoltetraacrylate.

It is also possible to add one or more chain transfer agents to the polymerisable material in order to modify the physical properties of the polymer film. Especially preferred are thiol compounds, for example monofunctional thiols like dodecane thiol or multifunctional thiols like trimethylpropane tri (3-mercaptopropionate). Very preferred are mesogenic or liquid crystalline thiols as disclosed for example in WO 96/12209, WO 96/25470 or U.S. Pat. No. 6,420,001. By using chain transfer agents the length of the free polymer chains and/or the length of the polymer chains between two crosslinks in the polymer film can be controlled. When the amount of the chain transfer agent is increased, the polymer chain length in the polymer film decreases.

The polymerisable material may also comprise a polymeric binder or one or more monomers capable of forming a polymeric binder, and/or one or more dispersion auxiliaries. Suitable binders and dispersion auxiliaries are disclosed for example in WO 96/02597. Preferably, however, the polymerisable material does not contain a binder or dispersion auxiliary.

The polymerisable material can additionally comprise one or more additives like for example catalysts, sensitisers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes, pigments or nanoparticles.

The thickness of a polymer film according to the present invention is preferably from 0.3 to 5 microns, very preferably from 0.5 to 3 microns, most preferably from 0.7 to 1.5 microns. For use as alignment layer, thin films with a thickness of 0.05 to 1, preferably 0.1 to 0.4 microns are preferred.

The polymer film of the present invention can be used as retardation or compensation film for example in LCDs to improve the contrast and brightness at large viewing angles and reduce the chromaticity. It can be used outside the switchable LC cell of the LCD or between the substrates, usually glass substrates, forming the switchable LC cell and containing the switchable liquid crystalline medium (incell application).

The polymer film of the present invention can also be used as alignment layer for liquid crystalline materials. For example, it can be used in an LCD to induce or improve alignment of the switchable liquid crystalline medium, or to align a subsequent layer of polymerisable liquid crystalline material coated thereon. In this way, stacks of polymerised liquid crystalline films can be prepared.

In particular, the compounds, mixtures, polymers and polymer films according to the present invention can be used in reflective polarisers as disclosed in GB 2,315,072 or WO 97/35219, negative C plate retarders as disclosed in WO 2001/20394 or WO 2004/013666, biaxial negative C plate retarders as disclosed in WO 2003/054111, alignment layers as disclosed in EP 1 376 163, birefringent markings or images for decorative or security use as disclosed in GB 2,315,760, WO 2002/85642, EP 1 295 929 or EP 1 381 022.

The polymer film of the present invention can be used in conventional LC displays, for example displays with vertical alignment like the DAP (deformation of aligned phases), ECB (electrically controlled birefringence), CSH (colour super homeotropic), VA (vertically aligned), VAN or VAC (vertically aligned nematic or cholesteric), MVA (multi-domain vertically aligned) or PVA (patterned vertically aligned) mode; displays with bend or hybrid alignment like the OCB (optically compensated bend cell or optically compensated birefringence), R-OCB (reflective OCB), HAN (hybrid aligned nematic) or pi-cell (π-cell) mode; displays with twisted alignment like the TN (twisted nematic), HTN (highly twisted nematic), STN (super twisted nematic), AMD-TN (active matrix driven TN) mode; displays of the IPS (in plane switching) mode, or displays with switching in an optically isotropic phase.

The following examples are intended to explain the invention without restricting it. The methods, structures and properties described hereinafter can also be applied or transferred to materials that are claimed in this invention but not explicitly described in the foregoing specification or in the examples.

Above and below, percentages are percent by weight. All temperatures are given in degrees Celsius. m.p. denotes melting point, cl.p. denotes clearing point, $T_g$ denotes glass transition temperature. Furthermore, K=crystalline state, N=nematic phase, S=smectic phase and I=isotropic phase. The data between these symbols represent the transition temperatures. $\Delta n$ denotes the optical anisotropy ($\Delta n=n_e-n_o$, where $n_o$ denotes the refractive index parallel to the longitudinal molecular axes and $n_e$ denotes the refractive index perpendicular thereto), measured at 589 nm and 20° C. $V_{10}$ and $V_{90}$ denote the voltage for 10% and 90% transmission, respectively (viewing angle perpendicular to the plate surface). $\tau_{on}$ denotes the switch-on time and $\tau_{off}$ the switch-off time at an operating voltage corresponding to 2 times the value of $V_{10}$. $\Delta \epsilon$ denotes the dielectric anisotropy ($\Delta \epsilon = \epsilon_\| - \epsilon_\perp$, where $\epsilon_\|$ denotes the dielectric constant parallel to the longitudinal molecular axes and $\epsilon_\perp$ denotes the dielectric constant perpendicular thereto). The optical and electrooptical data are measured at 20° C., unless expressly stated otherwise.

Unless stated otherwise, the precentages of components of a polymerisable mixture as given above and below refer to the total amount of solids in the mixture polymerisable mixture, i.e. not including solvents.

EXAMPLES

The examples given in the following are illustrating the present invention without limiting it in any way.

Examples of RMs

All reactions are performed in dried glassware under a positive atmosphere of nitrogen gas.

Examples 1 to 5

The following compounds: 4'-Alkyl-bicyclohexyl-4-carboxylic acid n-(2-methyl-acryloyloxy)-alkyl esters (1) are prepared according to reaction scheme 1.

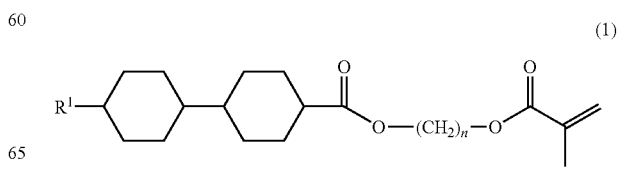

(1)

Example 1

Preparation of 4'-Pentyl-bicyclohexyl-4-carboxylic acid 6-(2-methyl-acryloyloxy)-hexyl ester 1

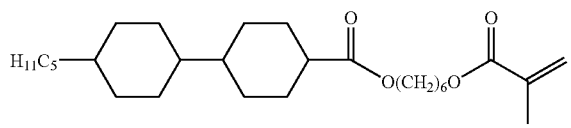

Step 1.1: Preparation of

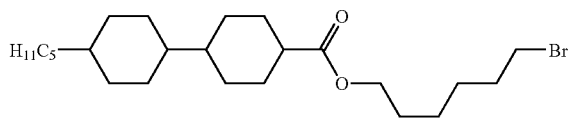

A solution of DCC (7.5 g, 36.4 mmol) in DCM (50 ml) is added slowly to an ice cooled mixture of 4'-pentyl-bicyclohexyl-4-carboxylic acid (10.0 g, 35.7 mmol), dimethylaminopyridine (0.7 g) and 6-bromopropan-1-ol (6.5 g, 35.9 mmol) and DCM (60 ml). After addition is complete, the mixture is stirred at 25° C. over night. Oxalic acid is added tol mop up excess DCC, the mixture is filtered and then evaporated to dryness to afford 4'-pentyl-bicyclohexyl-4-carboxylic acid 6-bromo-hexyl ester as a white solid the structure of which is confirmed by its mass ion by GCMS (M+443) and its $^1$H NMR spectrum. The product is used without further purification in the preparation of preferred example 1.

Step 1.2: Preparation of 1

A solution of methacrylic acid (3.6 g, 41.8 mmol) in dimethylformamide (30 ml) is added dropwise to an ice cooled slurry of sodium hydride (60% suspension in paraffin oil) (1.5 g, 37.5 mmol) in dimethylformamide (50 ml). Once addition is complete, the mixture is allowed to warm to room temperature and is stirred for 1 h, the intermediate 4'-pentyl-bicyclohexyl-4-carboxylic acid 6-bromo-hexyl ester (15.0 g, 33.8 mmol) in dimethylformamide (100 ml) is added dropwise. The mixture is stirred at 50° C. over night. The mixture is cooled to room temperature, poured into icy water, and this is extracted three times with DCM. The DCM solution is washed with brine, water and then dried over sodium sulphate. The solution is evaporated to dryness and recrystallised from acetonitrile to afford a white waxy solid. Further purification is achieved by preparative HPLC using water/acetonitrile as eluant.

The product has a phase sequence of: K 11.7 SmB 28.2 l. The structure is confirmed by $^1$H NMR spectroscopy.

Example 2

Preparation of 4'-Pentyl-bicyclohexyl-4-carboxylic acid 3-(2-methyl-acryloyloxy)-propyl ester 2

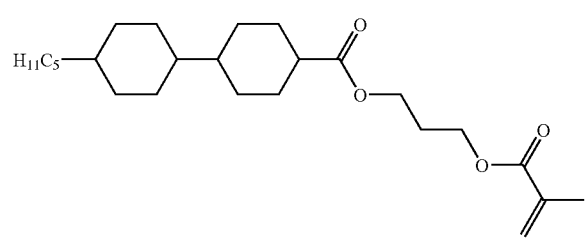

Step 2.1: Preparation of

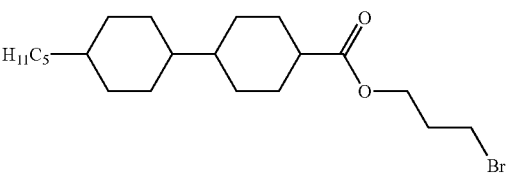

A solution of DCC (11.3 g, 54.5 mmol) in DCM is added slowly to an ice cooled mixture of 4'-pentyl-bicyclohexyl-4-carboxylic acid (15.0 g, 53.5 mmol), dimethylaminopyridine (1.1 g) and 3-bromopropan-1-ol (7.5 g, 54.0 mmol) and DCM (100 ml). After addition is complete, the mixture is stirred at 25° C. overnight. Oxalic acid is added to mop up excess DCC, the mixture is filtered and then evaporated to dryness to afford 4'-pentyl-bicyclohexyl-4-carboxylic acid 3-bromo-propyl ester as a white solid which gave correct mass ion by GCMS (M+401). $^1$H NMR gave expected signals. The product is used without further purification in the preparation of preferred example 2.

Step 2.2: Preparation of 2

A solution of methacrylic acid (3.5 g, 40.7 mmol) in dimethylformamide (100 ml) is added dropwise to an ice cooled slurry of sodium hydride (60% suspension in paraffin oil) (1.6 g, 40.0 mmol) in dimethylformamide (100 ml). Once addition is complete, the mixture is allowed to warm to room temperature and is stirred for 1 h, the intermediate 4'-pentyl-bicyclohexyl-4-carboxylic acid 3-bromo-propyl ester (15.0 g, 37.4 mmol) in dimethylformamide (100 ml) is added dropwise. The mixture is stirred at 50° C. overnight. The mixture is cooled to room temperature, poured into icy water, and this is extracted three times with DCM. The DCM solution is washed with brine, water and then dried over sodium sulphate. The solution is evaporated to dryness and recrystallised from industrial methylated spirits to afford a white crystalline solid.

The product has a phase sequence of: K 41 SmB 43 l. The structure is confirmed by $^1$H NMR spectroscopy.

Example 3

Preparation of 4'-Propyl-bicyclohexyl-4-carboxylic acid 3-(2-methyl-acryloyloxy)-propyl ester 3

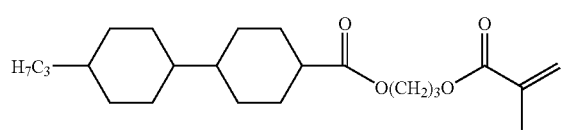

The product has a phase sequence of: K (0.2 SmB) 31 l. The structure is confirmed by $^1$H NMR spectroscopy.

Example 4

Preparation of 4'-Propyl-bicyclohexyl-4-carboxylic acid 6-(2-methyl-acryloyloxy)-hexyl ester 4

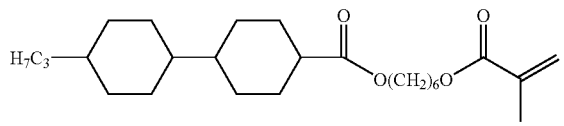

The product has a phase sequence of: K (−7.0 SmB) 12 I. The structure is confirmed by ¹H NMR spectroscopy. GCMS shows a single peak with a mass ion of 420.

Example 5

Preparation of 4'-Propyl-bicyclohexyl-4-carboxylic acid 2,2-dimethyl-3-(2-methyl-acryloyloxy)-propyl ester 5

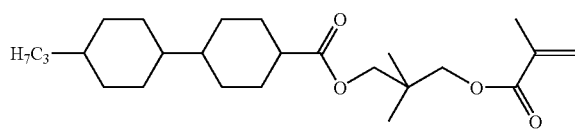

The product, a white crystalline solid, has a phase sequence of: K45.5 I. The structure is confirmed by ¹H NMR spectroscopy.

Examples 6 to 8

The following compounds: 4'-Alkyl-bicyclohexyl-4-carboxylic acid 3-acryloyloxy-alkyl esters (2) are prepared according to reaction scheme 2.

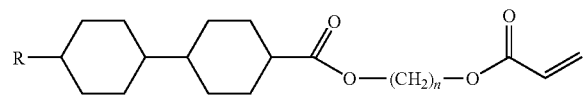
(2)

Example 6

Preparation of 4'-Propyl-bicyclohexyl-4-carboxylic acid 3-acryloyloxy-propyl ester: 6

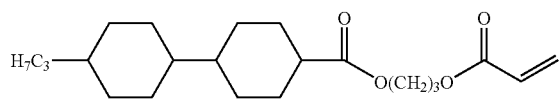

A mixture of sodium acrylate (2.5 g, 13.4 mmol), 4'-propyl-bicyclohexyl-4-carboxylic acid 3-bromo-propyl ester (synthesis described for preferred example 1) (5.0 g, 13.4 mmol) and sodium iodide (2.5 g, 16.7 mmol) in dimethylformamide (150 ml) is stirred at 130° C. overnight. The mixture is cooled to room temperature, poured into water, and this is extracted twice with diethyl ether. The ethereal solution is washed with water and then dried over sodium sulphate. The solution is evaporated to dryness and purified by flash column chromatography using DCM/petrol (1/1) as eluant to give upon evaporation of the appropriate fractions a colourless oil.

The product has a phase sequence of: K 4.7 SmB 12.6 SmA 20.1 I. The structure is confirmed by ¹H NMR spectroscopy. GCMS shows a single peak with a mass ion of 364.

Example 7

Preparation of 4'-Pentyl-bicyclohexyl-4-carboxylic acid 3-acryloyloxy-propyl ester 7

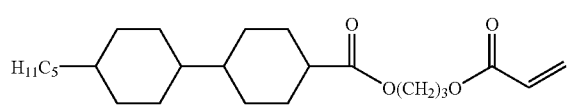

The product has a phase sequence of: K 7.6 SmB 42.8 I. The structure is confirmed by ¹H NMR spectroscopy. GCMS shows a single peak with a mass ion of 392.

Example 8

Preparation of 4'-Pentyl-bicyclohexyl-4-carboxylic acid 6-acryloyloxy-hexyl ester 8

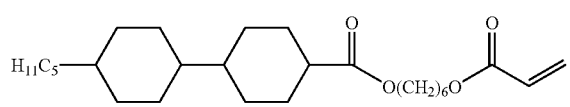

The product has a phase sequence of: K 17.9 SmB 39.1 I. The structure is confirmed by ¹H NMR spectroscopy.

Examples 9 to 11

The following compounds: 6-Acryloyloxy-alkanoic acid 4'-alkyl-bicyclohexyl-4-yl esters (3) are prepared according to reaction scheme 3.

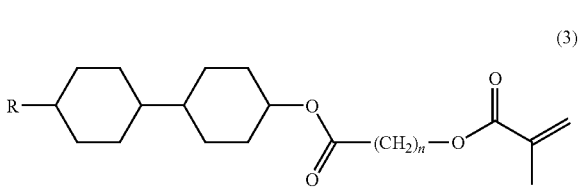
(3)

Example 9

Preparation of 2-Methylene-propionic acid 3-(4'-propyl-bicyclohexyl-4-yloxycarbonyl)-propyl ester 9

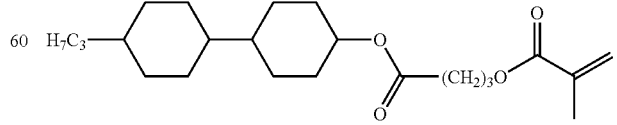

The product, a white solid, has a phase sequence of: K (20.4 SmB 15.6 SmA) 41 I. The structure is confirmed by ¹H NMR spectroscopy and GCMS.

Example 10

Preparation of 2-Methylene-propionic acid 5-(4'-propyl-bicyclohexyl-4-yloxycarbonyl)-pentyl ester 10

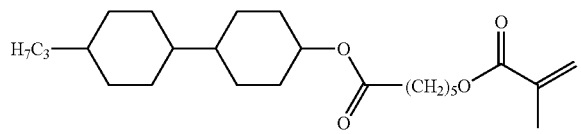

The product, a white solid, has a phase sequence of: K 54.4 I. The structure is confirmed by $^1$H NMR spectroscopy and GCMS.

Example 11

Preparation of 6-Acryloyloxy-hexanoic acid 4'-propyl-bicyclohexyl-4-yl ester 11

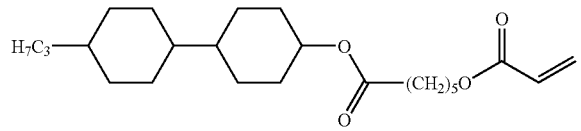

The product, a white crystalline solid, has a phase sequence of: K (5 mA 39 SmB 38.9) 61 I. The structure is confirmed by $^1$H NMR spectroscopy and GCMS.

Examples 12 to 16

The following compounds: 2-Methyl-acrylic acid 5-(4'-alkyl-bicyclohexyl-4-yl)-alkyl esters (4) are prepared according to reaction scheme 4.

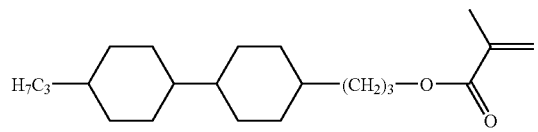
(4)

Example 12

Preparation of 2-Methyl-acrylic acid 3-(4'-propyl-bicyclohexyl-4-yl)-propyl ester 12

Step 12.1

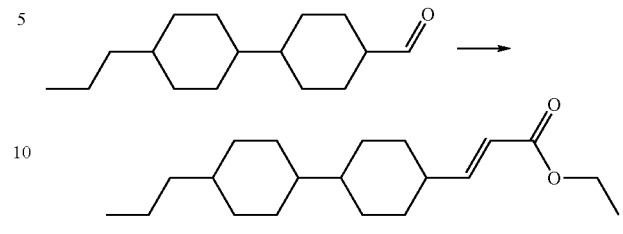

4'-Propyl-bicyclohexyl-4-carbaldehyde (32 g, 0.136 mol) and carbethoxymethylene)triphenylphosphorane (50 g, 0.136 mol) are heated in toluene (1 l) under reflux for 2 h. The solvent is evaporated and the residue is filtered through silica with heptane/ethyl acetate (10:1) to give (E)-3-(4'-propyl-bicyclohexyl-4-yl)acrylic acid ethyl ester as a nematic liquid that crystallises slowly.

Phase behaviour: K 32 N 79.6 I

Step 12.2:

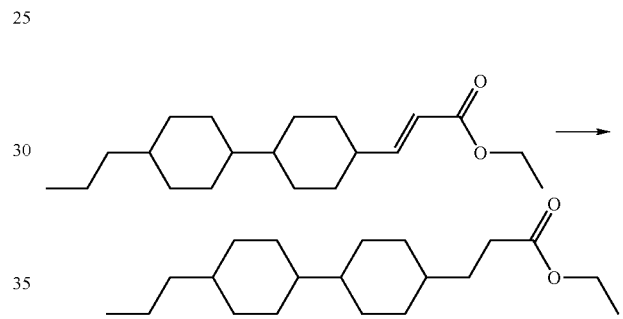

(E)-3-(4'-Propyl-bicyclohexyl-4-yl)acrylic acid ethyl ester is hydrogenated in THF in the presence of palladium on charcoal. After 1 eq. of hydrogen has been consumed the catalyst is filtered off, the solvent is evaporated and the residue is filtered through silica yielding 3-(4'-propyl-bicyclohexyl-4-yl)-propionic acid ethyl ester as a colourless oil.

Step 12.3

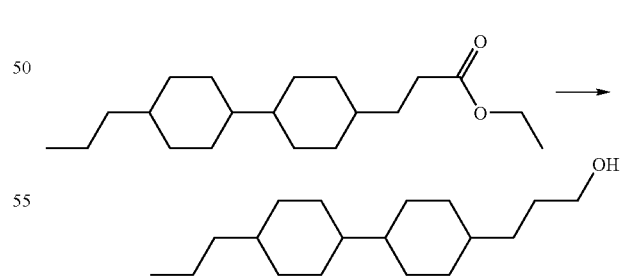

A solution of 3-(4'-Propyl-bicyclohexyl-4-yl)-propionic acid ethyl ester (22.0 g, 70 mmol) in THF (150 ml) is added dropwise to a suspension of lithium-aluminiumhydride (3.25 g, 86 mmol) in THF (250 ml) at reflux temperature. The reaction is heated under reflux for 1 h, cooled and poured onto sat. ammonium chloride solution. The mixture is acidified, extracted with ether and the combined organic layers are washed with brine and dried over sodium sulfate. The solvent is evaporated and the crude product is crystallised from isopropanol to give 3-(4'-propyl-bicyclohexyl-4-yl)-propan-1-ol as colourless crystals.

MS (EI): m/z (%)=212 (2) [M⁺], 248 (54) [M⁺–H₂O], 69 (100).

Step 12.4: Preparation of 12

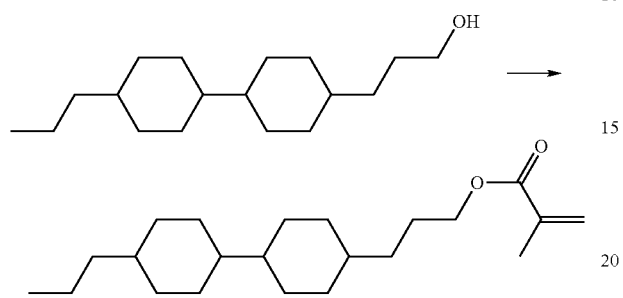

3-(4'-Propyl-bicyclohexyl-4-yl)-propan-1-ol (5 g, 18.8 mmol) is dissolved in dichloromethane (50 ml) and triethylamine (3.5 ml) and a solution of methacryloyl chloride (2.2 ml, 21.8 mmol) in dichloromethane (30 ml) is added dropwise at 0° C. The reaction is stirred overnight, evaporated, filtered through silica with heptane/ethyl acetate (19:1) and the crude product is crystallised from ethanol to give 2-methyl acrylic acid 3-(4'-propyl-bicyclohexyl-4-yl)-propyl ester as colourless crystals.

The product has a phase sequence of: K 47 SmB (43) I. The structure is confirmed by ¹H NMR spectroscopy.

Examples 13 to 17 are prepared accordingly

Example 13

Preparation of Acrylic acid 5-(4'-propyl-bicyclohexyl-4-yl)-pentyl ester 13

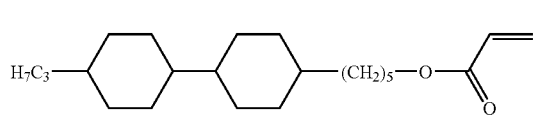

Step 13.1

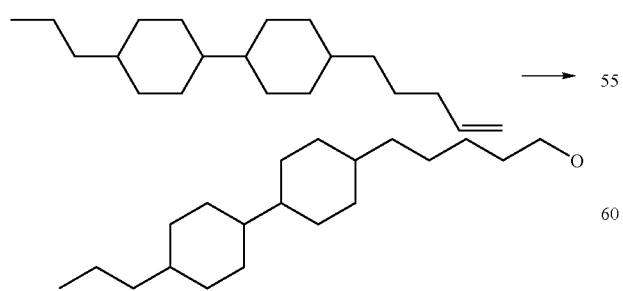

4'-pent-4-enyl-4-propyl-bicyclohexyl [JP10046150] (9.9 g, 36 mmol) in THF (200 ml) are cooled to 0° C. and a 0.5 M solution of 9-BBN in THF (100 ml, 50 mmol) is added dropwise. The reaction is stirred overnight at room temp., cooled to −20° C. and 30% hydrogen peroxide (12 ml, 0.11 mol) are added followed by 32% aq. sodium hydroxide (7 ml, 76 mmol). The cooling bath is removed and the reaction is stirred overnight. Water is added and the mixture is extracted three times with ethyl acetate. The combined org. layers are washed with water and brine and are dried (Na₂SO₄). The solvent is evaporated and the crude product is recrystalised from ethanol to give 5-(4'-propyl-bicyclohexyl-4-yl)-pentan-1-ol as colourless crystals.

Step 13.2

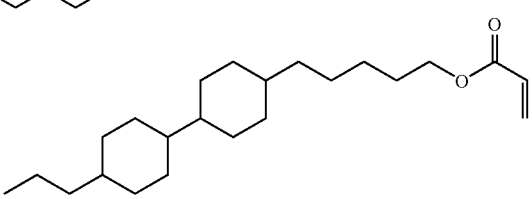

The product, a white solid, has a phase sequence of: K 29 SmB 81 I. The structure is confirmed by ¹H NMR spectroscopy.

Example 14

Preparation of 2-Methyl-acrylic acid 5-(4'-propyl-bicyclohexyl-4-yl)-pentyl ester

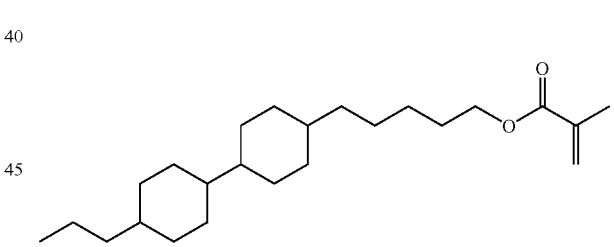

According to the procedure described above 5-(4'-propyl-bicyclohexyl-4-yl)-pentan-1-ol is allowed to react to acrylic acid 5-(4'-propyl-bicyclohexyl-4-yl)-pentyl ester. This has the phase sequence K 29 SmB 66 I.

Example 15

Preparation of Acrylic acid 3-(4'-pentyl-bicyclohexyl-4-yl)-propyl ester 15

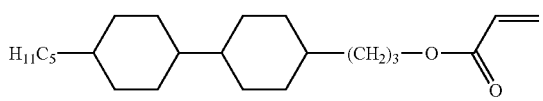

The product, a white solid has a phase sequence of: K 33 SmB 87 I. The structure is confirmed by ¹H NMR spectroscopy.

Example 16

Preparation of Acrylic acid 3-(4'-propyl-bicyclohexyl-4-yl)-propyl ester 16

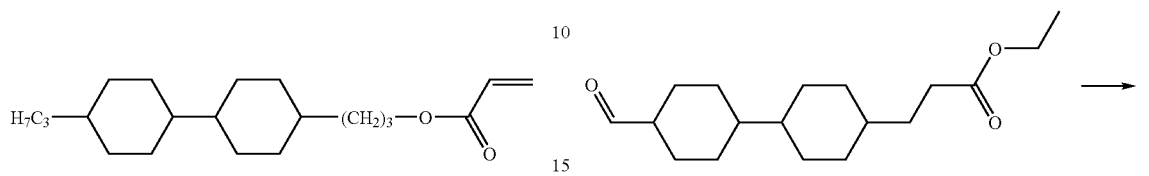

The product, a white solid, has a phase sequence of K 34 SmB 66 I. The structure is confirmed by ¹H NMR spectroscopy.

Example 17

Preparation of Acrylic acid 3-(4'-vinyl-bicyclohexyl-4-yl)-propyl ester 17

Step 17.1

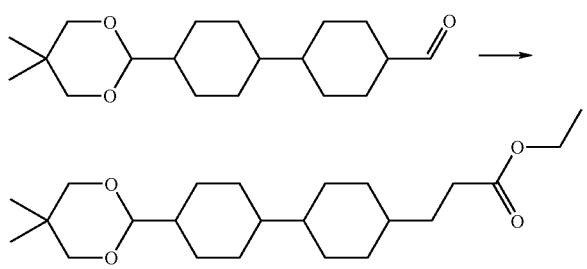

According to the procedure described above 4-(3,3-Dimethyl-1,5-dioxa-spiro[5.5]undec-9-yl)-cyclohexanecarbaldehyde (cf. U.S. Pat. No. 5,185,098) gives 3-[4'-(5,5-Dimethyl-[1,3]dioxan-2-yl)-bicyclohexyl-4-yl]-propionic acid ethyl ester as colourless crystals. MS(EI): m/z (%)=379 (2) [M⁺−1], 115 (100)[$C_6H_{11}O_2^+$].

Step 17.2

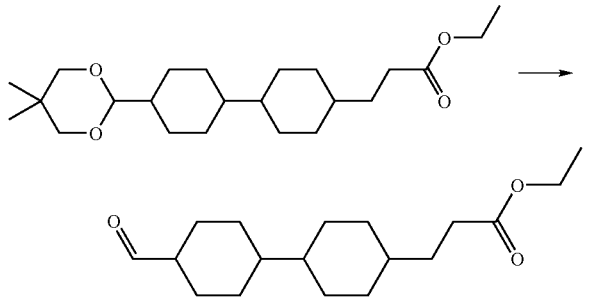

A solution of 3-[4'-(5,5-Dimethyl-[1,3]dioxan-2-yl)-bicyclohexyl-4-yl]-propionic acid ethyl ester (17 g, 45 mmol) in toluene (200 ml) and formic acid (70 ml) is stirred overnight at 80° C. The solution is washed with water, dried (Na₂SO₄), concentrated and recrystallised to give 3-(4'-formyl-bicyclohexyl-4-yl)-propionic acid ethyl ester as colourless crystals.
MS (EI): m/z (%)=294 (16) [W], 88 (100).

Step 17.3

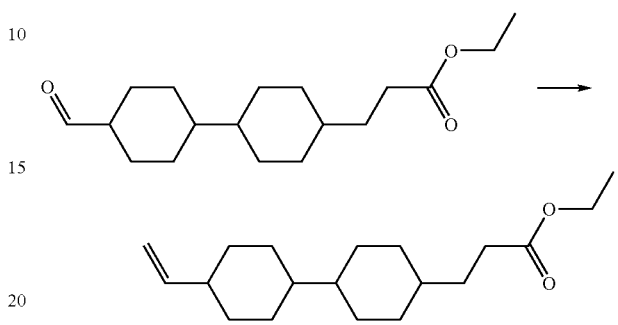

To 3-(4'-formyl-bicyclohexyl-4-yl)-propionic acid ethyl ester (7.8 g, 25 mmol) and methyltriphenylphosphonium-bromide (9.5 g, 26 mmol) in THF (150 ml) is added potassium-tert-butoxide portionwise at −10° C. The reaction mixture is stirred overnight, quenched with water and acidified with hydrochloric acid. The aq. layer is separated and extracted twice with MTB ether. The combined org. layers are washed with brine, dried (Na₂SO₄) and evaporated. The crude product is purified with heptane/ethyl acetate (19:1) on silica to give 3-(4'-vinyl-bicyclohexyl-4-yl)-propionic acid ethyl ester as a colourless solid.

¹H-NMR (250 MHz, CDCl₃)=0.75–1.95 ppm (25H), 2.96 (2H, J=7.8 Hz, CH₂COOEt), 4.12 (q, J=7.1 Hz, 2H, COOCH₂CH₃), 4.86 (ddd, J=1.0 Hz, J=1.8 Hz, J=10.4 Hz, 1H, —CH═CH₂), 4.94 (ddd, J=1.4 Hz, J=1.9 Hz, J=17.3 Hz, 1H, —CH═CH₂), 5.76 (ddd, J=6.3 Hz, J=10.4 Hz, J=17.3 Hz, 1H, —CH═CH₂).

Steps 17.4 and 17.5

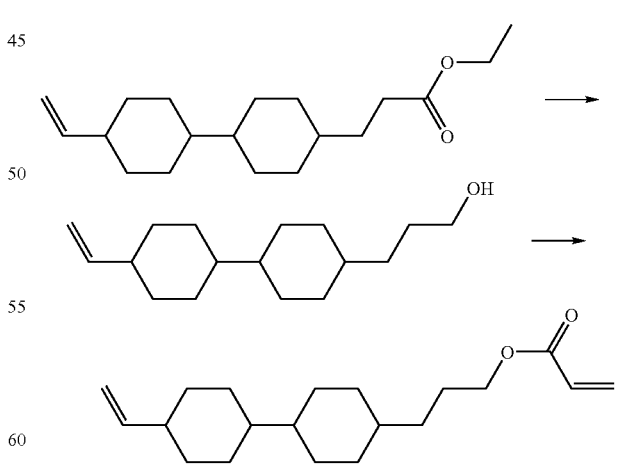

According to the above described procedure from 3-(4'-vinyl-bicyclohexyl-4-yl)-propionic acid ethyl ester the acrylic acid 3-(4'-vinyl-bicyclohexyl-4-yl)-propyl ester is obtained as a colourless oil and has the following phase behaviour K 2 N (−4.7) I.

TABLE 1

Physical data of compounds 1 to 16:

| No. | Δε | ε⊥ | Δn | $n_e$ | Transitions |
|---|---|---|---|---|---|
| 1 | −2.9 | 4.8 | 0.0194 | 1.4864 | K 11.7 SmB 28 I |
| 2 | −1.9 | 4.7 | n.d. | n.d. | K (−15 SmC) 42 I |
| 3 | −2.1 | 5.0 | 0.0091 | 1.4848 | K (0.2 SmB) 31 I |
| 4 | −2.6 | 4.7 | 0.0116 | 1.4867 | K (−7.0 SmB) 12 I |
| 5 | −3.7 | 4.9 | −0.0319 | 1.4508 | K 45.5 I |
| 6 | −2.3 | 5.0 | n.d. | n.d. | K 4.7 SmB 12.6 SmA 20.1 I |
| 7 | −1.9 | 4.7 | 0.0189 | 1.4891 | K 7.6 SmB 42.8 I |
| 8 | −1.8 | 4.7 | 0.0297 | 1.4946 | K 17.9 SmB 39.1 I |
| 9 | n.d. | n.d. | n.d. | n.d. | K (20.4 SmA-15.6 SmB) 41 I |
| 10 | −1.0 | 4.5 | 0.0368 | 1.5019 | K 54.4 I |
| 11 | 0.9 | 5.8 | 0.0381 | 1.5037 | K (38.6 SmC 37.9 SmB) 60.9 I |
| 12 | n.d. | n.d. | n.d. | n.d. | K (43 SmB) 47 I |
| 13a | −0.2 | 3.5 | 0.0454 | 1.5201 | K 29 SmB 81 I |
| 14 | −0.4 | 3.6 | 0.0356 | 1.5112 | K 29 SmB 66 I |
| 15 | n.d. | n.d. | n.d. | n.d. | K 33 SmB 87 I |
| 16 | n.d. | n.d. | n.d. | n.d. | K 34 SmB 66 I |
| 17 | n.d. | n.d. | n.d. | n.d. | K 2 N (−4.7) I |

Remarks:
Data of Δε, ε⊥, Δn and $n_e$ extrapolated from 10% of respective compound in host ZLI-4792,
n.d.: not determined.

Examples 18 and 19

The following compounds are obtained in analogy to the methods described in examples 12 to 16.

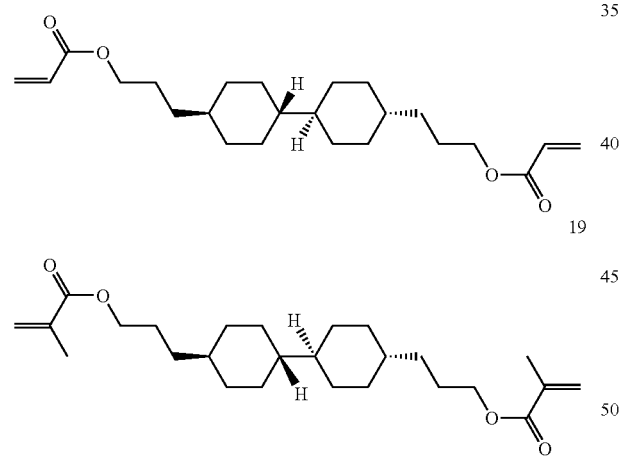

Example 18

Preparation of Acrylic acid 3-[4'-(3-acryloyloxy-propyl)-bicyclohexyl-4-yl]-propyl ester 18

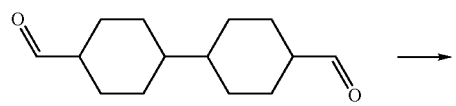

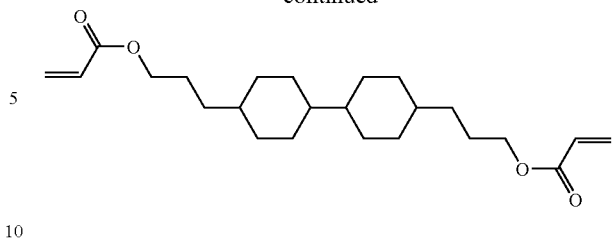

According to the synthesis of acrylic acid 3-(4'-propyl-bicyclohexyl-4-yl)-propyl ester from 4'-propyl-bicyclohexyl-4-carbaldehyde, bicyclohexyl-4-4'-dicarbaldehyde yields acrylic acid 3-[4'-(3-acryloyloxy-propyl)-bicyclohexyl-4-yl]-propyl ester, white solid with K 80 I. Its structure is confirmed by $^1$H NMR spectroscopy.

Example 19

Preparation of 2-Methyl-acrylic acid 3-{4'-[3-(2-methyl-acryloyloxy)-propyl]-bicyclohexyl-4-yl}-propyl ester 19

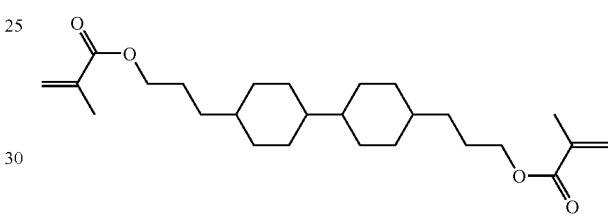

This compound is prepared according to example 18. It has the phase sequence K 42 I and its structure is confirmed by $^1$H NMR spectroscopy.

Examples 20 to 22

Compound 20 is prepared according to Scheme 6.

Example 20

Preparation of 4-Propyl-cyclohexanecarboxylic acid 4-acryloyloxy-butyl ester 20

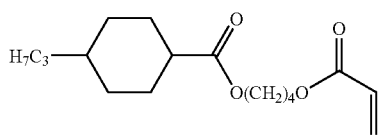

4-Propyl-cyclohexanecarboxylic acid (10.0 g, 58.0 mmol), 4-hydroxybutyl acrylate (8.0 g, 57.0 mmol) and a catalytic amount of para-toluene sulphonic acid are stirred under reflux in toluene (100 ml) in a flask equipped with Dean-Stark apparatus. The reaction is shown to be complete by GCMS after 1 hour. The solution is allowed to cool to room temperature, is washed with aqueous sodium carbonate and water, dried and evaporated to dryness. Purification is achieved by flash column chromatography using petrol as eluant. Evaporation of the appropriate fractions gives a colourless oil.

The product has a phase sequence of Tg<−70. The structure is confirmed by $^1$H NMR spectroscopy. GCMS shows the mass ion (310).

Compounds 21 and 22 are prepared according to Scheme 6.

Example 21

Preparation of 4-Propyl-cyclohexanecarboxylic acid 4-(2-methyl-acryloyloxy)-butyl ester 21

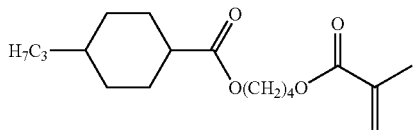

Step 21.1: Preparation of

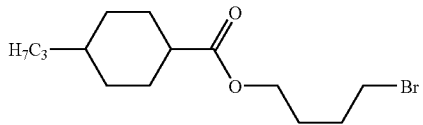

4-Propyl-cyclohexanecarboxylic acid (10.0 g, 58.0 mmol), 4-bromobutan-1-ol (9.2 g, 60.0 mmol) and a catalytic amount of para-toluene sulphonic acid are stirred under reflux in toluene (300 ml) in a flask equipped with Dean-Stark apparatus over night. The solution is allowed to cool to room temperature, is washed with aqueous sodium carbonate and water, dried and evaporated to dryness. Purification is achieved by flash column chromatography using petrol as eluant. Evaporation of the appropriate fractions gives 4-propyl-cyclohexanecarboxylic acid 4-bromo-butyl ester as the product. The structure is confirmed by $^1$H NMR spectroscopy and GCMS.

Step 21.2: Preparation of 21

4-Propyl-cyclohexanecarboxylic acid 4-bromo-butyl ester (9.4 g, 30.8 mmol), methacrylic acid (8.0 g, 92.4 mmol) and potassium carbonate (17.0 g, 123.2 mmol) are stirred at 50° C. in dimethyl sulphoxide (200 ml) over night. A solid precipitate is removed by filtration and washed with diethyl ether. The filtrate is washed with water, removed, dried and evaporated to dryness. Purification is achieved by flash column chromatography using toluene as eluant to give 21 as an oil.

The product has a phase sequence of Tp-70. The structure is confirmed by $^1$H NMR spectroscopy.

Example 22

Preparation of 4-Propyl-cyclohexanecarboxylic acid 2,2-dimethyl-3-(2-methyl-acryloyloxy)-propyl ester 22

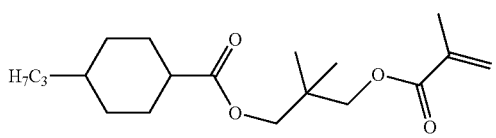

Step 22.1: Preparation of

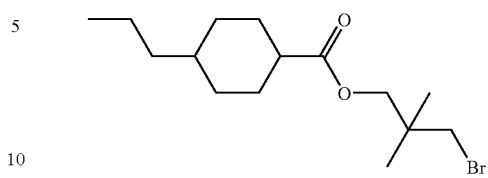

4-Propyl-cyclohexanecarboxylic acid (10.0 g, 58.0 mmol), 3-bromo-2,2-dimethyl-propan-1-ol (10.0 g, 59.9 mmol) and a catalytic amount of para-toluene sulphonic acid are stirred under reflux in toluene (300 ml) in a flask equipped with Dean-Stark apparatus over night. The solution is allowed to cool to room temperature, is washed with aqueous sodium carbonate and water, dried and evaporated to dryness. Purification is achieved by filtration through a silica pad using petrol as eluant. Evaporation of the appropriate fractions gives 4-propyl-cyclohexanecarboxylic acid 3-bromo-2,2-dimethyl-propyl ester as a liquid. The structure is confirmed by GCMS.

Step 22.2: Preparation of 22

4-Propyl-cyclohexanecarboxylic acid 3-bromo-2,2-dimethyl-propyl ester (4.3 g, 13.3 mmol), methacrylic acid (3.4 g, 39.9 mmol) and potassium carbonate (6.9 g, 50.0 mmol) are stirred at 100° C. in dimethyl sulphoxide (100 ml) for 3d. A solid precipitate is removed by filtration and washed with diethyl ether. The filtrate is washed with water, removed, dried and evaporated to dryness. Purification is achieved by flash column chromatography using petrol as eluant to give 22 as a liquid.

The structure is confirmed by $^1$H NMR.

TABLE 2

Physical data of compounds 20 to 22:

| No. | $\Delta\epsilon$ | $\epsilon_\perp$ | $\Delta n$ | $n_e$ | Transitions |
|---|---|---|---|---|---|
| 20 | −5.3 | 6.3 | n.d. | n.d. | Tg < −70 |
| 21 | −5.6 | 6.3 | −0.0486 | 1.4177 | Tg < −70 |
| 22 | n.d. | n.d. | n.d. | n.d. | n.d. |

Remarks:
Data of $\Delta\epsilon$, $\epsilon_\perp$, $\Delta n$ and $n_e$ extrapolated from 10% of respective compound in host ZLI-4792 and
n.d.: not determined.

Examples 23 to 37

The compounds of the following examples 23 to 31 and 37 are obtained in analogy to the methods described in examples 21 and 22 and the compounds of Examples 32-36 are obtained in analogy to the methods described for examples 9 to 11.

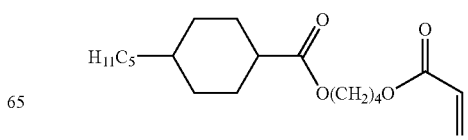

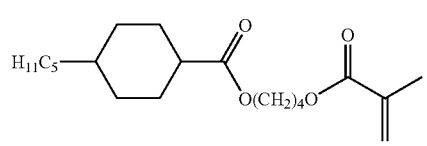
24
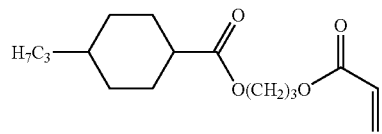
25
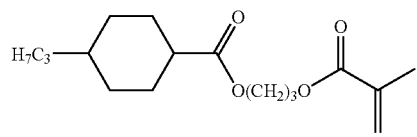
26
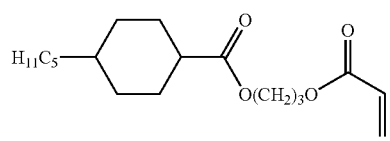
27
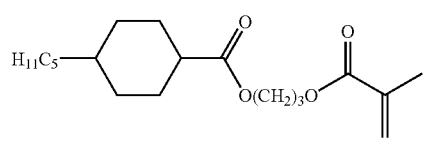
28
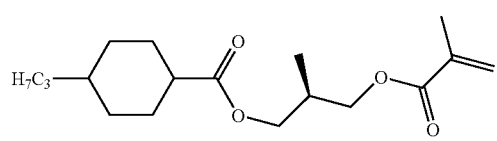
29
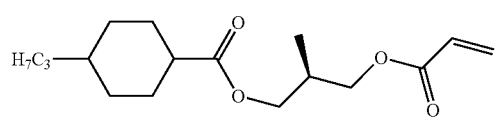
30
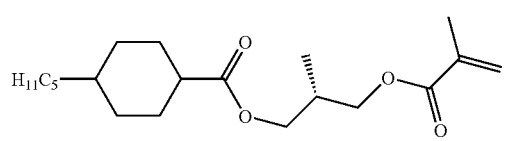
31
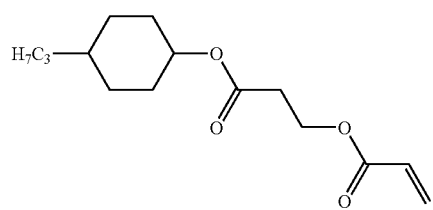
32
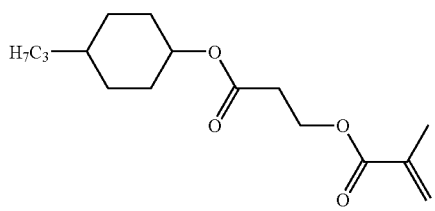
33
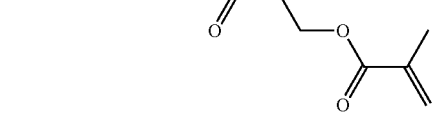
34
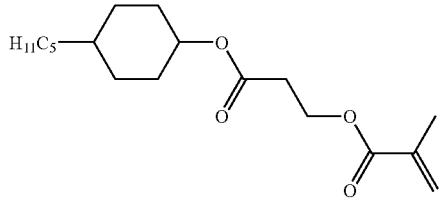
35
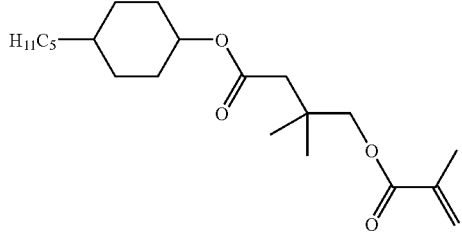
36
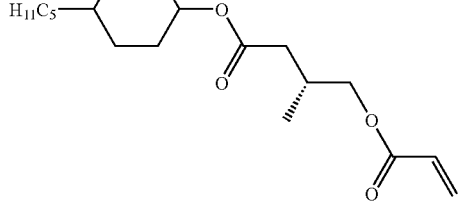
37
Examples 38 and 39
According to the syntheses shown in the following scheme and in analogy to the synthesis of acrylic acid 3-[4'-(3-acryloyloxy-propyl)-bicyclohexyl-4-yl]-propyl ester (p. 75), examples 38 and 39 are prepared.
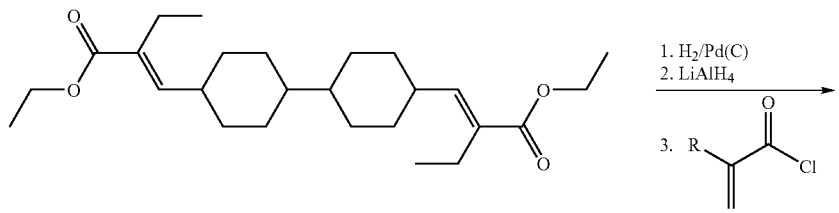

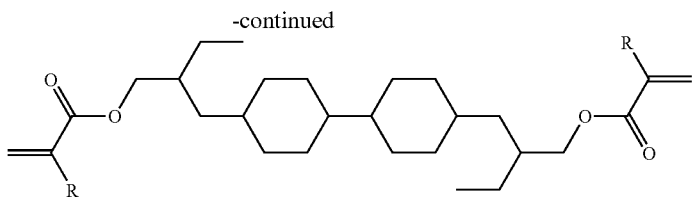

Example 38

Preparation of Acrylic acid 2-[4'-(2-acryloyloxymethyl-butyl)-bicyclohexyl-4-ylmethyl]-butyl ester 38, Step 38.1: Preparation of 2-[1-[4'-(-2-ethoxycarbonyl-but-1-enyl)-bicyclohexyl-4-yl]-methylidene] butyric acid ethyl ester

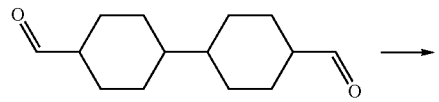

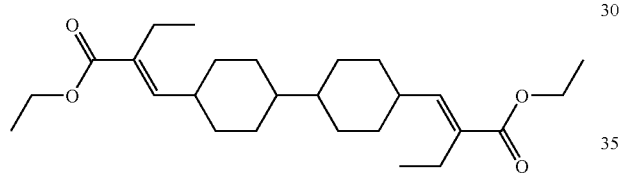

Triethylphosphonobutyrate (70 ml, 0.289 mol) in THF (1 l) is cooled to 0° C. Sodium hydride (60% in mineral oil, 13.5 g, 0.338 mol) is added and the mixture is stirred for 30 min. Lithium bromide (20 g, 0.230 mol) is added, followed by a suspension of bicyclohexyl-4-4'-dicarbaldehyde (22.5 g, 0.1 mol) in 200 ml of THF. After 6 h the cooling bath is removed and the reaction is stirred at room temp. overnight. Isopropanol is added and the reaction mixture is poured onto water, extracted three times (MTB-ether) and dried ($Na_2SO_4$). The solvent is evaporated and the crude product is filtered through silica with heptane/ethyl acetate (10:1) to give 2-[1-[4'-(-2-ethoxycarbonyl-but-1-enyl)-bicyclohexyl-4-yl]-methylidene]-butyric acid ethyl ester as a colourless solid.

Example 38

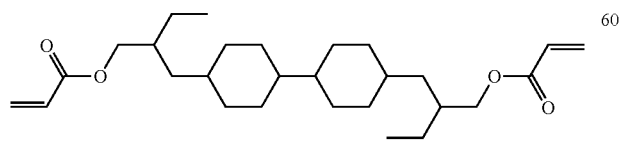

The product is a colourless oil with $T_g$ −69 l.

Example 39

2-Methylacrylic acid 2-[4'-(2-(2-methylacryloyloxymethyl-butyl)-bicyclohexyl-4-ylmethyl]-butyl ester 39

Example 39

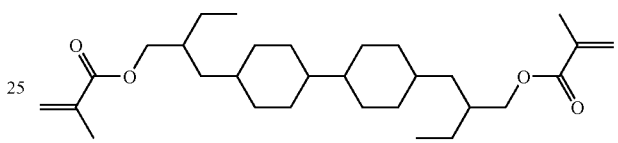

The product is a colourless oil with $T_g$ −60 l.

Example 40

Preparation of Acrylic acid 3-[4'-(2-acryloyloxymethyl-butyl)-bicyclohexyl-4-yl]-propyl ester 40

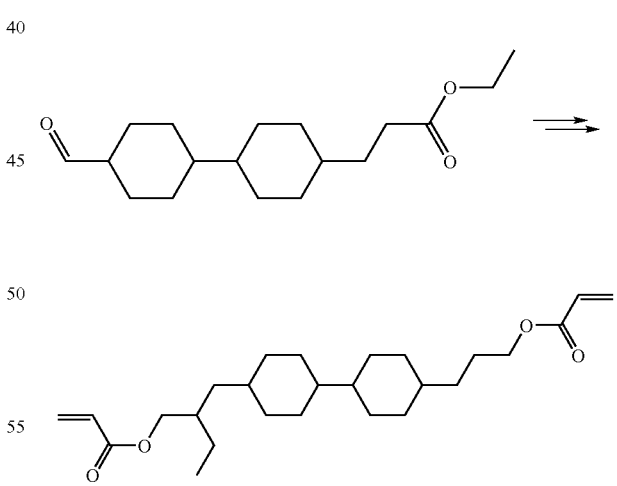

Accordingly, from 3-(4'-formyl-bicyclohexyl-4-yl)-propionic acid ethyl ester (see above) 40 is obtained, a colourless solid, as an example of a compound with two different spacers.

The product has the phase sequence $T_g$ −78 K 28 l.

Examples 41 and 42

Compounds 41 and 42 are prepared in analogy to the previous examples.

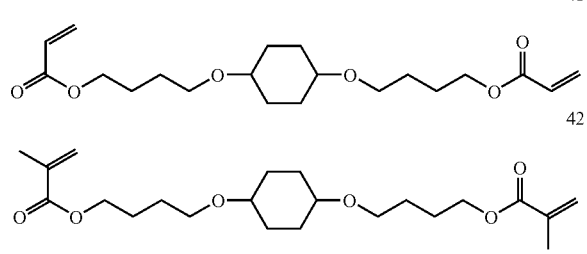

Examples 43 to 45

Further examples of compounds of formula I according to the present invention are the following, which are prepared analogously to the previous examples.

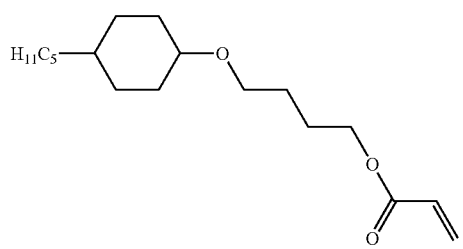

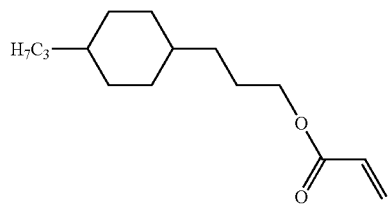

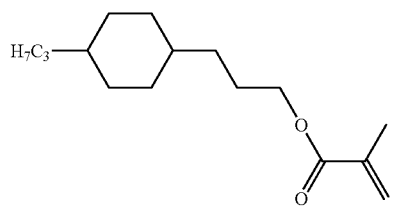

Example 46

Preparation of Acrylic acid 2-(4-propyl-cyclohexylmethyl)-butyl ester 46

Step 46.1

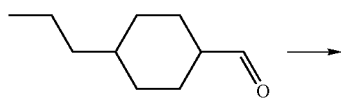

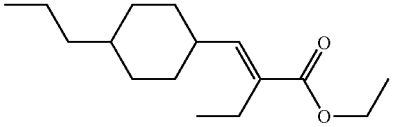

Triethylphosphonobutyrate (45 ml, 0.124 mol) in THF (500 ml) is cooled to 0° C. Sodium hydride (60% in mineral oil, 9 g, 0.225 mol) is added and the mixture is stirred for 30 min. Lithium bromide (12.9 g, 0.149 mol) is added, followed by a suspension of cyclohexane-4-carbaldehyde (19 g, 0.124 mol). After 6 h the cooling bath is removed and the reaction mixture is stirred at room temp. overnight. Isopropanol is added and the reaction mixture is poured onto water, extracted three times (MTB-ether) and dried ($Na_2SO_4$). The solvent is evaporated and the crude product is filtered through silica with heptane/ethyl acetate (10:1) to give 2-[1-(4-propyl-cyclohexyl)-methylidene]-butyric acid ethyl ester as a colourless oil.

MS (EI): m/z(%)=252 (100) [M$^+$].

Step 46.2

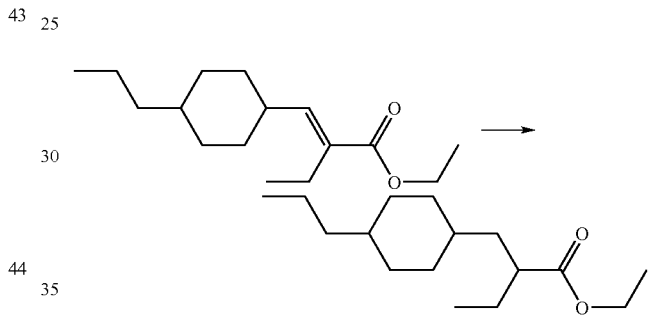

2-[1-(4-Propyl-cyclohexyl)-methylidene]-butyric acid ethyl ester is hydrogenated in THF in the presence of palladium on charcoal (5%) until completion. The catalyst is filtered off, the solvent is removed under reduced pressure and the crude product is reacted in the next step without further purification.

Step 46.3

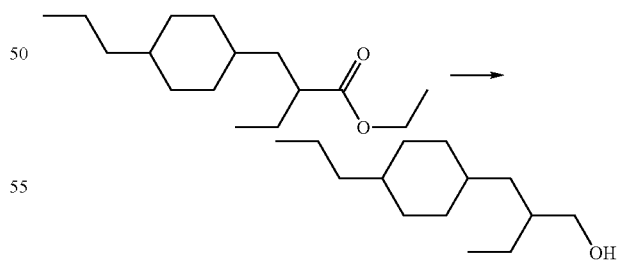

A solution of 2-(4-propyl-cyclohexylmethyl)-butyric acid ethyl ester (35.0 g, 138 mmol) in THF (300 ml) is added dropwise to a suspension of lithium-aluminiumhydride (6 g, 158 mmol) in THF (300 ml) at reflux temperature. The reaction mixture is heated under reflux for 1 h, cooled and poured onto sat. ammonium chloride solution. The mixture is acidified, extracted with ether and the combined organic layers are washed with brine and dried over sodium sulfate. The solvent is evaporated and the crude product is crystallised from isopropanol to give 2-(4-propyl-cyclohexylmethyl)-butan-1-ol as colourless crystals.

MS (EI): m/z (%)=266 (2) [W], 194 (60) [M$^+$−H$_2$O], 69 (100).

Step 46.4

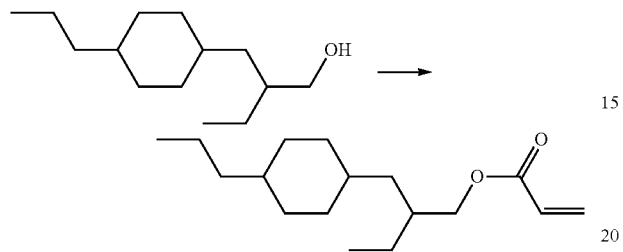

2-(4-propyl-cyclohexylmethyl)-butan-1-ol (13 g, 61.2 mmol) is dissolved in dichloromethane (50 ml) and triethylamine (3.5 ml) and a solution of methacryloyl chloride (2.2 ml, 21.8 mmol) in dichloromethane (30 ml) is added dropwise at 0° C. The reaction is stirred overnight, evaporated, filtered through silica with heptane/ethyl acetate (19:1) and the crude product is crystallised from ethanol to give acrylic acid 2-(4-propyl-cyclohexylmethyl)-butyl ester as a colourless oil.

Example 47

Preparation of 2-Methyl-acrylic acid 2-(4-propyl-cyclohexylmethyl)-butyl ester 47

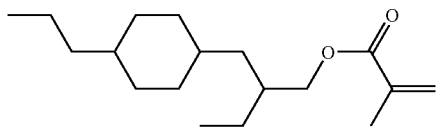

Analogously to example 46 the product (47) is prepared. It is a colourless oil with the phase behaviour: Tg −87 1

Compounds 48 to and 52, which are prepared in analogy to the previous examples, are also useful for the stabilisation of blue phases and other applications according to the present invention.

48

49

50

51

52

Use Examples

The physical data of the compositions both of the polymer precursors and of the mesogenic host mixtures illustrate which properties can be achieved in which ranges. The combination of the various properties which can be preferably achieved is thus well defined.

In the following set of examples the influence of monoreactive cyclohexylene-containing monomers is investigated for mixtures containing a combination of monoreactive and direactive mesogens.

The following acronyms are used to describe the components of the liquid crystalline host mixture:

TABLE A

List of acronyms (abbreviations) used

AUUQU-n-F

TABLE A-continued
List of acronyms (abbreviations) used
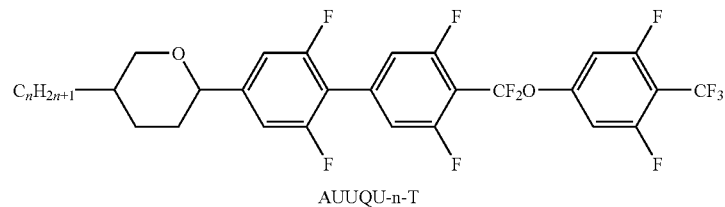
AUUQU-n-T
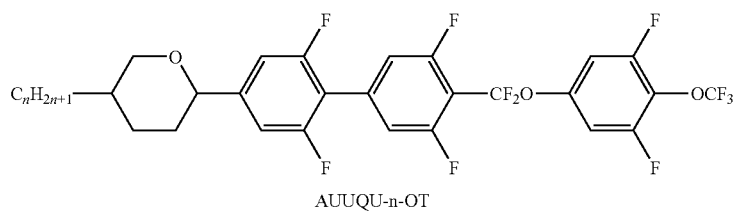
AUUQU-n-OT
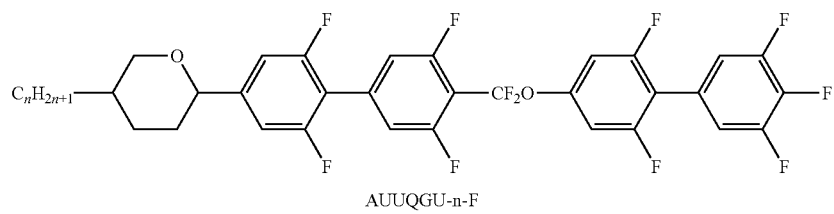
AUUQGU-n-F
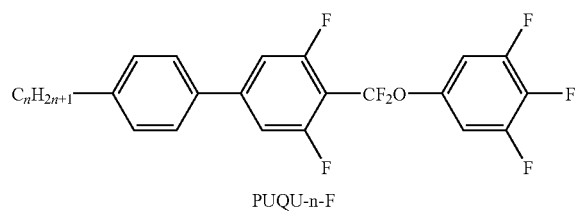
PUQU-n-F
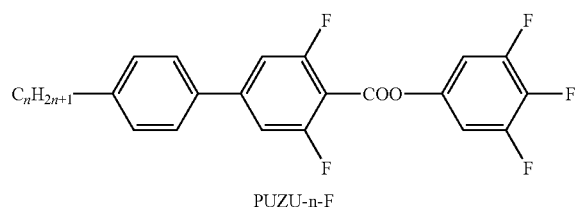
PUZU-n-F
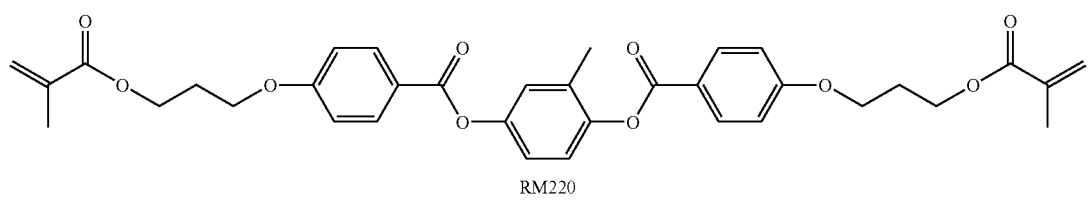 [SMILES: C=C(C)C(=O)OCCCOc1ccc(C(=O)Oc2ccc(OC(=O)c3ccc(OCCCOC(=O)C(=C)C)cc3)c(C)c2)cc1]
RM220
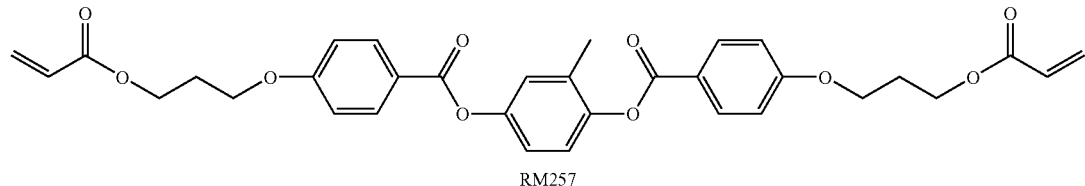 [SMILES: C=CC(=O)OCCCOc1ccc(C(=O)Oc2ccc(OC(=O)c3ccc(OCCCOC(=O)C=C)cc3)c(C)c2)cc1]
RM257
RM220 has the phase sequence K 82.5 N 97.1 I.
RM257 is a bis-acrylate which has the same core structure and spacers as RM220 and has as the phase sequence K 66 N 127 I.

Preferred host mixtures according to this invention comprise one or more pyrane compounds, preferably selected from the acronyms AUUQU-n-F, AUUQU-n-T, AUUQU-n-OT and AUUQGU-n-F as shown above, one or more compounds comprising a 2,6-difluoro benzoic acid 3,5-trifluorophenyl ester group, preferably selected from the acronym PUZU-n-F as shown above, and one or more compounds comprising a 5-[(2,6-difluorophenyl)-difluoromethoxy]-1,3-trifluoro benzene group, preferably selected from the acronym PUQU-n-F as shown above.

A chiral dopant with a high value of the helical twisting power (HTP), R-5011, commercially available from Merck KGaA, is added to a quantity of the polar host mixture A0 having the composition given in Table 4 below. The HTP of the chiral dopant R-5011 is measured as $160\mu^{-1}$ in the host mixture A0. This dopant is added so that it is comprised at 2.5% by mass of the mixture after all other components have been added. A given quantity of the monoreactive cyclohexylene-containing reactive mesogens as specified below and of the direactive reactive mesogen as specified below are added to the host mixture. A small amount of the photoinitiator 2,2-dimethoxy-1,2-diphenyl-ethanone (commercially known as Irgacure-651, here also shortened to IRG-651) is also added to the mixture. When all of the components have been added, the mixture is made homogeneous by stirring in the isotropic phase.

TABLE 3

Composition and Properties of Host Mixture A0

| Composition | | |
|---|---|---|
| Compound Abbreviation | Concentr./ mass-% | Properties |
| PUQU-2-F | 8.00 | T (N, I) = 51.7° C. |
| PUQU-3-F | 10.00 | Δn (20° C., 589 nm) = 0.1400 |
| AUUQU-2-F | 9.02 | |
| AUUQU-3-F | 10.66 | |
| AUUQU-4-F | 4.92 | |
| AUUQU-5-F | 4.51 | |
| AUUQU-7-F | 4.92 | |
| AUUQU-3-T | 9.02 | |
| AUUQU-3-OT | 10.66 | |
| AUUQGU-3-F | 5.74 | |
| PUZU-2-F | 4.51 | |
| PUZU-3-F | 9.02 | |
| PUZU-5-F | 9.02 | |
| Σ | 100.00 | |

Polymerisation Experiments

The types of cells used for phase identification are typically 10 micron thick cells without any alignment layers or electrodes. The cells have a size of approximately 2.0 cm×2.5 cm. They are filled by capillary action in an oven, typically at a temperature of 75° C. Before polymerisation, the behaviors of the mixtures are characterised by polarising microscopy and their phase transition temperatures are measured on heating at 1° C./min. The experimental set-up used for this consists of an Olympus BX51 polarising microscope equipped with a Linkam temperature programmer and hot-stage.

Polymerisation experiments are carried out using an EFOS UV lamp fitted with a 365 nm narrow band filter giving a power of 1.5 mW/cm². Initially, the sample is maintained at a temperature in the Blue Phase (BP), which is identified from the polarising microscopy as being Blue Phase I (BPI). After each increment of 5s of UV irradiation, the texture of the cell is checked using the polarising microscope to assess any changes. If the sample becomes darker, this is indicative that a phase transition to isotropic state is about to occur, the temperature for the next step of UV irradiation is changed accordingly. Total exposure times are typically 180 s at which point, the final texture is stabilised.

After the polymerisation process has been completed, the temperature range in which the blue phase is stable is measured. Subsequently, a further test cell is prepared and the electro-optic characteristics of the mixture evaluated as described below.

Electrooptic Characterisation

The test cells used for the electro-optic measurements have interdigitated electrodes on one surface of the cell. The electrode width, inter-electrode distance and cell gap are typically 10 microns and the area of the cell covered by electrodes is approximately 0.4 cm². The cell surfaces have no alignment layer or rubbing pre-treatment. Test cells are filled with the mixture of choice by capillary action at elevated temperature and then polymerised in Blue Phase I as described above.

Electro-optic measurements are made using a DMS301 (Autronic-Melchers) with the cell placed between crossed polarisers, and orientated with respect to the polarisers in such a way that the long axis of the electrodes makes an angle of 45° with the polariser transmission directions. The plane of the cell lies perpendicular to the direction along which the transmission of the cell is measured. This configuration gives an essentially dark state when no driving voltage is applied across the electrodes. The electro-optic investigation is carried out in two parts. In the first part, the driving voltages of the cell are measured and, in the second, the cell switching speeds are measured. The driving voltages applied across the cell electrodes are square waves with alternating positive and negative polarity, with a frequency of 100 Hz and variable amplitude as described below.

For the purposes of describing the switching behaviour, the following definitions apply. The cell transmission when no driving voltage is applied is defined as 0% transmission. In the first part of the measurement, the cell transmission is measured as the driving voltage is increased progressively from zero: at a certain voltage a maximum in the transmitted intensity is measured. The cell transmission is defined as being 100% at this applied voltage and this characteristic voltage is defined as $V_{100}$. The characteristic voltage $V_{10}$ is defined as the voltage required to increase the transmission from 0 to 10% of that measured when $V_{100}$ is applied. In the second part of the switching measurement, the switching speeds are measured. The applied voltage is increased instantaneously from zero to $V_{100}$ to measure the 'switch on' electro-optic response of the cell. The switching time $\tau_{on}$ is defined as being the time taken for the cell transmission to switch from 0 to 90% of the final transmitted intensity. Subsequently, the applied voltage is decreased instantaneously from $V_{100}$ to zero to measure the 'switch off' response of the cell, The switching time $\tau_{off}$ is defined as being the time taken for the cell transmission to drop 90% of the way from its value when $V_{100}$ is applied to that when no voltage is applied. This characterisation method is repeated with the cell maintained at a range of different temperatures.

At low temperatures, mixtures show high switching voltage. As the temperature is raised the operating voltage falls to a minimum and then increases with increasing temperature, this increase is steady at first and then very rapid with further increases in temperature when the mixture becomes isotropic. Two transition temperatures $T_1$ and $T_2$ are identified which mark the lowest and highest temperatures at which the system can be used electro-optically in the blue phase. $T_1$ is obtained from the plot of $V_{100}$ against temperature by the intersection of a tangential line drawn through the points in which high operating voltages are obtained at low temperatures with a second tangential line drawn through the points in which the operating voltage increases steadily through the blue phase temperature range. $T_2$ is obtained from the same plot by the intersection of a similar tangential line drawn through the points in which the voltage increases steadily through the blue phase temperature range with a third line tangential drawn through the points in which high operating voltages are obtained when the system is in the isotropic phase. The temperature range over which the mixture can be used electro-optically in the blue phase, termed the flat range, is given by $(T_2-T_1)$.

Mixture Examples

Examples A1 to A16

Monoreactive compounds I to 16 are investigated together with the direactive mesogenic component RM220 (available from Merck KGaA) in a mixture with the compositions (in mass-%) given in the table 4 below. The phase behaviour of these systems before and after polymerisation is given in Table 5.

TABLE 4

Compositions of the mixtures investigated (A1 to A16)

| Example Number | Test Compound | Mixture Composition Concentration/mass-% | | | | |
|---|---|---|---|---|---|---|
| | | A0 | R-5011 | RM220 | Test cpd. | IRG-651 |
| A1 | 1 | 86.2 | 2.5 | 5 | 6.1 | 0.2 |
| A2 | 2 | 86.2 | 2.5 | 5 | 6.1 | 0.2 |
| A3 | 3 | 87.2 | 2.5 | 5 | 5.1 | 0.2 |
| A4 | 4 | 86.6 | 2.5 | 5 | 5.7 | 0.2 |
| A5 | 5 | 86.8 | 2.5 | 5 | 5.5 | 0.2 |
| A6 | 6 | 87.3 | 2.5 | 5 | 5.0 | 0.2 |
| A7 | 7 | 87.0 | 2.5 | 5 | 5.3 | 0.2 |
| A8 | 8 | 86.2 | 2.5 | 5 | 6.1 | 0.2 |
| A9 | 9 | 87.2 | 2.5 | 5 | 5.1 | 0.2 |
| A10 | 10 | 86.5 | 2.5 | 5 | 5.8 | 0.2 |
| A11 | 11 | 87.1 | 2.5 | 5 | 5.2 | 0.2 |
| A12 | 12 | 87.4 | 2.5 | 5 | 4.9 | 0.2 |
| A13 | 13 | 87.6 | 2.5 | 5 | 4.7 | 0.2 |
| A14 | 14 | 87.7 | 2.5 | 5 | 4.6 | 0.2 |
| A15 | 15 | 87.6 | 2.5 | 5 | 4.7 | 0.2 |
| A16 | 16 | 87.6 | 2.5 | 5 | 4.4 | 0.2 |

TABLE 5

Phase behaviour of examples A1 to A16

| Example Number | Test Cpd. | $T_{Cure}/$ ° C. | Phase[1] Sequence before cure (T/° C.) | Blue Phase[2] after cure (T/° C.) |
|---|---|---|---|---|
| A1 | 1 | 34.9 | N* 35 BPI 35.7 BPII 36 BPIII 36.2 I | −10.5 to +38.8 |
| A2 | 2 | 28.3 | N* 27.4 BP1 30.6 I | −20 to +37.8 |
| A3 | 3 | 34 | N* 34.8 BPI 35.4 BPII 37 BPIII 37.2 I | −20 to +45.1 |
| A4 | 4 | 34 | N* 34.6 BPI 35.4 BP36.1 BPIII 36.8 I | −20 C. to +40.8 |
| A5 | 5 | 28.6 | N* 28 BPI 28.8 I | −20 to +43.8 |
| A6 | 6 | 30.5 | N* 30.3 BPI 30.9 BPIII 31.3 I | −9 to +38.6 |
| A7 | 7 | 31-29 | N* 31.4 BPI 32.5 BPII/ BPIII 34.7 I | −20 to +37 |
| A8 | 8 | 38.5 | N* 37.7 BPI 38 BPIII 39.1 I | −20 to +41.8 |

TABLE 5-continued

Phase behaviour of examples A1 to A16

| Example Number | Test Cpd. | $T_{Cure}/$ ° C. | Phase[1] Sequence before cure (T/° C.) | Blue Phase[2] after cure (T/° C.) |
|---|---|---|---|---|
| A9 | 9 | ND | no BP seen on heating | not stabilised |
| A10 | 10 | 34.5 & 34.5-33 | N* 35.2 BPI 36.1 BPIII 37.6 I | −20 to +40 |
| A11 | 11 | 38-36.8 | N* 38.6 BPII 39.6 BPIII 41.4 I | −20 to 44.1 |
| A12 | 12 | 40.4 | N* 40.6 BPI 40.8 BPII 41.2 BPIII 42.7 I | not stabilised |
| A13 | 13 | 41.1 | N* 40.8 BPI 41.1 BPII 41.7 BPIII 42.2 I | not stabilised |
| A14 | 14 | 39.4-36.0 | N* 39.8 BPI 40.3 BPII 40.8 BPIII 42.1 I | not stabilised |
| A15 | 15 | 41.5-39.1 | N* 41.3 BPI 42 BPIII 42.1 I | not stabilised |
| A16 | 16 | 42 | N* 41 BPI 41.5BPII 41.9 BPIII 43.2 I | not stabilised |

Remarks:
[1]Phases: N* = chiral nematic, BPI = Blue Phase I, BPII = Blue Phase II, BPIII = Blue Phase III, I = Isotropic
[2]The stability of Blue Phase I in cured samples is typically only checked for temperatures as low as −20° C.
n.d. not determined.

Examples A18 and A19

In this set of examples (examples A18 and A19) the influence of the direactive monomers of formula IB (cross-linkers) is investigated.

The di-reactive compounds are investigated in a mixture with the compositions (in mass-%) given in the following table, Table 6, and the structures of the examples examined are given in Table 7. Here the same mixture A0 with the composition given in Table 3 is used as the host mixture.

TABLE 6

Compositions of the mixtures investigated (A17 and A18)

| Example Number | Test Cpd. | Mixture Composition Concentration/mass-% | | | | |
|---|---|---|---|---|---|---|
| | | A0 | R-5011 | Cpd. 1 | Test cpd. | IRG-651 |
| A18 | 18 | 88 | 2.5 | 6.1 | 3.2 | 0.2 |
| A19 | 19 | 87.8 | 2.5 | 6.1 | 3.4 | 0.2 |

The phase behaviour of the systems before and after polymerisation is investigated as described under example A1 to A16 and the results are given in the following table, table 7.

TABLE 7

Phase behaviour of examples A17 and A18

| Example Number | Test Cpd. | $T_{Cure}/$ ° C. | Phase[1] Sequence before cure (T/° C.) | Blue Phase[2] after cure (T/° C.) |
|---|---|---|---|---|
| A18 | 18 | 31.3 | N* 30.7 BPI 31.5 BPIII 32.2 I | −20 to +44.3 |
| A19 | 19 | 28.5 | N* 28 BPI 28.4 BPII 29.1 BPIII 29.7 I | −20 to +42 |

Remarks:
as for table 5.

Example A1

6.1% of compound 1, 5% of the difunctional RM220 and 2.5% of the chiral agent R-5011 together with 0.2% of the photoinitiator Irgacure-651 are dissolved in achiral liquid crystalline mixture A0. The resulting mixture is filled into a 10 micron thick cell without any electrodes or alignment layers. This is done by capillary action in an oven at approximately 75° C. The cell is then examined for liquid crystalline phases and to determine the blue phase temperature ranges. The cell is placed on the Linkam-controlled hot stage mounted on a microscope stage and viewed through crossed polarisers. The phase transition temperatures and polymerisation conditions are determined as described above.

The mixture is then filled into an electro-optical test cell with interdigitated electrodes on one substrate side in an oven at approximately 75° C. The electrode width is 10 microns, the distance between adjacent electrodes 10 microns and the cell gap 10 microns.

Polymerisation is carried out using an EFOS UV lamp fitted with a 365 nm narrow band filter operated at a power of 1.5 mW/cm$^2$. The sample is maintained at a temperature of 34.9° C., a temperature in the Blue Phase regime and exposed for 180 s to UV radiation at 365 nm. The cell is then checked under the polarising microscope to assess any changes. As no phase transition has occurred the test cell is evaluated electro-optically between crossed polarisers.

As shown in Table 9 below, at low temperatures the filled cell shows high switching voltage and slow response time. As the temperature is raised the operating voltage falls to a minimum at 1.4° C. and then increases steadily to the value measured at +38.4° C., after which it increases very rapidly with further increases in temperature when the mixture becomes isotropic. Throughout the temperature range between 1.4° C., and 38.4° C., the switching off time falls from 4 s to 0.2 ms. The characteristic temperatures $T_1$ and $T_2$ in this example are −10.5° C. and 38.8° C., giving a flat range for this mixture of 49.3° C. The temperature range over which both of the response times $\tau_{on}$ and $\tau_{off}$ are below 5 ms and at the same time the characteristic voltages are still sufficiently low, for this example extends from 11.2° C. to 38.8° C.

TABLE 8

Temperature dependence of the switching characteristics for example A1

| T (° C.) | $V_{10}$ (volts) | $V_{100}$ (volts) | $\tau_{on}$ (ms) | $\tau_{off}$ (ms) |
|---|---|---|---|---|
| −16.4 | 25 | 82 | 100 | 200 |
| −14.5 | 19 | 64 | 50 | 160 |
| −12.7 | 15 | 52 | 25 | 120 |
| −10.6 | 13 | 43 | 20 | 80 |
| −8.7 | 12 | 37 | 12 | 50 |
| 1.4 | 11 | 35 | 4 | 12 |
| 11.1 | 12 | 40 | 1 | 4.5 |
| 20.9 | 15 | 46 | 0.6 | 1.8 |
| 25.8 | 16 | 49 | 0.4 | 1.2 |
| 30.8 | 19 | 55 | 0.3 | 0.7 |
| 35.2 | 27 | 62 | 0.25 | 0.45 |
| 36.8 | 28 | 66 | 0.25 | 0.38 |
| 38.4 | 29 | 68 | 0.2 | 0.33 |
| 40.2 | 33 | 83 | 0.1 | 0.48 |
| 41.2 | 41 | 101 | 0.3 | 0.15 |
| 42.2 | 58 | 119 | 0.22 | 0.09 |

The characteristic temperatures, voltages and switching times for the mixture examples A1 to A16 are measured in a similar way and are shown in table 9 below.

TABLE 9

Characteristic properties of examples A1, A3 to A8, A10 to A12, A18 and A19

| | Example Number | | | |
|---|---|---|---|---|
| | A1 | A3 | A4 | A5 |
| $T_1$ (° C.) | −10.5 | −6.7 | −8.7 | −7.9 |
| $V_{100}$ (volts) | 43 | 30 | 40 | 46 |
| $\tau_{on}$ (ms) | 20 | 20 | 23 | 9 |
| $\tau_{off}$ (ms) | 80 | 70 | 60 | 27 |
| $T_2$ (° C.) | 38.8 | 40.9 | 40.5 | 41.2 |
| $V_{100}$ (volts) | 68 | 58 | 79 | 76 |
| $\tau_{on}$ (ms) | 0.2 | 0.23 | 0.11 | 0.13 |
| $\tau_{off}$ (ms) | 0.33 | 0.4 | 0.6 | 0.45 |
| Flat range (° C.) | 49.3 | 47.6 | 49.2 | 49.1 |

| | Example Number | | | |
|---|---|---|---|---|
| | A6 | A7 | A8 | A10 |
| $T_1$ (° C.) | −9 | −7 | −12.5 | −3 |
| $V_{100}$ (volts) | 38 | 33 | 44 | 40 |
| $\tau_{on}$ (ms) | 30 | 23 | 55 | 5 |
| $\tau_{off}$ (ms) | 350 | 90 | 200 | 28 |
| $T_2$ (° C.) | 38.6 | 35 | 40 | 38 |
| $V_{100}$ (volts) | 65 | 57 | 65 | 72 |
| $\tau_{on}$ (ms) | 0.8 | 0.6 | 0.9 | 0.35 |
| $\tau_{off}$ (ms) | 0.9 | 1.5 | 0.5 | 0.7 |
| Flat range (° C.) | 47.6 | 42 | 52.5 | 41 |

| | Example Number | | | |
|---|---|---|---|---|
| | A11 | A12 | A18 | A19 |
| $T_1$ (° C.) | −7 | n.d. | −3.9 | −4.3 |
| $V_{100}$ (volts) | 30 | | 54 | 62 |
| $\tau_{on}$ (ms) | 20 | | 45 | 4 |
| $\tau_{off}$ (ms) | 50 | | 60 | 16 |
| $T_2$ (° C.) | 38 | | 39.4 | 38.4 |
| $V_{100}$ (volts) | 48 | | 101 | 96 |
| $\tau_{on}$ (ms) | 0.4 | | 0.2 | 0.1 |
| $\tau_{off}$ (ms) | 1.5 | | 0.5 | 0.4 |
| Flat range (° C.) | 45 | | 43.3 | 42.7 |

| | Example Number | |
|---|---|---|
| | A18 | A19 |
| $T_1$ (° C.) | −3.9 | −4.3 |
| $V_{100}$ (volts) | 54 | 62 |
| $\tau_{on}$ (ms) | 45 | 4 |
| $\tau_{off}$ (ms) | 60 | 16 |
| $T_2$ (° C.) | 39.4 | 38.4 |
| $V_{100}$ (volts) | 101 | 96 |
| $\tau_{on}$ (ms) | 0.2 | 0.1 |
| $\tau_{off}$ (ms) | 0.5 | 0.4 |
| Flat range (° C.) | 43.3 | 42.7 |

Remarks:
n.d.: not determined.

Examples A20 to A22

In this set of examples (examples A20 to A22) the influence of the monoreactive cyclohexyl-monomers is investigated, as described above.

Mono-reactive compounds 20 to 22 are investigated together alternatively with one of the directive mesogenic components RM257 (available from Merck KGaA) or RM220 in a mixture with the compositions (in mass-%) given in the following table, Table 10. The phase behaviour of these systems before and after polymerisation is given in Table 11.

TABLE 10

Compositions of the mixtures investigated (A20 to A22)

| Example Number | Test Compound | Mixture Composition Concentration/mass-% | | | | |
|---|---|---|---|---|---|---|
| | | A0 | R-5011 | RM220 | Test cmpd. | IRG-651 |
| A20 | 20 | 88.7 | 2.5 | 5[§] | 3.6 | 0.2 |
| A21 | 21 | 88.1 | 2.5 | 5 | 4.2 | 0.2 |
| A22 | 22 | 87.8 | 2.5 | 5 | 4.5 | 0.2 |

Remarks:
[§]RM257 used instead of RM220.

TABLE 11

Phase behaviour of examples A20 to A22

| Example Number | Test Cpd. | $T_{Cure}$/ ° C. | Phase[1] Sequence before cure (T/° C.) | Blue Phase[2] after cure (T/° C.) |
|---|---|---|---|---|
| A20 | 20 | 27.6 | I-30.1 BPIII 27.4 BPII 27.0 BPI 25.4 N* | −20 BPI +37.5 I |
| A21 | 21 | 25.2 | I-27.4 BPIII 26.4 BPII 24.5 BPI 23.5 N* | −20 BPI +44.0 I |
| A22 | 22 | 19.3 | I-21.7 BPIII 19.3 BPI 15.5 N* | −20 BPI +43.3 I |

Remarks:
as for table 5.

Examples A20 to A22

The phase transition temperatures and polymerisation conditions were determined as described above. The electro-optical properties of the resulting mixtures are investigated as described for example A1.

TABLE 12

Temperature dependence of the switching characteristics for example A21

| T (° C.) | $V_{10}$ (volts) | $V_{100}$ (volts) | $\tau_{on}$ (msec) | $\tau_{off}$ (msec) |
|---|---|---|---|---|
| −8.8 | 13 | 35 | 18 | 45 |
| −13.5 | 19 | 57 | 30 | 120 |
| −12.6 | 16 | 50 | 30 | 90 |
| −11.0 | 14 | 42 | 20 | 60 |
| −10.1 | 13 | 37 | 15 | 50 |
| +1.0 | 12 | 32 | 4 | 10 |
| 10.8 | 13 | 36 | 2.5 | 4 |
| 20.9 | 15 | 40 | 0.8 | 2.5 |
| 30.7 | 18 | 46 | 0.4 | 1.6 |
| 37.8 | 23 | 51 | 0.25 | 0.8 |
| 40.9 | 24 | 57 | 0.2 | 0.6 |
| 42.2 | 24 | 62 | 0.15 | 0.6 |
| 42.8 | 33 | 95 | 0.04 | 0.7 |
| 43.9 | 55 | 123 | 0.02 | 0.35 |

TABLE 13

Characteristic properties of mixtures A20 to A22

| | Example Number | | |
|---|---|---|---|
| | A20 | A21 | A22 |
| $T_1$ (° C.) | 613 | −8.6 | −8.9 |
| $V_{100}$ (volts) | 56 | 35 | 46 |
| $\tau_{on}$ (ms) | 70 | 18 | 8 |
| $\tau_{off}$ (ms) | 120 | 45 | 35 |
| $T_2$ (° C.) | 35 | 41.9 | 41.8 |
| $V_{100}$ (volts) | 50 | 62 | 64 |
| $\tau_{on}$ (ms) | 0.5 | 0.15 | 0.15 |
| $\tau_{off}$ (ms) | 0.5 | 0.6 | 0.45 |
| Flat range (° C.) | 48 | 50.5 | 50.7 |

Remarks:
n.d.: not determined.

Examples A23 and A24

In the following set of examples (examples A22 and A23) the influence of direactive monomers containing a single cyclohexyl moiety of formula ID is investigated for mixtures containing a combination of these direactive mesogens of formula ID and compound 1, a monoreactive mesogen of formula IA.

TABLE 14

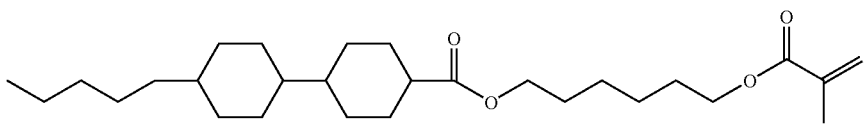 [SMILES: C=C(C)C(=O)OCCCCCCOC(=O)C1CCC(C2CCC(CCCCC)CC2)CC1]

Compositions of the mixtures investigated (A23 and A24)

| Example Number | Test Compound | Mixture Composition Concentration/mass-% | | | | |
|---|---|---|---|---|---|---|
| | | A0 | R-5011 | Cmpd. 1 | Test cmpd. | IRG-651 |
| A23 | 48 | 88.1 | 2.5 | 6.1 | 2.1 | 0.2 |
| A24 | 49 | 87.8 | 2.5 | 6.1 | 2.2 | 0.2 |

TABLE 15

Phase behaviour of examples A22 and A23

| Example Number | Test Cpd. | $T_{Cure}/°C.$ | Phase[1] Sequence before cure (T/° C.) | Blue Phase[2] after cure (T/° C.) |
|---|---|---|---|---|
| A23 | 47 | 27.2 | N* 27.6 BPI 28.6 BPII 29.4 BPIII 30.2 I | −20 to +42 |
| A24 | 48 | 24 | N* 24.3 BPI 25.2 BPII 25.7 or 27.2 BPIII 27.8 I | −20 to +42 |

Remarks:
as for table 6.

Example A23

The phase transition temperatures and polymerisation conditions were determined as described above. The electro-optical properties of the resulting mixtures are investigated as described for example A1.

TABLE 16

Temperature dependence of the switching characteristics for example A23

| T (° C.) | $V_{10}$ (volts) | $V_{100}$ (volts) | $\tau_{on}$ (msec) | $\tau_{off}$ (msec) |
|---|---|---|---|---|
| −8.1 | 13 | 36 | 120 | 250 |
| −4.2 | 11 | 32 | 50 | 200 |
| +1.9 | 11 | 32 | 25 | 120 |
| 11.7 | 12 | 34 | 20 | 50 |
| 21.7 | 13 | 37 | 18 | 26 |
| 31.4 | 13 | 39 | 5 | 9 |
| 33.5 | 13 | 39 | 4 | 8 |
| 36.2 | 13 | 42 | 1 | 5 |
| 37.2 | 13 | 43 | 8 | 5 |
| 40.0 | 20 | 51 | 8 | 1.2 |
| 41.4 | 27 | 71 | 5.4 | 0.5 |
| 43.2 | 70 | 133 | 0.06 | 0.5 |

The characteristic temperatures, voltages and switching times for the mixture examples A23 and A24 are measured in a similar way and are shown in Table 19 below.

TABLE 17

Characteristic properties of mixtures A23 and A24

| | Example Number | |
|---|---|---|
| | A23 | A24 |
| $T_1$ (° C.) | −6.0 | −4.5 |
| $V_{100}$ (volts) | 32 | 48 |
| $\tau_{on}$ (ms) | 50 | 9 |
| $\tau_{off}$ (ms) | 200 | 70 |
| $T_2$ (° C.) | 40.6 | 38 (est) |
| $V_{100}$ (volts) | 51 | 67 |
| $\tau_{on}$ (ms) | 5 | 0.8 |
| $\tau_{off}$ (ms) | 1.2 | 25 |
| Flat range (° C.) | 46.6 | 42.5 |

Remarks:
n.d.: not determined.

The results clearly show that the cyclohexylene RMs of formula I are useful for polymer stabilisation of the blue phase of an liquid crystalline host mixture.

The invention claimed is:

1. A compound according to formula I $$R^1\text{-A-}(B)_b\text{—}R^2 \qquad \text{I}$$

wherein $R^1$ and $R^2$ are independently of each other selected from H, F, Cl, Br, I, CN, NCS, $SF_5$, or straight-chain or branched alkyl having 1 to 30 C-atoms that is optionally mono- or polysubstituted by F, Cl, Br, I or CN, and in which one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O—, —S—CO—, —CO—S—, —$CY^1$=$CY^2$— or —C≡C— in such a manner that O and/or S atoms are not linked directly to one another, or denote P-Sp-, wherein at least one of $R^1$ and $R^2$ is P-Sp, $R^0$ and $R^{00}$ independently of each other denote H or alkyl with 1 to 12 C-atoms, $Y^1$ and $Y^2$ independently of each other denote H or F, P is a polymerizable group, Sp is a Sp'-X' or a single bond, Sp' is alkylene with 1 to 20 C atoms, which is optionally mono- or polysubstituted by F, Cl, Br, I or CN, and wherein one or more non-adjacent $CH_2$ groups are optionally replaced, in each case independently from one another, by —O—, —S—, —NH—, —$NR_0$—, —$SiR_0R_{00}$—, —CO—, —COO—, —OCO—, —OCO—O—, —S—CO—, —CO—S—, —$NR^0$—CO—O—, —O—CO—$NR^0$—, —$NR^0$—CO—$NR^0$—, —CH=CH — or —C≡C— in such a manner that O and/or S atoms are not linked directly to one another, X' is —O—, —S—, —CO—, —COO—, —OCO—, —O—COO—, —CO—$NR^0$—, —$NR^0$—CO—, —$NR^0$—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^0$—, —$CY^1$=$CY^2$—, —C≡C—, —CH=CH—COO—, —OCO—CH=CH— or a single bond, A and B are independently of each other 1,4-cyclohexylene wherein one or more —$CH_2$— groups are optionally replaced by —O— and/or —S—, in such a way, that no two O-atoms are linked together and that is optionally substituted, and b is 0 or 1;

wherein at least one of $R^1$ and $R_2$ is P-Sp'-X' is not a single bond, and if only one of $R^1$ and $R^2$ is P-Sp'-X'— then X' is not —O— or —$CH_2O$— and Sp ' is not an alkylene with 1 20 C atoms wherein only one $CH_2$ group is replaced and it is replaced by —O—;

with the proviso that compounds wherein;

b is 0, $R^1$ and $R^2$ are P-Sp,

P is arcylate or methacrylate, and

Sp is a single bond or a —$CH_2$— group are excluded.

2. A compound according to claim 1, wherein only one of $R^1$ and $R^2$ is P-Sp'-X'—.

3. A compound according to claim 1, wherein both $R^1$ and $R^2$ independently of one another are P-Sp'-X'—.

4. A compound according to claim 1, wherein b is 0.

5. A compound according to claim 1, wherein b is 1.

6. A compound according to claim 1, wherein B is 1,4-cyclohexylene.

7. A compound according to claim 1 wherein $R^1$ and/or $R^2$ and/or one or both of the groups Sp area chiral group.

8. A compound according to claim 1, wherein said compound is selected from the following formulae IA to ID

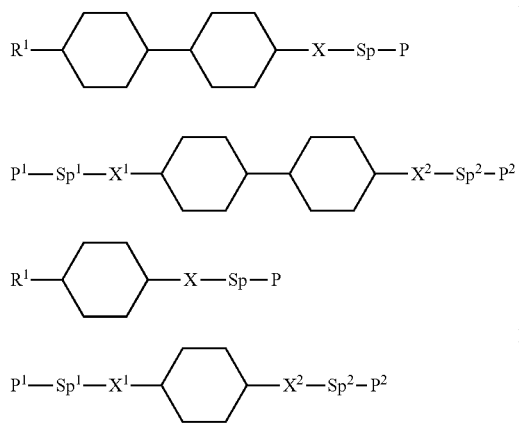

wherein
$R^1$ is selected from H, F, Cl, Br, I, CN, NCS, $SF_5$, or straight-chain or branched alkyl having 1 to 30 C-atoms that is optionally mono- or polysubstituted by F, Cl, Br, I or CN, and in which one or more non-adjacent $CH_2$ groups are optionally replaced, in each case independently from one another, by —O—, —S—, —NH—, —$NR^o$—, —$SiR^oR^{oo}$—, —CO—, —COO—, —OCO—, —OCO—O—, —S—CO—, —CO—S—, —$CY^1$=$CY^2$— or —C≡C— in such a manner that O and/or S atoms are not linked directly to one another, $Y^1$ and $Y^2$ independently of each other denote H or F, $P^1$ and $P^2$ are independently of each, a polymerizable group, X is —O—, —S—, —CO—, —COO—, —OCO—, —O—COO—, —CO—$NR^o$—, —$NR^o$—CO—, —$NR^o$—CO—$NR^o$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^o$—, —$CY^1$=$CY^2$—, —C≡C—, —CH=CH—COO—, —OCO—CH=CH— or a single bond, Sp is alkylene with 1 to 20 C atoms, which is optionally mono- or polysubstituted by F, Cl, Br, I or CN, and wherein one or more non-adjacent $CH_2$ groups are optionally replaced, in each case independently from one another, by —O—, —S—, —NH—, —$NR^o$—, —$SiR^oR^{oo}$—, —CO—, —COO—, —OCO—, —OCO—O—, —S—CO—, —CO—S—, —$NR^o$—CO—O—, —O—CO—$NR^o$—, —$NR^o$—CO—$NR^o$—, —CH=CH— or —C≡C— in such a manner that O and/or S atoms are not linked directly to one another, $Sp^1$ and $Sp^2$ are, independently of each other, alkylene with 1 to °C atoms, which is optionally mono- or polysubstituted b F, Cl, Br, I or CN, and wherein one or more non-adjacent $CH_2$ groups are optionally replaced, in each case independently from one another, by —O—, —S—, —NH—, —$NR^o$—, —$SiR^oR^{oo}$—, —CO—, —COO—, —OCO—, —OCO—O—, —S—CO—, —CO—S—, —$NR^o$—CO—O—, —O—CO—$NR^o$—, —$NR^o$—CO—$NR^o$—, —CH=CH— or —C≡C— in such a manner that O and/or S atoms are not linked directly to one another, and $X^1$ and $X^2$ are, independently of each other, —O—, —S—, —CO—, —COO—, —OCO—, —O—COO—, —CO—$NR^o$—, —$NR^o$—CO—, —$NR^o$—CO—$NR^o$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^o$—, —$CY^1$=$CY^2$—, —C≡C—, —CH=CH—COO—, —OCO—CH=CH— or a single bond.

9. A liquid-crystal medium comprising one or more compounds of formula I $$R^1\text{-A-(B)}_b\text{—}R^2 \qquad I$$

wherein
$R^1$ and $R^2$ are independently of each other selected from H, F, Cl, Br, I, CN, NCS, $SF_5$, or straight-chain or branched alkyl having 1 to 30 C-atoms that is optionally mono- or polysubstituted by F, Cl, Br, I or CN, and in which one or more non-adjacent $CH_2$ groups are optionally replaced, in each case independently from one another, by —O—, —S—, —NH—, —$NR^o$—, —$SiR^oR^{oo}$—, —CO—, —COO—, —OCO—, —OCO—O—, —S—CO—, —CO—S—, —$CY^1$=$CY^2$— or —C≡C— in such a manner that O and/or S atoms are not linked directly to one another, or denote P-Sp-, wherein at least one of $R^1$ and $R^2$ is P-Sp, $R^o$ and $R^{oo}$ independently of each other denote H or alkyl with 1 to 12 C-atoms, $Y^1$ and $Y^2$ independently of each other denote H or F, P is a polymerizable group, Sp is a SP'-X' or a single bond, Sp' is alkylene with 1 to 20 C atoms, which is optionally mono- or polysubstituted by F, Cl, Br, I or CN, and wherein one or more non-adjacent $CH_2$ groups are optionally replaced, in each case independently from one another, by —O—, —S—, —NH—, —$NR^o$—, —$SiR^oR^{oo}$—, —CO—, —COO—, —OCO—, —OCO—O—, —S—CO—, —CO—S—, —$NR^o$—CO—O—, —O—CO—$NR^o$—, —$NR^o$—CO—$NR^o$—, —CH=CH— or —C≡C— in such a manner that O and/or S atoms are not linked directly to one another, X' is —O—, —S—, —CO—, —COO—, —OCO—, —O—COO—, —CO—$NR^o$—, —$NR^o$—CO—, —$NR^o$—CO—$NR^o$—, —$OCH_2$—, —$CH_2O$—, —$SCH_2$—, $CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^o$—, —$CY^1$=$CY^2$—, —C≡C—, CH=CH—COO—, —OCO—CH=CH— or a single bond, A and B are independently of each other 1,4-cyclohexylene wherein one or more —$CH_2$— groups are optionally replaced by —O— and/or —S—, in such a way, that no two O-atoms are linked together and that is optionally substituted, and b is 0 or 1, wherein at least one of $R^1$ and $R^2$ is P-Sp'-X'— in which X' is not a single bond, and if only one of $R^1$ and $R^2$ is P-Sp'-X'— then X' is not —O— or —$CH_2O$— and Sp' is not an alkylene with 1 to 20 C atoms wherein only one $CH_2$ group is replaced and it replaced by —O—.

10. The liquid-crystal medium according to claim 9, wherein both $R^1$ and $R^2$ independently of one another are P-Sp'-X'—.

11. The liquid-crystal medium according to claim 9, wherein said medium comprises the following components
   (a) one or more non-polymerizable, mesogenic or liquid crystalline compounds,
   (b) one or more polymerizable mesogenic or liquid crystalline compounds of formula I, and
   (c) optionally one or more additional polymerizable, mesogenic or liquid crystalline compounds,
   wherein said mixture comprises one or more chiral compounds, which can be compounds of components (a), (b) and/or (c) or can form an additional component, component (d).

12. The liquid-crystal medium according to claim 9, wherein said medium has a blue phase.

13. The liquid-crystal medium according to claim 12, wherein the temperature range of said blue phase is broadened by in-situ polymerization of component (b), and, if present, component (c), at a temperature at which the unpolymerized liquid crystalline medium exhibits a blue phase.

14. A method of stabilizing the blue phase of a liquid crystalline medium, said method comprising:
   adding to said medium a component (b), wherein component (b) comprises one or more polymerizable mesogenic or liquid crystalline compounds according to claim 1 and optionally a component (c) which comprises one or more additional polymerizable mesogenic or liquid crystalline compounds, and
   polymerizing component (b), and, if present, component (c), in situ at a temperature at which the unpolymerized liquid crystalline medium exhibits a blue phase.

15. An electrooptical cell comprising two plane-parallel substrates, at least one of which is transparent to visible light, and at least one of which comprises an electrode layer, and further comprising a liquid crystalline medium according to claim 9.

16. A polymerizable liquid crystalline material comprising one or more compounds of formula I according to claim 1 and optionally comprising one or more further compounds that is (a) polymerizable and/or (b) mesogenic or liquid crystalline.

17. An anisotropic polymer obtainable by polymerizing a compound of formula I according claim 1 in its oriented state.

18. The anisotropic polymer according to claim 17 in its oriented state in the form of a thin film.

19. Electrooptical displays, LCDs, optical films, polarisers, compensators, beam splitters, reflective films, alignment layers, colour filters, holographic elements, hot stamping foils, coloured images, decorative or security markings, liquid crystalline pigments, adhesives, cosmetics, diagnostics, non-linear optics, optical information storage, electronic devices, organic semiconductors, field effect transistors (FET), components of integrated circuitry (IC), thin film transistors (TFT), Radio Frequency Identification (RFID) tags, organic light emitting diodes (OLED), electroluminescent displays, lighting devices, photovoltaic devices, sensor devices, electrode materials, photoconductors, electrophotographic recording, lasing materials or devices, or for polymer stabilised blue phases, comprising a compound according to claim 1.

20. A compound according to claim 1, wherein P is selected from $CH_2\!=\!CW^1\!-\!COO\!-\!$, $CH_2\!=\!CW^1\!-\!CO\!-\!$,

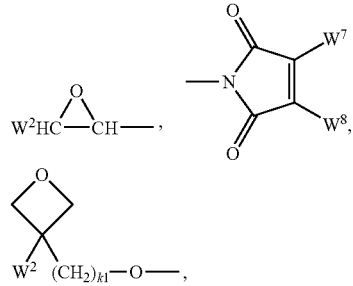

$CH_2\!=\!CW^2\!-\!(O)_{k1}13$, $CH_3\!-\!CH\!=\!CH\!-\!O\!-\!$, $(CH_2\!=\!CH)_2CH\!-\!OCO\!-\!$, $(CH_2\!=\!CH\!-\!CH_2)_2CH\!-\!OCO\!-\!$, $(CH_2\!=\!CH)_2CH\!-\!O\!-\!$, $(CH_2\!=\!CH\!-\!CH_2)_2N\!-\!$, $(CH_2\!=\!CH\!-\!CH_2)_2N\!-\!CO\!-\!$, $HO\!-\!CW^2W^313$, $HS\!-\!CW^2W^3\!-\!$, $HW^2N\!-\!$, $HO\!-\!CW^2W^3\!-\!NH\!-\!$, $CH_2\!=\!CW^1\!-\!CO\!-\!NH\!-\!$, $CH_2\!=\!CH\!-\!(COO)_{k1}$-Phe-$(O)_{k2}\!-\!$, $CH_2\!=\!CH\!-\!(CO)_{k1}$-Phe-$(O)_{k2}\!-\!$, Phe-$CH\!=\!CH\!-\!$, $HOOC\!-\!$, $OCN\!-\!$, and $W^4W^5W^6Si\!-\!$, $W^1$ is H, F, Cl, CN, $CF_3$, phenyl or alkyl having 1 to 5 C-atoms, $W^2$ and $W^3$ are, independently of each other, H or alkyl having 1 to 5 C-atoms, $W^4$, $W^5$ and $W^6$ are, independently of each other, Cl, oxaalkyl having 1 to 5 C-atoms, or oxacarbonylalkyl having 1 to 5 C-atoms, $W^7$ and $W^8$ are, independently of each other, H, Cl or alkyl having 1 to 5 C-atoms, Phe is 1,4-phenylene which is optionally substituted by one or more groups L, L is in each, independently of each other, selected from H, F, Cl, Br, I, CN, NCS, $SF_5$, or straight-chain or branched alkyl having 1 to 30 C-atoms that is optionally mono- or polysubstituted by F, Cl, Br, I or CN, and in which one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O—, —S—CO—, —CO—S—, —$CY^1\!=\!CY^2$— or —C≡C— in such a manner that O and/or S atoms are not linked directly to one another, and $k_1$ and $k_2$ are, independently of each other, 0 or 1.

21. A compound according to claim 3, wherein P is selected from $CH_2\!=\!CW^1\!-\!COO\!-\!$, $CH_2\!=\!CW^1\!-\!CO\!-\!$,

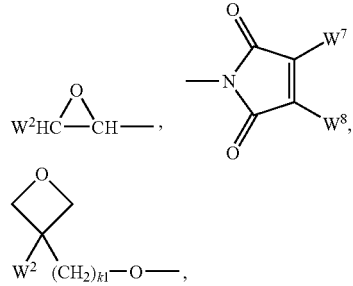

$CH_2\!=\!CW^2\!-\!(O)_{k1}\!-\!$, $CH_3\!-\!CH\!=\!CH\!-\!O\!-\!$, $(CH_2\!=\!CH)_2CH\!-\!OCO\!-\!$, $(CH_2\!=\!CH\!-\!CH_2)_2CH\!-\!OCO\!-\!$, $(CH_2\!=\!CH)_2CH\!-\!O\!-\!$, $(CH_2\!=\!CH\!-\!CH_2)_2N\!-\!$, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN—, and W$^4$W$^5$W$^6$Si—, W$^1$ is H, F, Cl, CN, CF$_3$, phenyl or alkyl having 1 to 5 C-atoms, W$^2$ and W$^3$ are, independently of each other, H or alkyl having 1 to 5 C-atoms, W$^4$, W$^5$ and W$^6$ are, independently of each other, Cl, oxaalkyl having 1 to 5 C-atoms, or oxacarbonylalkyl having 1 to 5 C-atoms, W$^7$ and W$^8$ are, independently of each other, H, Cl or alkyl having 1 to 5 C-atoms, Phe is 1,4-phenylene which is optionally substituted by one or more groups L, L is in each, independently of each other, selected from H, F, Cl, Br, I, CN, NCS, SF$_5$, or straight-chain or branched alkyl having 1 to 30 C-atoms that is optionally mono- or polysubstituted by F, Cl, Br, I or CN, and in which one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —CY$^1$=CY$^2$— or —C≡C— in such a manner that O and/or S atoms are not linked directly to one another, and k$_1$ and k$_2$ are, independently of each other, 0 or 1.

22. A compound according to claim 2, wherein P is selected from CH$_2$=CH—COO—, CH$_2$=C(CH$_3$)—COO—, CH$_2$=CH—, CH$_2$=CH—O—, (CH$_2$=CH)$_2$CH—OCO—, (CH$_2$=CH)$_2$CH—O—,

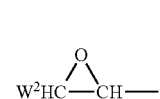 and 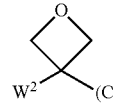, and W$^2$ is H or alkyl having 1 to 5 C-atoms.

23. A compound according to claim 3, wherein P is selected from CH$_2$=CH—COO—, CH$_2$=C(CH$_3$)—COO—, CH$_2$=CH—, CH$_2$=CH—O—, (CH$_2$=CH)$_2$CH—OCO—, (CH$_2$=CH)$_2$CH—O—,

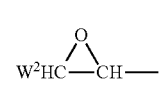 and , and W$^2$ is H or alkyl having 1 to 5 C-atoms.

24. A compound according to claim 8, wherein said compound is selected from the following formulae IA-1, IA-2, IA-4, IA-5, IB-1 to IB-3, IC-1 to IC-3, IA-1
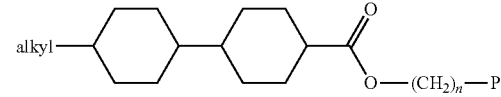

IA-2
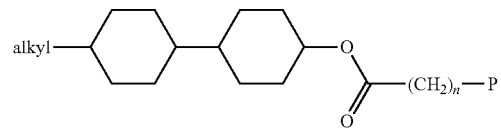

IA-4
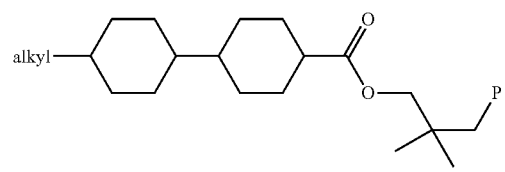

IA-5
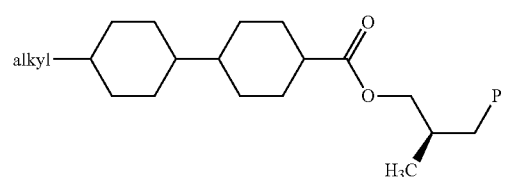

IB-1
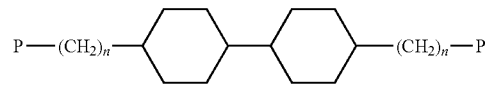

IB-2
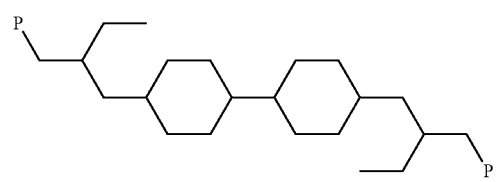

IB-3
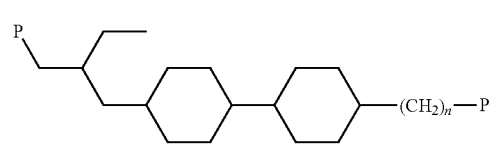

IC-1
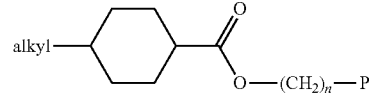

IC-2
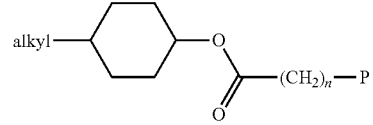

IC-3
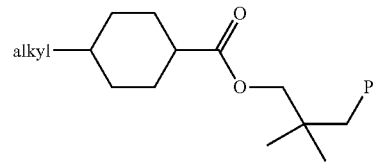

ID-1
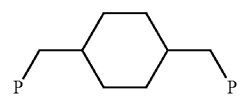

-continued

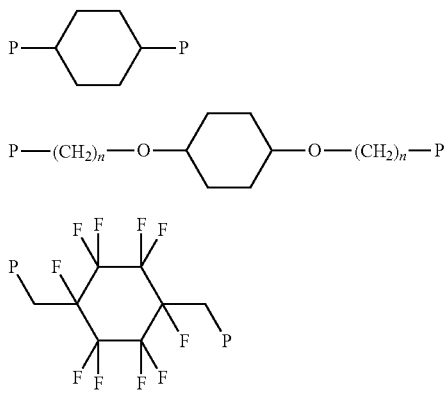

ID-2

ID-3

ID-4 wherein
(a) in formulas IA-1, IA-2, IA-4, and IA-5
  the compounds of formula IA-5 may be present in one of their respective chiral configurations or as a mixture thereof with an enatiomeric excess or as a racemate,
  n is an integer from 1 to 12,
  P is methacrylate or acrylate,
  alkyl is propyl or pentyl, and
  the cyclohexyl rings are in the trans, trans conformation;
(b) in formulas IB-1 to IB-3
  n is an integer from 1 to 12;
(c) in formulas IC-1 to IC-3
  n is an integer from 1 to 12,
  P is methacrylate or acrylate, and
  the cyclohexyl ring is in the trans conformation; and
(d) in formulas ID-1 to ID-4
  n is an integer from 0 to 12.

25. A compound according to claim 2, wherein X' is —COO—, —OCO—, —OCOO—.

26. A compound according to claim 3, wherein X' is —COO—, —OCO—, —OCOO—.

27. A compound according to claim 8, wherein said compound is of formulae IA.

28. A compound according to formula I $$R^1\text{-}A\text{-}(B)_b\text{-}R^2 \quad \quad I$$

wherein
R$^1$ and R$^2$ are independently of each other P-Sp'-X'—,
P is a polymerizable group,
Sp' is alkylene with 1 to 20 C atoms, which is optionally mono- or polysubstituted by F, Cl, Br, I or CN, and wherein one or more non-adjacent CH$_2$ groups are optionally replaced, in each case independently from one another, by —O—, —S—, —NH—, —NR$^0$—,—SiR$^0$R$^{00}$—, —CO—, —COO—, —OCO—, —OCO—O—, —S—CO—, —CO—S—, —NR$^0$—CO—O—,—O—CO—NR$^0$—, —NR$^0$—CO—NR$^0$—, —CH═CH— or —C≡C— in such a manner that O and/or S atoms are not linked directly to one another,
X' is —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—,—CH$_2$S—, —CF$_2$O—, —OCF$_2$—, —CF$_2$S—, —SCF$_2$—, —CF$_2$CH$_2$13 , —CH$_2$CF$_2$—, —CF$_2$CF$_2$—, —CH═N—, —N═CH—, —N═N—, —CH═CR$^0$—, —CY$^1$═CY$^2$13 , —C≡C—, —CH═CH—COO—, —OCO—CH═CH— or a single bond,
R$^0$ and R$^{00}$ independently of each other denote H or alkyl with 1 to 12 C-atoms,
Y$^1$ and Y$^2$ independently of each other denote H or F, A and B are independently of each other 1,4-cyclohexylene wherein one or more —CH$_2$— groups are optionally replaced by —O— and/or —S—, in such a way, that no two O-atoms are linked together and that is optionally substituted, and
b is 0 or 1;
with the proviso that compounds wherein:
  b is 0,
  P is acrylate or methacrylate,
  Sp' is a single bond or a —CH$_2$— group, and
  X' is a single bond,
  are excluded.

29. A compound selected from the following formulae IB to ID

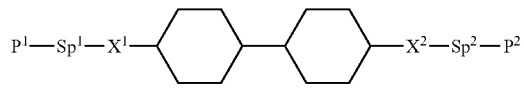

IB

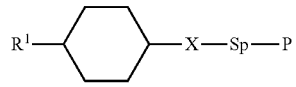

IC

ID wherein
R$^1$ is selected from H, F, Cl, Br, I, CN, NCS, SF$_5$, or straight-chain or branched alkyl having 1 to 30 C-atoms that is optionally mono- or polysubstituted by F, Cl, Br, I or CN, and in which one or more non-adjacent CH$_2$ groups are optionally replaced, in each case independently from one another, by —O—, —S—, —NH—, —NR$^0$, —SiR$^0$R$^{00}$—, —CO—, —COO—, —OCO—, —OCO—O—, —S—CO—, —CO—S—, —CY$^1$═CY$^2$— or —C≡C— in such a manner that O and/or S atoms are not linked directly to one another,
Y$^1$ and Y$^2$ independently of each other denote H or F,
P, P$^1$ and P$^2$ are, independently of each other, a polymerizable group,
X, X$^1$ and X$^2$ are, independently of each other, —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—,—CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH═N—, —N═CH—, —N═N—, —CH═CR$^0$—, —CY$^1$═CY$^2$—, —C≡C—, —CH═CH—COO—, —OCO—CH═CH— or a single bond, and
Sp, Sp$^1$ and Sp$^2$ are, independently of each other, alkylene with 1 to 20 C atoms, which is optionally mono- or polysubstituted by F, Cl, Br, I or CN, and wherein one or more non-adjacent CH$_2$ groups are optionally replaced, in each case independently from one another, by —O—, —S—, —NH—, —NR$^0$—,—SiR$^0$R$^{00}$—, —CO—, —COO—,—OCO—, —OCO—O—, —S—CO—, —CO—S—, —NR$^0$—CO—O—, —O—CO—NR$^0$—, —NR$^0$—CO—NR$^0$—, —CH═CH— or —C≡C— in such a manner that O and/or S atoms are not linked directly to one another,
with the proviso that compounds of Formula IB wherein P$^1$ and P$^2$ are acrylate or methacrylate, and Sp$^1$-X$^1$— and Sp$^2$-X$^2$— are a single bond or a —CH$_2$— group are excluded.

* * * * *

UNITED STATES PATENT AND TRADEMARK OFFICE
CERTIFICATE OF CORRECTION

PATENT NO. : 8,372,307 B2  
APPLICATION NO. : 12/516115  
DATED : February 12, 2013  
INVENTOR(S) : Farrand et al.

Page 1 of 2

It is certified that error appears in the above-identified patent and that said Letters Patent is hereby corrected as shown below:

In the Claims:

Column 68, line 28, reads "one another, by -O-, -S-, -NH-, $NR_0$-," should read -- one another, by -O-, -S-, -NH-, $NR^0$-, --

Column 68, line 29, reads "-$SiR_0R_{00}$-, -CO-, -COO-, -OCO-," should read -- -$SiR^0R^{00}$-, -CO-, -COO-, -OCO-, --

Column 68, line 38, reads "-$CF_2S$-, -$SCF_2$-, -$_{CF2}CH_2$, -$CH_2CF_2$-," should read -- -$CF_2S$-, -$SCF_2$-, -$CF_2CH_2$-, -$CH_2CF_2$-, --

Column 68, line 49, reads "wherein at least one of $R^1$ and $R_2$ is P-Sp'-X' is not a single" should read -- wherein at least one of $R^1$ and $R^2$ is P-Sp'-X' in which X' is not a single --

Column 68, line 51, reads "-O- or -$CH_2O$- and Sp' is not an alkylene with 1 20 C" should read -- -O- or -$CH_2O$- and Sp' is not an alkylene with 1 to 20 C --

Column 68, line 54, reads "with the proviso that compounds wherein;" should read -- with the proviso that compounds wherein: --

Column 69, line 38, reads "$P^1$ and $Y^2$ are independently of each, a polymerizable" should read -- $P^1$ and $Y^2$ are independently of each other, a polymerizable --

Column 69, line 61, reads "1 to °C atoms, which is optionally mono- or polysubsti-" should read -- 1 to 20 C atoms, which is optionally mono- or polysubsti- --

Signed and Sealed this  
Twenty-eighth Day of May, 2013

Teresa Stanek Rea  
*Acting Director of the United States Patent and Trademark Office*

CERTIFICATE OF CORRECTION (continued)
U.S. Pat. No. 8,372,307 B2

Column 69, line 62, reads "tuted b F, Cl, Br, I or CN, and wherein one or more" should read -- tuted by F, Cl, Br, I or CN, and wherein one or more -

Column 72, line 18, reads "$CH_2=CW^2-(O)_{KI}$13, $CH_3-CH=CH-O-$, ($CH_2=$" should read -- $CH_2=CW^2-(O)_{KI}-$, $CH_3-CH=CH-O-$, ($CH_2=$ --

Column 72, line 21, reads "$(CH_2=CH-CH_2)_2N-CO-$, $HO-CW^2W^3$13," should read -- $(CH_2=CH-CH_2)_2N-CO-$, $HO-CW^2W^3-$, --

Column 75, line 59, reads "$-CF_2S-$, $SCF_2-$, $-CF_2CH_2$13, $-CH_2CF_2-$," should read -- $-CF_2S-$, $SCF_2-$, $-CF_2CH_2-$, $-CH_2CF_2-$, --

Column 75, line 61, reads "$-CH=CR^0-$, $-CY^1=CY^2$13, $-C=C-$," should read -- $-CH=CR^0-$, $-CY^1=CY^2-$, $-C=C-$, --

UNITED STATES PATENT AND TRADEMARK OFFICE
CERTIFICATE OF CORRECTION

PATENT NO. : 8,372,307 B2  Page 1 of 1
APPLICATION NO. : 12/516115
DATED : February 12, 2013
INVENTOR(S) : Farrand et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 702 days.

Signed and Sealed this

First Day of September, 2015

Michelle K. Lee
*Director of the United States Patent and Trademark Office*